United States Patent [19]

Hirata et al.

[11] Patent Number: 5,652,634
[45] Date of Patent: Jul. 29, 1997

[54] MULTIPLE DOMAIN LIQUID CRYSTAL DISPLAY DEVICE WITH PARTICULAR REFERENCE ORIENTATION DIRECTIONS AND METHOD FOR PRODUCING THE SAME

[75] Inventors: Mitsuaki Hirata; Akihiro Nammatsu, both of Tenri; Noriko Watanabe, Nara; Shigeaki Mizushima, Ikoma; Seiji Makino, Tenri; Hiroko Iwagoe, Yamatokoriyama; Kei Oyobe, Tenri, all of Japan

[73] Assignee: Sharp Kabushiki Kaisha, Osaka, Japan

[21] Appl. No.: 453,690

[22] Filed: May 30, 1995

Related U.S. Application Data

[62] Division of Ser. No. 278,952, Jul. 22, 1994.

[30] Foreign Application Priority Data

| Jul. 30, 1993 | [JP] | Japan | 5-190498 |
|---|---|---|---|
| Aug. 27, 1993 | [JP] | Japan | 5-213226 |
| Aug. 27, 1993 | [JP] | Japan | 5-213227 |
| Aug. 27, 1993 | [JP] | Japan | 5-213230 |
| Aug. 31, 1993 | [JP] | Japan | 5-216696 |
| Oct. 14, 1993 | [JP] | Japan | 5-257265 |
| Dec. 15, 1993 | [JP] | Japan | 5-315619 |

[51] Int. Cl.⁶ .................. G02F 1/1337; G02F 1/141
[52] U.S. Cl. ........................... 349/129; 349/136
[58] Field of Search ........................... 359/75, 76

[56] References Cited

U.S. PATENT DOCUMENTS

| 3,854,793 | 12/1974 | Kahn | 359/75 |
|---|---|---|---|
| 3,947,185 | 3/1976 | Maezawa | 350/350 |
| 3,967,883 | 7/1976 | Meyerhofer et al. | 350/350 |
| 4,247,174 | 1/1981 | Walter | 350/350 |
| 4,252,415 | 2/1981 | Klein et al. | 350/350 |
| 4,840,460 | 6/1989 | Bernot et al. | 350/333 |

(List continued on next page.)

FOREIGN PATENT DOCUMENTS

| 0421190 A3 | 9/1990 | European Pat. Off. |
|---|---|---|
| 0549283 A2 | 6/1993 | European Pat. Off. |
| 0613037 | 8/1994 | European Pat. Off. |
| 56-146119 | 11/1981 | Japan . |
| 60-147722 | 8/1985 | Japan . |
| 60-211425 | 10/1985 | Japan . |
| 60-211424 | 10/1985 | Japan . |
| 2-12 | 11/1987 | Japan . |
| 1-210932 | 8/1989 | Japan . |
| 2-55330 | 2/1990 | Japan . |
| 3-230120 | 10/1991 | Japan . |
| 4-12314 | 1/1992 | Japan . |
| 5-5886 | 1/1993 | Japan . |
| 5-107544 | 4/1993 | Japan . |
| 5-173138 | 7/1993 | Japan . |
| 5-188374 | 7/1993 | Japan . |
| 5-173137 | 7/1993 | Japan . |
| 5-173135 | 7/1993 | Japan . |
| 5-173136 | 7/1993 | Japan . |
| 5-224210 | 9/1993 | Japan . |
| 5-303099 | 11/1993 | Japan . |

OTHER PUBLICATIONS

Patent Abstracts of Japan, vol. 011, No. 097 (P–560) 26 Mar. 1987 & JP–A–61 249 021 (Citizen Watch Co Ltd) 6 Nov. 1986.

Patent Abstracts of Japan, vol. 013, No. 361 (P–917) 11 Aug. 1989 & JP–A–01 120 531 (Alps Electric Co Ltd) 12 May 1989.

(List continued on next page.)

*Primary Examiner*—William L. Sikes
*Assistant Examiner*—Charles Miller
*Attorney, Agent, or Firm*—Nixon & Vanderhye P.C.

[57] ABSTRACT

A liquid crystal display device which includes a pair of substrates; a liquid crystal layer sandwiched between the pair of substrates; and an electrode for applying a voltage to the liquid crystal layer is disclosed. The liquid crystal layers includes liquid crystal molecules, and is divided into a plurality of regions having different twist angles from one another.

9 Claims, 31 Drawing Sheets

U.S. PATENT DOCUMENTS

| | | | |
|---|---|---|---|
| 4,878,742 | 11/1989 | Ohkubo et al. | 350/350 |
| 4,930,876 | 6/1990 | Suzuki et al. | 350/350 |
| 5,071,228 | 12/1991 | Waldmann et al. | 359/63 |
| 5,073,294 | 12/1991 | Shannon et al. | 35/350 |
| 5,172,255 | 12/1992 | Brosig et al. | 359/76 |
| 5,189,540 | 2/1993 | Nakamura et al. | 359/102 |
| 5,198,917 | 3/1993 | Togashi | 359/87 |
| 5,223,963 | 6/1993 | Okada et al. | 359/78 |
| 5,231,039 | 7/1993 | Sakono et al. | 437/31 |
| 5,280,375 | 1/1994 | Tsuda et al. | 359/76 |
| 5,303,076 | 4/1994 | Okada et al. | 359/78 |
| 5,309,264 | 5/1994 | Lien et al. | 359/87 |
| 5,321,537 | 6/1994 | Okada et al. | 359/76 |
| 5,398,127 | 3/1995 | Kubota et al. | 359/75 |
| 5,416,619 | 5/1995 | Koike | 359/76 |
| 5,453,862 | 9/1995 | Toko et al. | 359/76 |
| 5,473,455 | 12/1995 | Koike et al. | 359/76 |
| 5,495,355 | 2/1996 | Konuma | 359/78 |

OTHER PUBLICATIONS

Patent Abstracts of Japan, vol. 013, No. 361 (P–917) 11 Aug. 1989 & JP–A–01 120 533 (Alps Electric Co Ltd) 12 May 1989.

Patent Abstracts of Japan, vol. 017, No. 265 (P–1542)24 May 1993 & JP–A–05 005 886 (Matsushita Electric Ind Co Ltd) 14 Jan. 1993.

Patent Abstracts of Japan, vol. 017, No. 631 (P–1648) 22 Nov. 1993 & JP–A–05 203 951 (NEC Corp) 13 Aug. 1993.

Patent Abstracts of Japan, vol. 017, No. 611 (P–1641) 10 Nov. 1993 & JP–A–05 188 374(Matsushita Electric Ind Co Ltd) 30 Jul. 1993.

Koike et al, "A Full–Color TFT–LCD with A Domain–Divided Twisted–Nematic Structure", SID 1992 International Symposium—Digest of Technical Papers, May 1992, Playa De Rey, CA, pp. 798–801.

Takatori et al, "A Complementary TN LCD with Wide–Viewing-Angle Grayscale", NEC Corp. pp. 591–595, Japan Display '92.

Kamada et al, "PD–12 Wide Viewing Angle Full–Color TFT LCDs", Japan Display '92, p. 886.

Sumiyoshi et al, "A Complementary Twisted Nematic", Functional Devices Labs, NEC Corp., pp. 35–41.

Patent Abstracts of Japan, vol. 009, No. 243 (P–392) 30 Sep. 1985 & JP–A–60095423 (Citizen Tokei KK) 28 May 1985.

Patent Abstracts of Japan, vol. 007, No. 256 (P–236) 15 Nov. 1983 & JP–A–58139124 (Tokyo Shibaura Denki KK) 18 Aug. 1983.

Patent Abstracts of Japan, vol. 013, No. 583 (P–981) 22 Dec. 1989, & JP–A–01245223 (Nippon Telegr & Teleph Corp) 29 Sep. 1989.

IBM Technical Disclosure Bulletin, vol. 36, No. 8, Aug. 1993, New York, US, pp. 485–486, XP000390303, "Bi–Handedness Two–Domain Twist Nematic Cell for Active Matrix Display Application".

Patent Abstracts of Japan, vol. 009, No. 304 (P–409) 30 Nov. 1985 & JP–A–60 136 716 (Nihon Seiki KK) 20 Jul. 1985.

Patent Abstracts of Japan, vol. 010, No. 080 (P–441) 29 Mar. 1986 & JP–A–60 217 341 (Citizen Tokei KK) 30 Oct. 1985.

IBM Technical Disclosure Bulletin, vol. 33, No. 18, Jun. 1990, New York, US, pp. 199–200, XP000122861, "Controlled Two–and Four–Domain Twisted Nematic Liquid Crystal Displays".

Yang, K.H., "Two–Domain 80–Twisted Nematic Liquid Crystal Display for Grayscale Applications", Japanese Journal of Applied Physics, Letters, vol. 31, No. 11B, Nov. 1992, Tokyo, Japan, pp. L1603–1605.

Patent Abstracts of Japan, vol. 013, No. 505 (P–959), 14 Nov. 1989 & JP–A–01 204 025 (Konica Corp) 16 Aug. 1989.

Patent Abstracts of Japan, vol. 013, No. 440 (P–940) 4 Oct. 1989 & JP–A–01 169 428 (Alps Electric Co Ltd) 4 Jul. 1989.

Patent Abstracts of Japan, vol. 013, No. 306 (P–897) 13 Jul. 1989 & JP–A–01 079 725 (Matsushita Electric Ind Co Ltd) 24 Mar. 1989.

Patent Abstracts of Japan, vol. 014, No. 230 (P–1048) 16 May 1990 & JP–A–02 055 330 (Matsushita Electric Ind Co Ltd) 23 Feb. 1990.

Patent Abstracts of Japan, vol. 011, No. 373 (P–643) 5 Dec. 1987 & JP–A–62 144 133 (Seiko Epson Corp) 27 Jun. 1987.

Liquid crystal panel

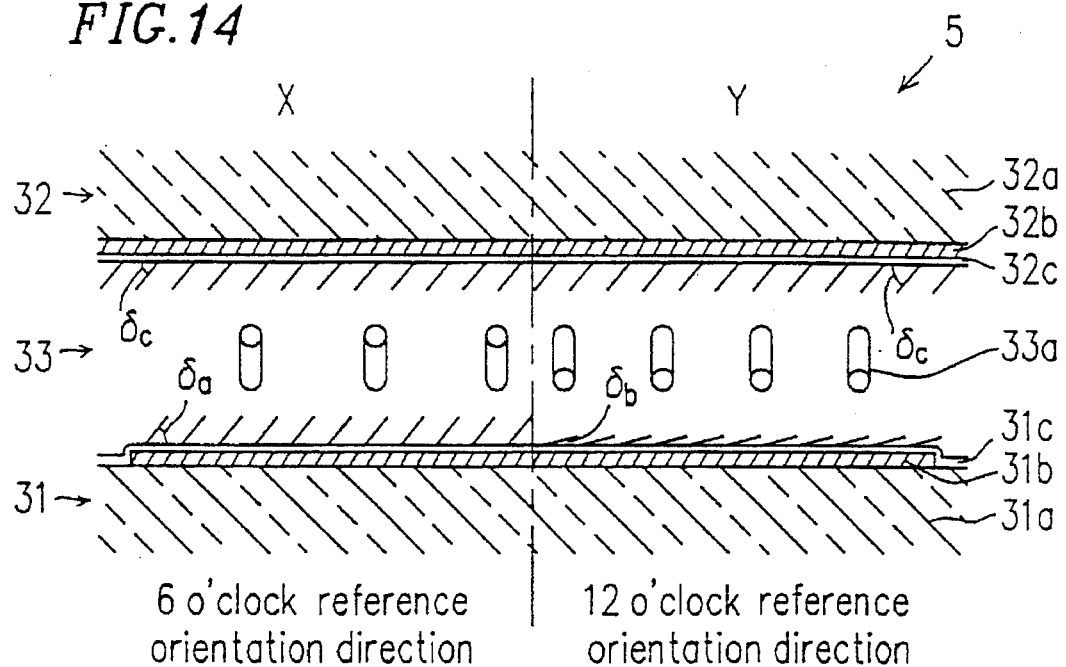
FIG.14
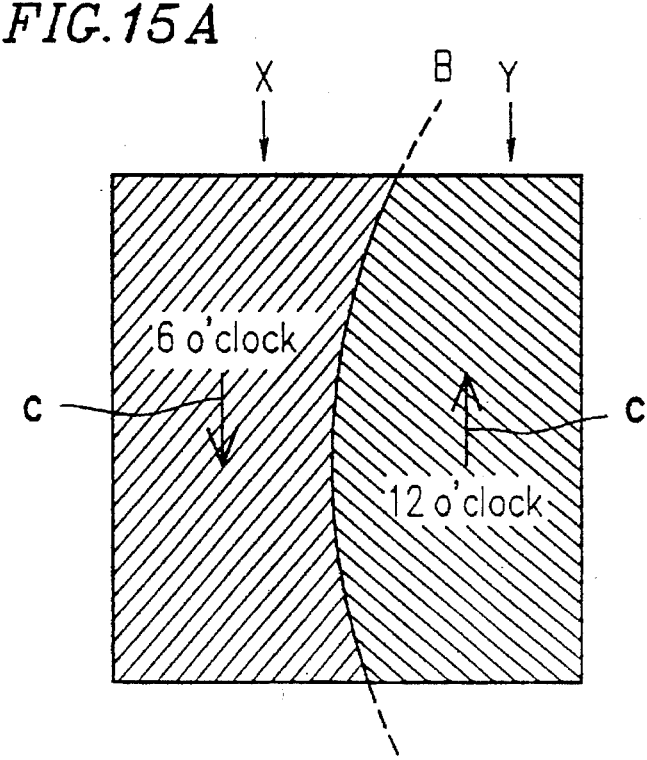
FIG.15A
FIG.15B

MULTIPLE DOMAIN LIQUID CRYSTAL DISPLAY DEVICE WITH PARTICULAR REFERENCE ORIENTATION DIRECTIONS AND METHOD FOR PRODUCING THE SAME

This is a divisional of application Ser. No. 08/278,952, filed Jul. 22, 1994.

BACKGROUND OF THE INVENTION

1. Field of the Invention

The present invention relates to a liquid crystal display device and a method for producing the same, and in particular to a liquid crystal display device having improved display characteristics including an improved viewing angle performance and a method for producing such a liquid crystal display device.

2. Description of the Related Art

Liquid crystal display devices (hereinafter, referred to as "LCD devices") are used in, for example, planar display apparatuses for personal computers and the like, liquid crystal TVs, and portable display apparatuses. Most of the LCD devices currently used are TN (twisted nematic) type LCD devices (hereinafter, referred to as "TN LCD devices"). A TN LCD device includes a liquid crystal layer sandwiched between a pair of substrates located opposite to each other. The liquid crystal layer includes liquid crystal molecules therein. The orientation direction of the liquid crystal molecules is changed by an electric field and thus the birefringence of the liquid crystal layer is changed, thereby performing display.

FIG. 1 is a partial cross sectional view of a liquid crystal panel of a conventional TN LCD device. The liquid crystal panel is an element which performs actual display in an LCD device. As is shown in FIG. 1, the liquid crystal panel includes a pair of substrates 131 and 132 located opposite to each other, and a liquid crystal layer 133 having liquid crystal molecules 133a disposed therebetween. The liquid crystal layer 133 includes liquid crystal molecules 133a therein. The substrate 131 includes a base 131a, an electrode 131b and an alignment layer 131c laminated in this order. The substrate 132 includes a base 132a, an electrode 132b and an alignment layer 132c laminated in this order. Initially, the liquid crystal molecules 133a are tilted at a pretilt angle δ relative to the substrates 131 and 132, and the orientation direction of the liquid crystal molecules 133a is twisted at approximately 90° from the substrate 132 to the substrate 131 (twist angle θt=90°). The alignment layers 131c and 132c are provided in order to put the liquid crystal molecules in such an initial orientation direction. For the alignment layers, polyimide treated by rubbing is widely used.

When a voltage is applied to each of the electrodes 131b and 132b, an electric field is applied in a direction perpendicular to the substrates 131 and 132. The liquid crystal molecules 133a are erected by the dielectric anisotropy thereof to be parallel to the direction of the electric field. Thus, the birefringence of the liquid crystal layer 133 is changed. If the liquid crystal molecules 133a are perpendicular to the direction of the electric field (pretilt angle=0°), the liquid crystal molecules 133a are erected in different directions. Therefore, the liquid crystal layer 133 is divided into a plurality of domains. The liquid crystal molecules 133a included in the same domain are erected in the same direction, and the direction of erection is different domain by domain. As a result, an interface between two adjacent domains is recognized as a disclination line, which scatters light. The state in which such a disclination line is generated is referred to as "reverse tilt". In the normally white mode (hereinafter, referred to as the "NW mode"), where the light transmittance is maximum when no voltage is applied, the disclination line reduces the contrast of displayed images. In order to prevent generation of the disclination line, the liquid crystal molecules 133a are tilted at the pretilt angle as is shown in FIG. 1.

FIG. 2 is a diagram showing initial orientation directions of the liquid crystal molecules 133a in the liquid crystal panel shown in FIG. 1 seen from top of the substrate 132. In FIG. 2, vector a represents the rubbing direction of the alignment layer 132c, and vector b represents the rubbing direction of the alignment layer 131c. The liquid crystal molecules 133a in the vicinity of the alignment layers 131c and 132c are oriented along the respective rubbing directions (vectors a and b in FIG. 2) with the pretilt angle δ. The rubbing directions a and b make an angle of 90°, which provides a twist angle θt=90°. Since the liquid crystal molecules 133a have a twist angle of 90° as is described above, the liquid crystal molecules 133a in a central area in the thickness direction of the liquid crystal layer are oriented in the direction indicated by vector c in FIG. 2 with the pretilt angle δ relative to the substrates 131 and 132. The liquid crystal molecules are directed toward the substrate 132 (top substrate) in the direction indicated by vector c.

Vector c represents a direction in which the liquid crystal molecules 133a in the central area are oriented (referred to as the "reference orientation direction"). The reference orientation direction (vector c in FIG. 2) is a two-dimensional concept in a plane of the substrate. The dashed line represents a plane perpendicular to vector c and bisecting the liquid crystal panel. In this specification, a viewing angle or direction which is right with respect to the dashed line (FIG. 2) will be referred to as "positive", and a viewing angle (θv in FIG. 1) or direction which is left with respect to the dashed line will be referred to as "negative". As is understood from FIG. 2, the reference orientation direction (c) bisects the twist angle θt. The direction opposite to the reference orientation direction will be referred to as the "reference viewing direction v". The reference viewing direction v is included in the positive viewing directions.

Further in this specification, orientation directions of the liquid crystal molecules will be indicated using a hypothetical clock face. In detail, where the liquid crystal panel is located in the usual direction for viewers, the top part of the liquid crystal panel will be referred to as "12 o'clock", and the bottom part will be referred to as "6 o'clock". The reference orientation direction of the liquid crystal molecules will be represented in this manner. For example, the liquid crystal layer 133 shown in FIGS. 1 and 2 has the 3 o'clock reference orientation direction (vector c), provided FIG. 2 shows the liquid crystal panel in the usual direction for the viewers.

In TN LCD devices including liquid crystal molecules in the above-described orientation direction, the contrast of displayed images are different in accordance with the viewing angle. FIG. 3 is a graph illustrating the light transmittance of a liquid crystal panel of a TN LCD device as a function of the viewing angle. In FIG. 3, the horizontal line represents the viewing angle (θv in FIG. 1), and the vertical line represents the light transmittance. A plurality of curves in FIG. 3 are obtained by different levels of the applied voltage. As is appreciated from FIG. 3, when the viewing angle is 0° (perpendicular to the liquid crystal panel) or in the vicinity thereof, display of different tones between a white display to a black display can be realized by controlling the voltage. When the viewing angle of 10° or more, the phenomenon referred to as "inversion" in which the tones of the images are inverted occurs. When the viewing angle is negative, the minimum transmittance increases as the absolute value of the viewing angle increases, thereby drastically reducing the contrast.

FIG. 4 is a graph illustrating the influence of the viewing angle on the voltage vs. transmittance curve (hereinafter, referred to as the "V-T" curve) in an LCD device of the NW mode. Curve L1 is obtained when the viewing angle is 0°. As the viewing angle is shifted positive, the V-T curve is shifted left (curve L2). When the applied voltage exceeds a certain level, the transmittance increases. In other words, the contrast of displayed images is inverted at a certain viewing angle. Such a phenomenon occurs because the apparent birefringence changes in accordance with the viewing angle. In the case where the viewing angle is fixed, such a phenomenon occurs when the applied voltage changes.

The above-described phenomenon will be explained with reference to FIGS. 5A through 5C. FIGS. 5A through 5C schematically show that the apparent birefringence of the liquid crystal panel seen from a positive viewing angle changes in accordance with the applied voltage. When the applied voltage is 0 V or relatively low, as is shown in FIG. 5A, the liquid crystal molecule 133a in the central area of the liquid crystal panel seems to be elliptical for a viewer at position 37 looking at the liquid crystal panel with a positive viewing angle. Namely, the apparent birefringence $\Delta n > 0$. As the applied voltage is gradually increased, the liquid crystal molecule 133a in the central area is tilted toward the direction of the electric field. Thus, as is shown in FIG. 5B, the liquid crystal molecule 133a seems to be circular for the viewer at position 37. At this point, the apparent birefringence $\Delta n = 0$, and thus the light transmittance is raised. As the applied voltage is further increased, the liquid crystal molecule 133a in the central area becomes almost parallel to the direction of the electric field. Thus, the liquid crystal molecule 133a seems to be elliptical again for the viewer at position 37. Namely, the apparent birefringence $\Delta n > 0$. Since the apparent birefringence ($\Delta n$) changes in accordance with the tilt angle of the liquid crystal molecule 133a in this manner, inversion occurs at a certain viewing angle.

Returning to FIG. 4, when the viewing angle is negative, inversion does not occur. However, when the absolute value of the negative viewing angle increases, the V-T curve is shifted right and is slow as is indicated by curve L3; that is, the contrast is drastically reduced.

Proposals for solving the problems of inversion and the reduction in contrast have been made in, for example, Japanese Laid-Open Patent Publication Nos. 60-211425 and 60-147722.

In Japanese Laid-Open Patent Publication No. 60-211425, the alignment layers are rubbed in different directions for different pixels to provide different T-V curves for the different pixels. Since the liquid crystal panel obtained in this manner has a plurality of different T-V characteristics, inversion in the positive viewing direction and the reduction in contrast in the negative viewing angle are alleviated.

In Japanese Laid-Open Patent Publication No. 60-147722, the alignment layers are rubbed in an arc to generate various reference orientation directions in a liquid crystal panel in an attempt of avoiding inversion and the reduction in contrast.

By the above-mentioned two methods, the problems are not sufficiently solved.

Japanese Laid-Open Patent Publication No. 5-107544 discloses still another technology for solving the dependence of the display characteristics on the viewing angle. In this reference, as is shown in FIG. 6, a plurality of liquid crystal regions having different reference orientation directions (indicated by the arrows c) are formed in each of a plurality of pixels. Each pixel is divided into, for example, two or four rectangular regions having the same surface area, and the reference orientation directions of adjacent regions are opposite to each other. In the case of a TN mode, the twist angle is set to be 90°.

FIG. 7 illustrates the light transmittance as a function of the viewing angle obtained in the LCD device disclosed in Japanese Laid-Open Patent Publication No. 5-107544. As is appreciated from FIG. 7, inversion in the positive viewing direction is alleviated, but the contrast is drastically reduced as the absolute value of the viewing angle is increased.

The technologies similar to the technology disclosed in Japanese Laid-Open Patent Publication No. 5-107544 are described in K. Takatori et al., Proceedings of Japan Display '92, pp. 591–594 and K. Kamada et al., Proceedings of Japan Display '92, p. 886. According to the technology described in pp. 591–594 of the above-mentioned publication, after the alignment layer is rubbed in one direction, a part of the alignment layer is covered with a resist and then rubbed in an opposite direction, thereafter removing the resist. As a result, the liquid crystal molecules corresponding to the part covered by the resist have a different reference orientation direction from that of the liquid crystal molecules in the part not covered by the resist. Such a method is referred to as the "twice rubbing method".

According to the technology described on p. 886 of the above-mentioned publication, alignment layers formed of different polyimide materials are located side by side and rubbed in the same direction. As a result, the liquid crystal molecules in positional correspondence with and in the vicinity of the respective alignment layers are tilted at different pretilt angles. Such a method is referred to as the "alignment layer patterning method".

In Japanese Laid-Open Patent Publication No. 60-211424, Complementary TN (CTN)—TN with a wider range of viewing angles—, Technical Report of The Institute of Electronics, Information and Communication Engineers (Japan), EID92-112, ED92-145, pp. 35–41, February 1993, and Japanese Laid-Open Patent Publication No. 5-188374, a method for dividing a pixel into a plurality of regions having different reference orientation directions and the like are disclosed.

These methods have the same problems as the method disclosed in Japanese Laid-Open Patent Publication No. 5-107544.

In Japanese Laid-Open Patent Publication No. 3-230120, a method using a compensation plate in order to partially change the viewing angle for the purpose of improving the contrast obtained at a certain viewing angle is disclosed. By this method, the viewing angle cannot be expanded in both the positive and the negative sides.

SUMMARY OF THE INVENTION

A liquid crystal display device according to the present invention includes a pair of substrates; a liquid crystal layer sandwiched between the pair of substrates; and an electrode for applying a voltage to the liquid crystal layer. The liquid crystal layer includes a plurality of regions having different twist angles from one another.

In one embodiment of the invention, the plurality of regions have an identical reference orientation direction which is a direction of a liquid crystal molecule in a central area in the thickness direction of the alignment layer, and the plurality of regions are arranged perpendicular to the reference orientation direction.

In one embodiment of the invention, the twist angles in the plurality of regions increase along the reference orientation direction in a step-like manner.

In one embodiment of the invention, the twist angle has a minimum value in the range between 50° and 75° inclusive and a maximum value in the range between 85° and 105° inclusive.

In one embodiment of the invention, the reference orientation direction is set to interpose a viewing angle between the reference orientation direction and a direction perpendicular to the substrates.

According to another aspect of the invention, a liquid crystal display device includes a pair of substrates; a liquid crystal layer sandwiched between the pair of substrates and including liquid crystal molecules; and an electrode layer for applying a voltage to the liquid crystal layer. The electrode layer includes a plurality of areas, and each of the areas and an area of the liquid crystal layer in positional correspondence with the each of the areas of the electrode layer are included in a pixel. The liquid crystal layer includes a plurality of regions in the pixel, the plurality of regions having different reference orientation directions. The plurality of regions occupy different ratios of a surface area of the pixel.

In one embodiment of the invention, the plurality of regions are two regions including the liquid crystal molecules having opposite reference orientation directions, and a surface area of one of the two regions occupies a ratio in the range of more than 50% and less than 90% with respect to the surface area of the pixel.

In one embodiment of the invention, at least one of the plurality of regions has a twist angle in the range of more than 90° and not more than 110°.

In one embodiment of the invention, the plurality of regions have a border therebetween which is curved when seen at an angle perpendicular to the substrates.

According to still another aspect of the invention, a liquid crystal display device includes a pair of substrates; a liquid crystal layer sandwiched between the pair of substrates and including liquid crystal molecules; an electrode layer for applying a voltage to the liquid crystal layer; and an electrode line provided on at least one of the substrates. The electrode layer includes a plurality of areas, and each of the areas and an area of the liquid crystal layer in positional correspondence with the each of the areas of the electrode layer are included in a pixel, and the pixels are arranged in a matrix. The liquid crystal layer includes a plurality of regions in the pixel, the plurality of regions having different reference orientation directions. The reference orientation directions are set so that the liquid crystal molecules in an area surrounding the pixel in the vicinity of the substrate which has the electrode line are pretilted in an identical direction with a direction in which the liquid crystal molecules are erected by an electric field generated by the electrode line.

In one embodiment of the invention, the reference orientation directions are set so that the liquid crystal molecules in an area surrounding the pixel in a central area in a thickness direction of the liquid crystal layer are pretilted in an identical direction with a direction in which the liquid crystal molecules are erected by an electric field generated by the electrode line.

In one embodiment of the invention, the plurality of regions have a border crossing the reference orientation directions thereof.

In one embodiment of the invention, the border is a diagonal line of the pixel having a substantially rectangular shape.

According to still another aspect of the invention, a liquid crystal display device includes a pair of substrates; a liquid crystal layer sandwiched between the pair of substrates and including liquid crystal molecules therein; and an electrode for applying a voltage to the liquid crystal layer. The liquid crystal molecules in the vicinity of one of the pair of substrates and the liquid crystal molecules in the vicinity of the other substrate have different pretilt angles.

In one embodiment of the invention, one of the pretilt angles is in the range between 0° and 5° inclusive, and the other pretilt angle is in the range between 10° and 80° inclusive.

In one embodiment of the invention, the liquid crystal display device further includes an alignment layer sandwiched between one of the pair of substrates and the liquid crystal layer and another alignment layer sandwiched between the other substrate and the liquid crystal layer, wherein the alignment layers are formed of different materials.

In one embodiment of the invention, the alignment layers are formed of different polyimide materials.

In one embodiment of the invention, the liquid crystal display device further includes an alignment layer sandwiched between one of the pair of substrates and the liquid crystal layer and another alignment layer sandwiched between the other substrate and the liquid crystal layer. The alignment layers are formed by different alignment treatments.

According to still another aspect of the invention, a liquid crystal display device includes a pair of substrates; a liquid crystal layer sandwiched between the pair of substrates and including liquid crystal molecules; and an electrode layer for applying a voltage to the liquid crystal layer. The electrode layer includes a plurality of areas, and each of the areas and an area of the liquid crystal layer in positional correspondence with the each of the areas of the electrode layer are included in a pixel. The liquid crystal layer includes a plurality of regions in the pixel, the plurality of regions having different reference orientation directions. The liquid crystal layer includes a vertical orientation region between the plurality of regions, the vertical orientation region including the liquid crystal molecules oriented vertically with respect to the substrates.

In one embodiment of the invention, the liquid crystal display device further includes an alignment layer sandwiched between one of the pair of substrates and the liquid crystal layer and another alignment layer sandwiched between the other substrate and the liquid crystal layer, wherein the alignment layers are formed of an organic polymer.

In one embodiment of the invention, the organic polymer mainly includes an organic polymer selected from the group consisting of polyimide, polyamide, polystyrene, polyamideimide, epoxy acrylate, spirane acrylate and polyurethane.

In one embodiment of the invention, the liquid crystal display device is a twisted nematic type and is operated in a normally white mode.

According to still another aspect of the invention, a liquid crystal display device includes a pair of substrates; a liquid crystal layer sandwiched between the pair of substrates and including liquid crystal molecules; an alignment layer sandwiched between one of the pair of substrates and the liquid crystal layer and another alignment layer sandwiched between the other substrate and the liquid crystal layer; and an electrode layer for applying a voltage to the liquid crystal layer. The electrode layer includes a plurality of areas, and each of the areas and an area of the liquid crystal layer in positional correspondence with the each of the areas of the electrode layer are included in a pixel. At least one of the alignment layers includes a horizontal orientation area having a property for aligning the liquid crystal molecules horizontally with respect to the substrates and a vertical orientation area having a property for aligning the liquid crystal molecules vertically with respect to the substrates.

In one embodiment of the invention, at least one of the alignment layers includes a plurality of vertical orientation areas scattered therein.

In one embodiment of the invention, the vertical orientation area has a shape selected from the group consisting of a curved line, a straight line, and a combination of a curved line and a straight line.

In one embodiment of the invention, each of the pixels has the vertical orientation area.

In one embodiment of the invention, the liquid crystal display device further includes a black mask having a light blocking area. The light blocking area is located in positional correspondence with the vertical orientation area.

In one embodiment of the invention, a surface area of the vertical orientation area is not more than 50% with respect to a total surface area of the pixels.

According to still another aspect of the invention, a method for producing a liquid crystal display device includes the steps of forming an electrode on a substrate and forming another electrode on another substrate; forming alignment layers respectively on the substrates so as to cover the electrodes; performing alignment treatment of the alignment layers so as to form a plurality of regions in each of pixels, the plurality of regions having different reference orientation directions; and forming a vertical orientation area having a property for aligning the liquid crystal molecules vertically with respect to the substrates in a prescribed part of at least one of the alignment layers.

In one embodiment of the invention, the step of forming the vertical orientation area includes the step of radiating light to the prescribed part.

In one embodiment of the invention, light radiated in the step of radiating light is selected from the group consisting of ultraviolet, visible light, and infrared.

In one embodiment of the invention, the light radiated in the step of radiating light is a laser beam.

In one embodiment of the invention, the step of forming the vertical orientation area includes the step of radiating an energy beam selected from the group consisting of an electron beam, an ion beam and an X-ray to the prescribed part.

In one embodiment of the invention, the step of forming the vertical orientation area includes the step of performing surface treatment of the prescribed part using a material selected from the group consisting of a surface-active agent, an acid solution and a reactive gas.

In one embodiment of the invention, the step of forming the vertical orientation area includes the step of forming the prescribed part into a shape identical with a shape of a region in which the liquid crystal molecules are to be aligned vertically with respect to the substrates.

In one embodiment of the invention, the step of forming the vertical orientation area includes the steps of removing the prescribed part of at least one of the alignment layers; and forming another alignment layer in a part where the prescribed part has been removed.

According to still another aspect of the invention, a method for producing a liquid crystal display device includes the steps of forming an electrode on a substrate and forming another electrode on another substrate; forming alignment layers having a property for aligning liquid crystal molecules horizontally with respect to the substrates respectively on the substrates so as to cover the electrodes; and forming a vertical orientation area having a property for aligning the liquid crystal molecules vertically with respect to the substrates in a prescribed part of at least one of the alignment layers.

Thus, the invention described herein makes possible the advantages of providing a liquid crystal display device having an improved viewing angle performance and a method for producing such a liquid crystal display device.

These and other advantages of the present invention will become apparent to those skilled in the art upon reading and understanding the following detailed description with reference to the accompanying figures.

BRIEF DESCRIPTION OF THE DRAWINGS

FIG. 14 is a partial cross sectional view of an LCD device in accordance with a fifth example of the present invention;

FIG. 15A is a top view of one pixel of the LCD device in accordance with fifth example illustrating the reference orientation direction;

FIG. 15B is a view showing the rubbing directions and the twist angle of the LCD device shown in FIG. 15A;

DESCRIPTION OF THE PREFERRED EMBODIMENTS

Hereinafter, the present invention will be described by way of illustrative examples with reference to the accompanying drawings.

EXAMPLE 1

In each of the first through third examples, an LCD device having improved viewing angle performance and thus realizing satisfactory and uniform display over the entire screen will be described. In each of the LCD devices in the first through third examples, a liquid crystal panel includes a plurality of regions. The twist angles of the regions are different in a step-like manner to uniformize the V-T curve over the entire screen when the viewer looks at the screen at any positive or negative viewing angle, for the purpose of realizing a uniform display over the entire screen of the liquid crystal panel.

Figure 4:
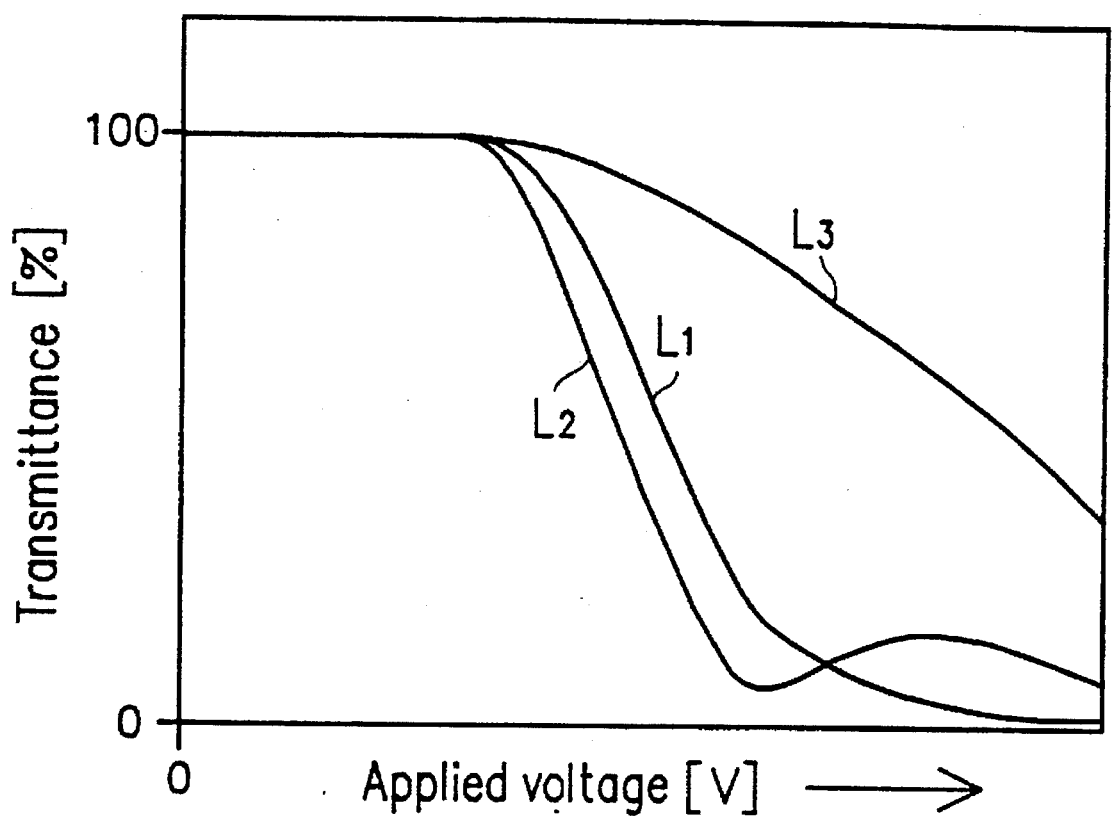
FIG. 4 is a graph illustrating the light transmittance as a function of the voltage applied to a conventional TN LCD device.
Figure 5A:
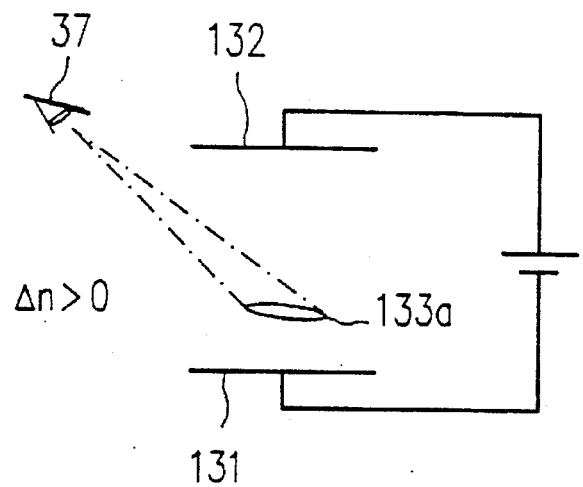
FIGS. 5A through 5C are schematic illustrations showing dependence of the viewing angle performance on the voltage applied to a conventional TN LCD device.
Figure 5B:
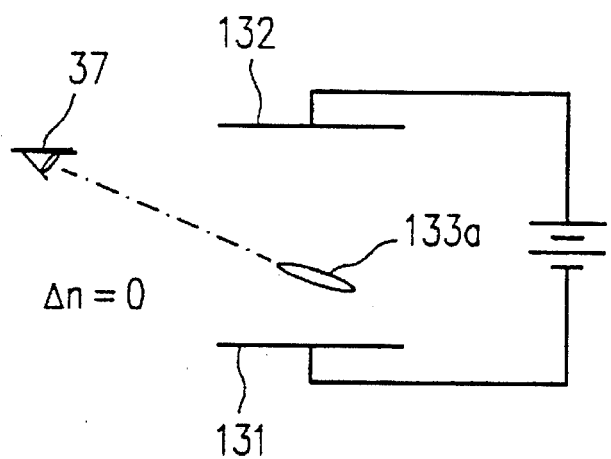
Figure 5C:
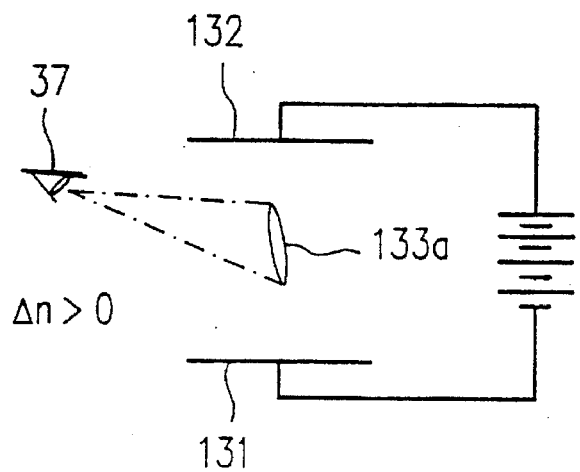
Figure 6:
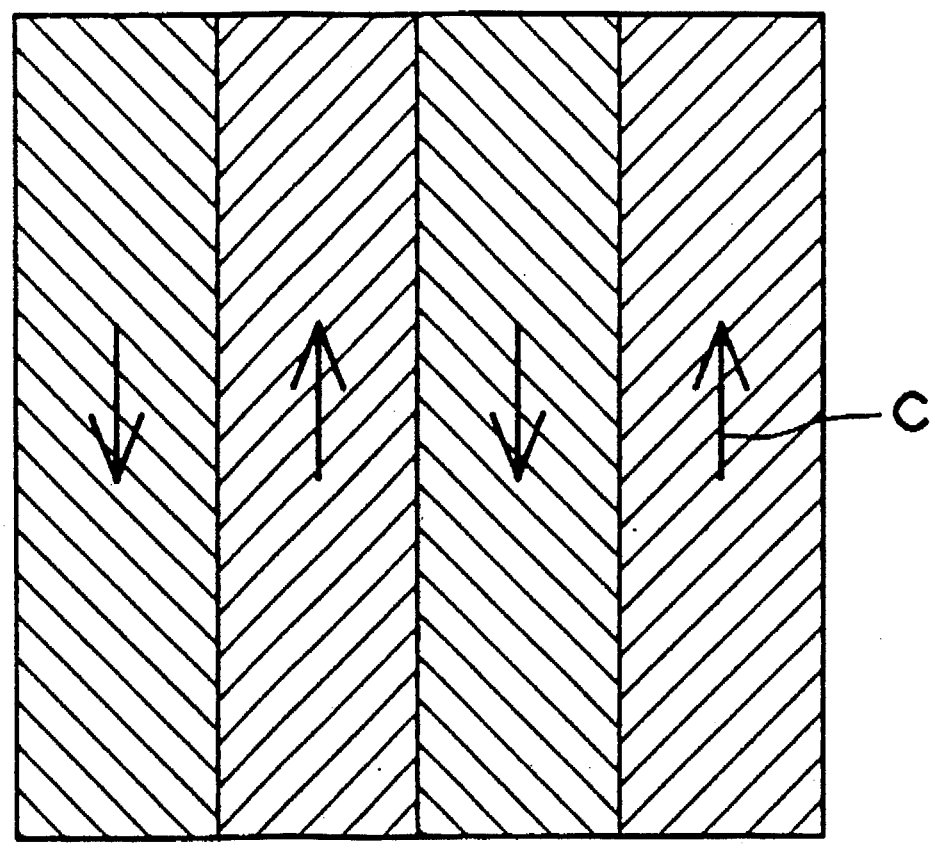
FIG. 6 is a top view of one pixel of a conventional TN LCD device.

In an LCD device having a large screen, a viewer at a fixed position looks at different areas of the screen with different viewing angles. For this reason, one liquid crystal panel has a plurality of V-T curves as indicated by L1 and L2 in FIG. 4.

Figure 8:
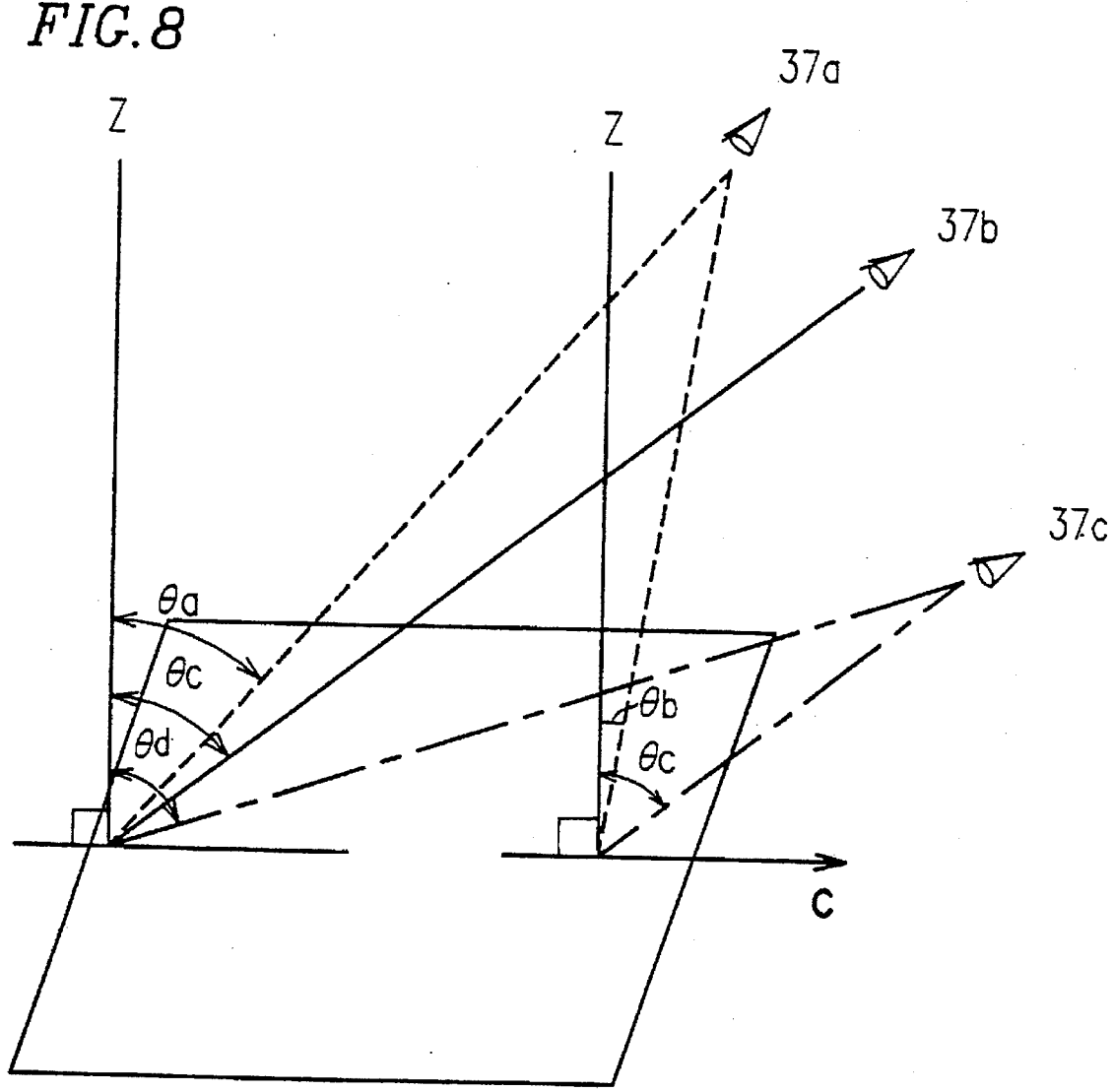
FIG. 8 is a view showing viewing angles with respect to an LCD device.

Such a phenomenon will be described with reference to FIG. 8. In FIG. 8, line Z indicates a line perpendicular to the liquid crystal panel. The liquid crystal panel shown in FIG. 8 has a 6 o'clock reference orientation direction c. A viewing angle θa when a viewer at position 37a looks at a top part of the screen is different from a viewing angle θb when the viewer at position 37a looks at a bottom part of the screen; that is θa>θb. A viewing angle θd when a viewer at position 37c looks at a top part of the screen is different from a viewing angle θc when the viewer at position 37c looks at a bottom part of the screen; that is θd>θc. When the viewer at a fixed position looks at different areas of the screen with different viewing angles, the screen has a plurality of V-T curves. Accordingly, a uniform display cannot be obtained. Suppose, for example, in the case that the viewer looks at the screen in the positive viewing direction, inversion occurs at the viewing angle $\theta c$ (>$\theta a$>$\theta b$). While the viewer moves from position 37a to 37c, he recognizes inversion in the image in the top part of the screen when reaching position 37b. When he reaches position 37c, he recognizes the image in the bottom part of the screen is also inverted. In the case when the viewer looks at the screen in a negative viewing direction, while the absolute value of the viewing angle increases, he recognizes reduction in contrast of the image first in the bottom part of the screen and finally in the top part of the screen.

In order to prevent such a phenomenon, the twist angles of the liquid crystal material in different regions of the liquid crystal panel are appropriately set so that the viewer does not recognize inversion in the top part of the screen at position 37b but recognizes inversion over the entire screen when reaching position 37c. In this manner, uniform display in the entire screen can be obtained.

When different regions of one liquid crystal panel have different twist angles, such different regions have different V-T curves. For example, in the case of FIG. 4, when the twist angle is decreased, the V-T curve is shifted right; and when the twist angle is increased, the V-T curve is shifted left. Accordingly, the positive viewing angle at which the highest contrast is obtained (hereinafter, referred to as the "optimum viewing angle") is narrow (small) when the twist angle is narrow and is wide (large) when the twist angle is wide.

Utilizing such a principle, the twist angle in the top part of the screen at which the viewer looks at a wider angle is decreased to decrease the optimum viewing angle, and the twist angle in the bottom part of the screen at which the viewer looks at a narrower angle is increased to increase the optimum viewing angle. In this manner, uniform display over the entire screen can be obtained.

Figure 9:
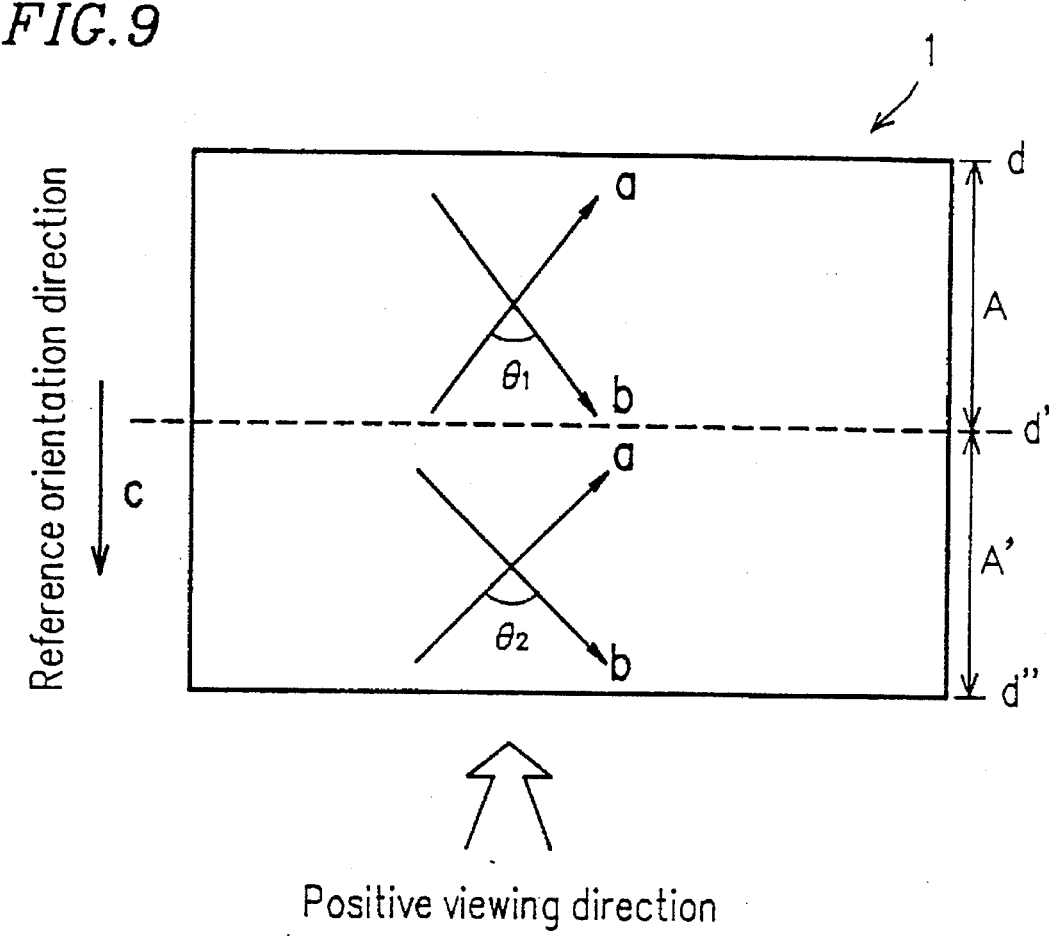
FIG. 9 is a top view of an LCD device in accordance with a first example of the present invention.

FIG. 9 is a schematic plan view of a liquid crystal panel 1 of an LCD device in accordance with a first example of the present invention. The liquid crystal panel 1 includes a pair of transparent substrates located opposite to each other. Each of the substrates has a transparent electrode and an alignment layer on a surface thereof. A liquid crystal layer is sandwiched between the substrates. The liquid crystal panel 1 includes two regions, namely, region A from a top perimeter d to a center line d' and region A' from the center line d' to a bottom perimeter d". The ratio between regions A and A' is 1:1. Regions A and A' have the same reference orientation direction c, which is set at 6 o'clock. The center line d' is perpendicular to the reference orientation direction. Angle $\theta 1$ made by rubbing direction a of one of the alignment layers and rubbing direction b of the other alignment layer in region A is different from angle $\theta 2$ made by rubbing direction a and rubbing direction b in region A'; that is $\theta 1$=75° and $\theta 2$=90°. The twisting direction (right or left) of the orientation direction of the liquid crystal molecules is controlled by the type of chiral agent added to the TN liquid crystal material.

In the liquid crystal panel 1 having such a structure, the twist angle $\theta 1$ in region A (=75°) is narrower than the twist angle of $\theta 2$ in region A' (=90°). Accordingly, the optimum viewing angle in region A is narrower than the optimum viewing angle in region A'.

As a result, inversion in the positive viewing direction is solved. The above-described technology is also effective in suppressing the contrast reduction in the negative viewing direction. Thus, a uniform display over the entire screen can be obtained.

EXAMPLE 2

Figure 10A:
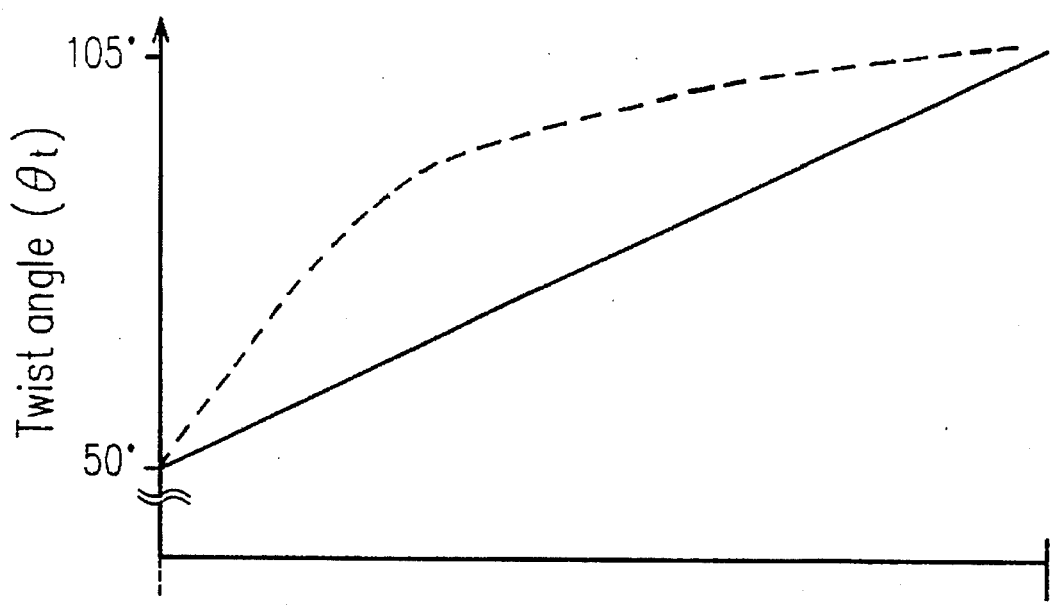
FIGS. 10A and 10B are diagrams illustrating the twist angle in accordance with the position of an LCD device in a second example of the present invention.
Figure 10B:
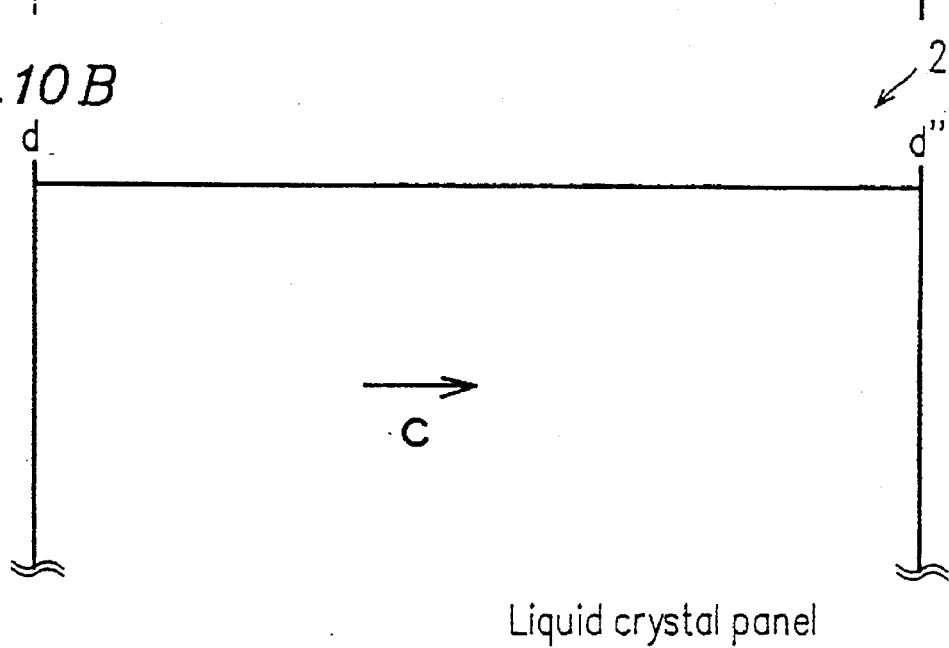

With reference to FIGS. 10A and 10B, an LCD device in accordance with a second example of the present invention will be described. FIG. 10B is a top view of a liquid crystal panel 2 of the LCD device in accordance with the second example. FIG. 10A is a graph illustrating the twist angle of the liquid crystal panel 2 in accordance with the position between the top perimeter d and the bottom perimeter d" of the liquid crystal panel 2. The liquid crystal panel 2 has a 6 o'clock reference orientation direction c, and includes a plurality of regions (not shown) between the top perimeter d and the bottom perimeter d". The alignment layers are rubbed so that, as is indicated by the solid line in FIG. 10A, the twist angle in the region including the top perimeter d is 50°, changes by 1° in the subsequent regions, and is 105° in the region including the bottom perimeter d".

It is preferable that the twist angle in the region including the top perimeter d is in the range of between 50° to 75° inclusive, changes by a prescribed degrees, for example, 1° in the subsequent regions, and is in the range between 85° and 105° inclusive in the region including the bottom perimeter d". If the twist angle in the region including the top perimeter d is less than 50°, the contrast of the images at the viewing angle perpendicular to the liquid crystal panel 2 ($\theta v$=0°) is drastically reduced, thereby deteriorating the display quality. If the twist angle in the region including the bottom perimeter d" is more than 105°, inversion occurs at the viewing angle of $\theta v$ of 0°.

In the liquid crystal panel 2 which includes more regions having different twist angles than the liquid crystal panel 1 in accordance with the first example, the change in the twist angle is smoother and thus better display quality can be obtained.

EXAMPLE 3

A liquid crystal panel in accordance with a third example of the present invention has a 6 o'clock reference orientation direction and includes a plurality of regions between the top perimeter d and the bottom perimeter d" (FIG. 10B). The alignment layers are rubbed so as to change the twist angle as is indicated by the dashed line in FIG. 10A.

The twist angle can be changed in any way which is suitable for the purpose of the LCD device.

In the first through third examples, the twist angles of different regions of the liquid crystal material are different in a step-like manner so that the entire liquid crystal panel has a uniform V-T curve when seen at any positive or negative viewing angle. As a consequence, inversion in the positive viewing direction and reduction in contrast in the negative viewing direction can be solved, and thus uniform display over the entire screen can be obtained.

EXAMPLE 4

A TN LCD device of a passive matrix type in accordance with a fourth example of the present invention will be described with reference to FIGS. 11 through 13. A liquid crystal panel 4 in the LCD device in accordance with the fourth example includes a plurality of regions having different reference orientation directions and different surface areas in each of a plurality of pixels.

Figure 11:
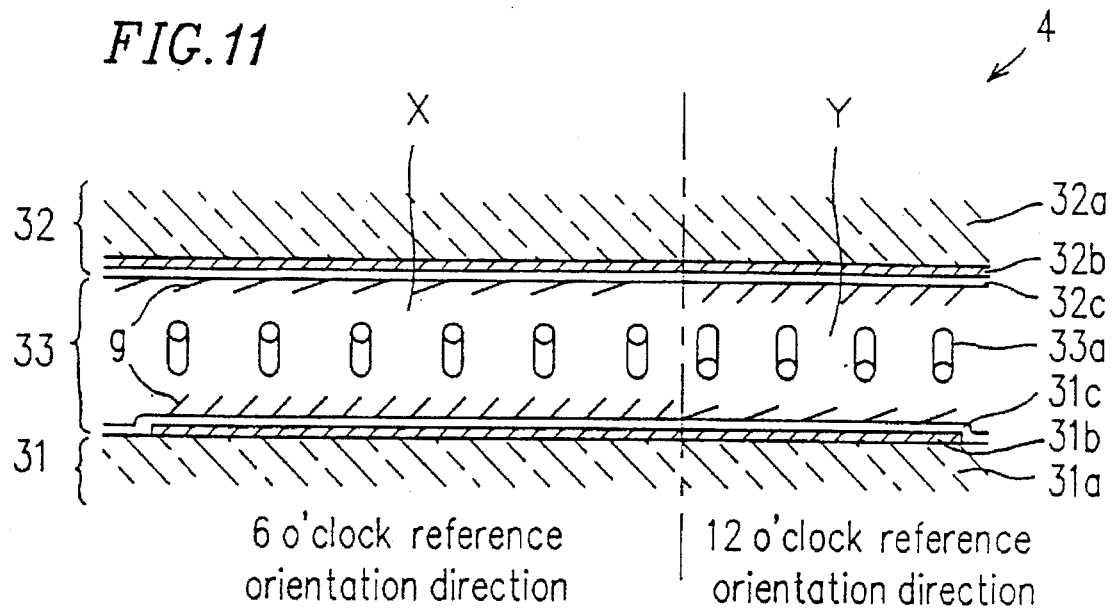
FIG. 11 is a partial cross sectional view of an LCD device in accordance with a fourth example of the present invention.

FIG. 11 is a cross sectional view of a liquid crystal panel 4 of a passive matrix LCD device in accordance with the fourth example. The liquid crystal panel 4 includes a bottom substrate 31 and a top substrate 32 sandwiching a liquid crystal layer 33 therebetween. The liquid crystal layer 33 includes liquid crystal molecules 33a therein. The bottom substrate 31 includes a base 31a formed of glass, silicon or the like, a plurality of strip-like electrodes 31b, and an alignment layer 31c. The alignment layer 31c is provided in contact with the liquid crystal layer 33 to define the orientation direction of the liquid crystal molecules 33a in the vicinity thereof. The electrodes 31b are located in parallel to each other. The top substrate 32 includes a base 32a formed of glass, silicon or the like, a plurality of strip-like electrodes 32b, and an alignment layer 32c. The alignment layer 32c is provided in contact with the liquid crystal layer 33 to define the orientation direction of the liquid crystal molecules 33a in the vicinity thereof. The electrodes 32b are located in parallel to each other and perpendicular to the electrodes 31b. Intersections of the electrodes 31b and 32b are each included in a pixel.

The substrates 31 and 32 are sealed at a perimeter thereof by a resin or the like, and at least one of the substrates 31 and 32 includes a peripheral circuit such as a driving circuit outside a display area.

The alignment layers 31c and 32c are formed of polyimide or the like and are treated by rubbing in a manner described later.

Figure 12A:
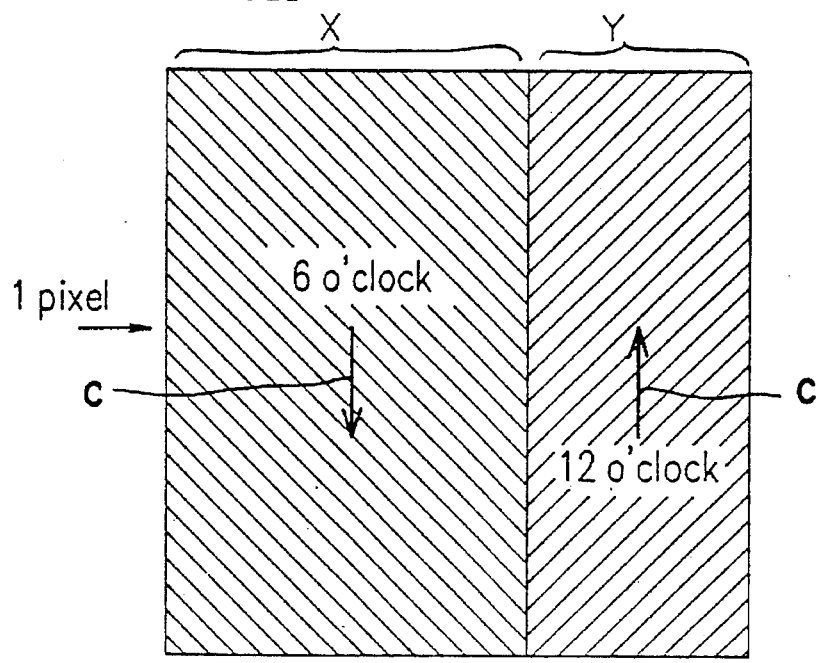
FIG. 12A is a top view of one pixel of the LCD device in accordance with the fourth example illustrating the reference orientation direction.
Figure 12B:
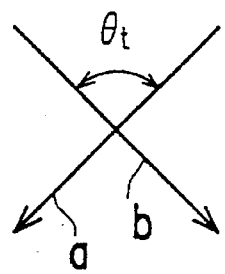
FIG 12B is a view showing the rubbing directions and the twist angle of the LCD device shown in FIG. 12A.

FIG. 12A is a plan view of one pixel of the liquid crystal panel 4 showing the reference orientation directions of the liquid crystal molecules therein. As is shown in FIG. 12A, one pixel includes two regions X and Y having different reference orientation directions (arrow c), namely, the 6 o'clock reference orientation direction and 12 o'clock reference orientation direction. In FIG. 12B, arrows a and b indicate rubbing directions of the alignment layers 31c and 32c, respectively. The angle θt between arrows a and b is the twist angle in the liquid crystal layer 33. Regions X and Y have different surface areas.

In such a structure, in the region which is more frequently used (in this case, region X), inversion in the positive viewing direction is prevented while maintaining high contrast in the positive viewing direction. Preferably, the ratio of the surface area α of region X with respect to the entire surface area of the pixel is 50%<α<90%. More preferably, the above-mentioned ratio is 55%<α<85% in order to obtain effects in the range of the viewing angles between −20° and 20° which is usually used. Especially in the case of a monitor of a computer, where the viewing angle is not fixed, the above-mentioned ratio is preferably 75%<α<85% in order to enhance the contrast.

Figure 7:
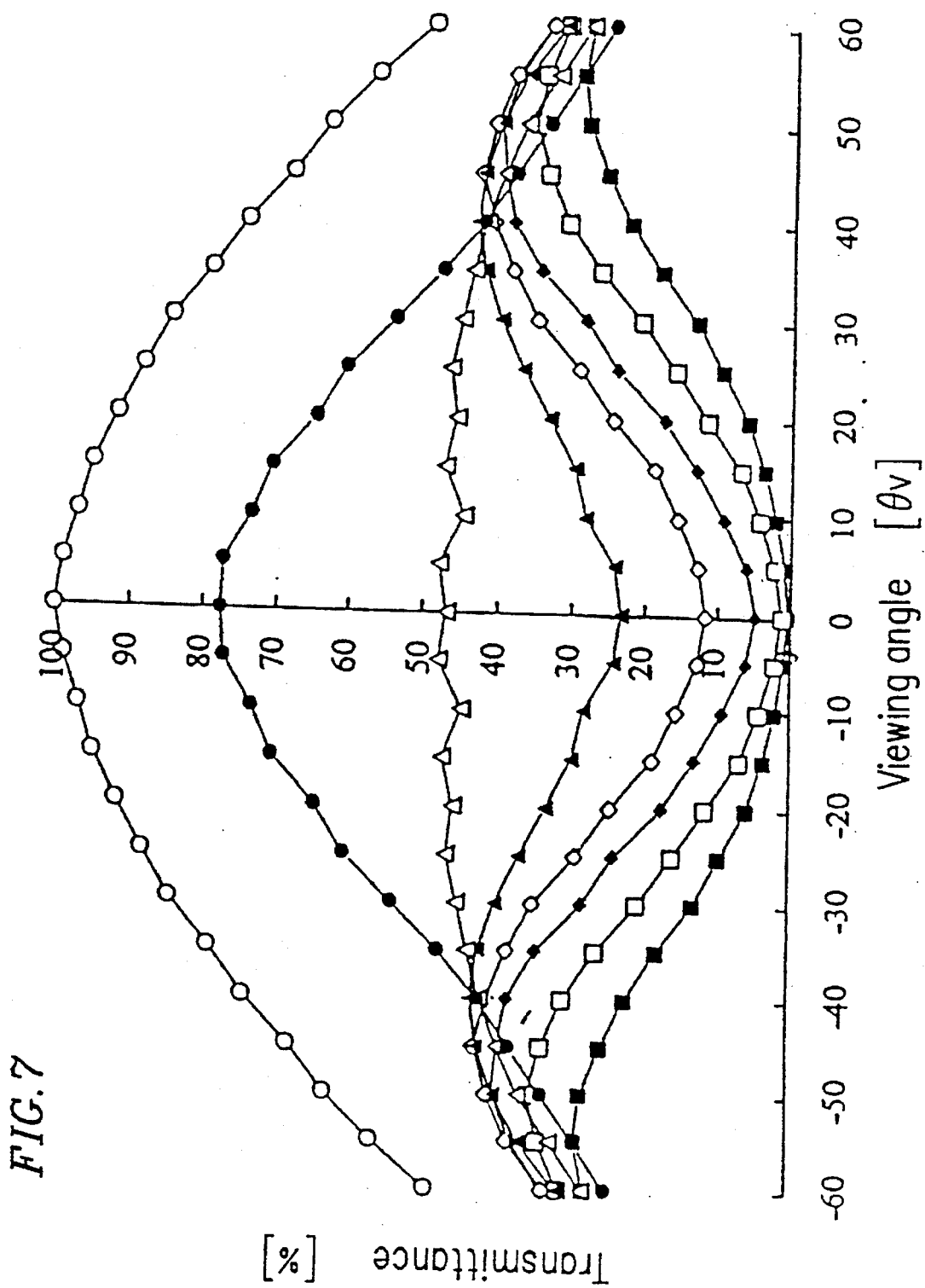
FIG. 7 is a graph illustrating dependence of the light transmittance on the viewing angle of the conventional TN LCD device shown in FIG. 6.

If one pixel is divided into a plurality of regions having the same surface area, as is shown in FIG. 7, as the absolute value of the viewing angle increases, where two regions having opposite reference orientation directions have the same surface area, the characteristics in the negative viewing direction are predominant.

In producing a plurality of regions having different reference orientation directions, the phenomenon that the pretilt angle of the liquid crystal molecules is reduced by ultraviolet (hereinafter, referred to as "UV") radiation is utilized. The UV radiation is performed in any step after coating the alignment layers 31c and 32c.

A production method for the liquid crystal panel 4 will be described with reference to FIGS. 11, 12A and 12B. In FIG. 11, the angles between lines g and the alignment layers 31c and 32c indicate the pretilt angles of the liquid crystal molecules 33a in the vicinity of the alignment layers 31c and 32c, but lines g do not indicate the orientation direction of the liquid crystal molecules 33a. The liquid crystal molecules 33a in a central area of the liquid crystal layer 33 are tilted at an average initial pretilt angle as is shown in FIG. 11.

Before assembling the substrates 31 and 32, the alignment layers 31c and 32c are respectively rubbed in the directions indicated by arrows a and b in both regions X and Y, using, for example, a burnishing cloth. Next, an area of the alignment layer 31c in positional correspondence with region X is covered with a mask pattern, and then an area of the alignment layer 31c in positional correspondence with region Y is exposed to the UV radiation. An area of the alignment layer 32c in positional correspondence with region Y is covered with a mask pattern, and then an area of the alignment layer 32c in positional correspondence with region X is exposed to the UV radiation.

In this manner, the liquid crystal molecules 33a in the vicinity of the same alignment layer but in different regions have different pretilt angles. Further, the liquid crystal molecules 33a in the same region but in the vicinity of the different alignment layers have different pretilt angles. Thus, the different regions in one pixel have different reference orientation directions. In the case that the alignment layers 31c and 32c are rubbed in the directions indicated by arrows a and b shown in FIG. 12B and the twist angle is as shown in FIG. 12B, the liquid crystal molecules 33a in the central area of the liquid crystal layer 33 have an initial pretilt angle of 0°. In the case that the pretilt angles of the liquid crystal molecules 33a in the vicinity of the alignment layers 31c and 32c are different, the initial pretilt direction of the liquid crystal molecules 33a in the central area is equal to the pretilt direction with the larger pretilt angle of the two. In the case shown in FIG. 11, the initial pretilt direction of the liquid crystal molecules 33a in the central area in region X is equal to the pretilt direction of the liquid crystal molecules 33a in the vicinity of the alignment layer 31c; and the initial pretilt direction of the liquid crystal molecules 33a in the central area in region Y is equal to the pretilt direction of the liquid crystal molecules 33a in the vicinity of the alignment layer 32c. As a result, the reference orientation directions in regions X and Y are opposite to each other.

Figure 1:
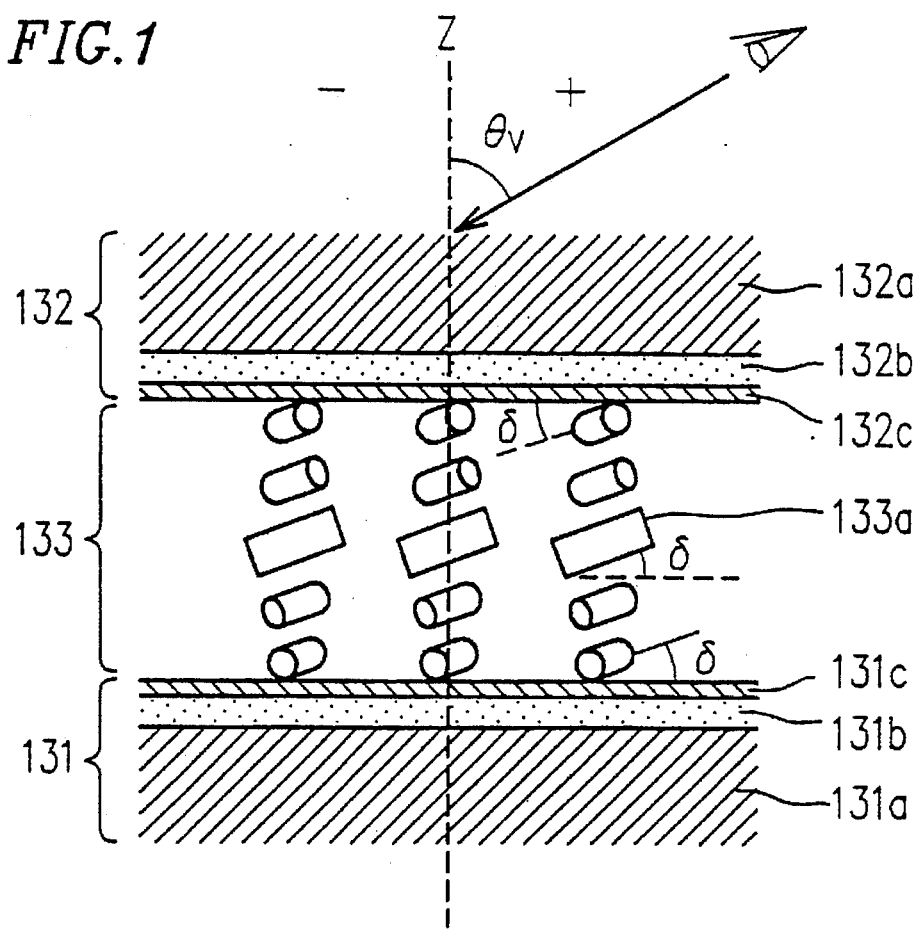
FIG. 1 is a partial cross sectional view of a conventional TN LCD device illustrating the orientation direction of liquid crystal molecules.
Figure 2:
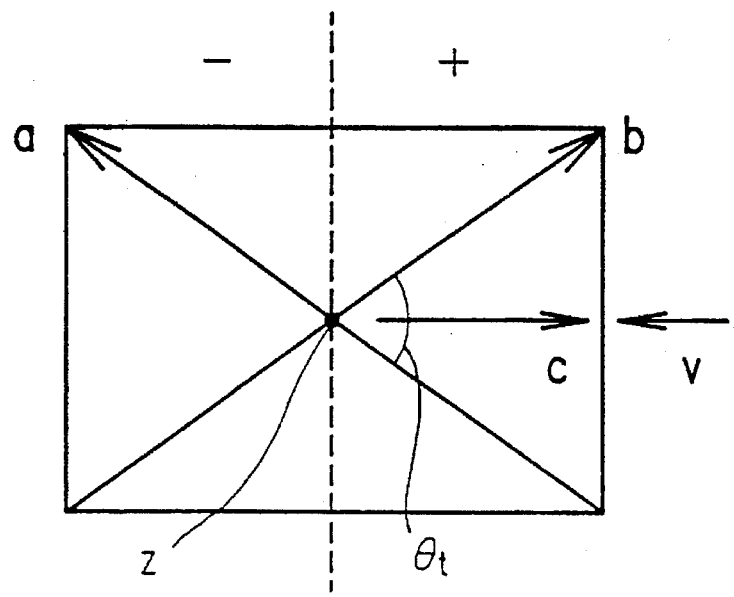
FIG. 2 is a plan view of the conventional TN LCD device shown in FIG. 1 illustrating the orientation direction of liquid crystal molecules.
Figure 3:
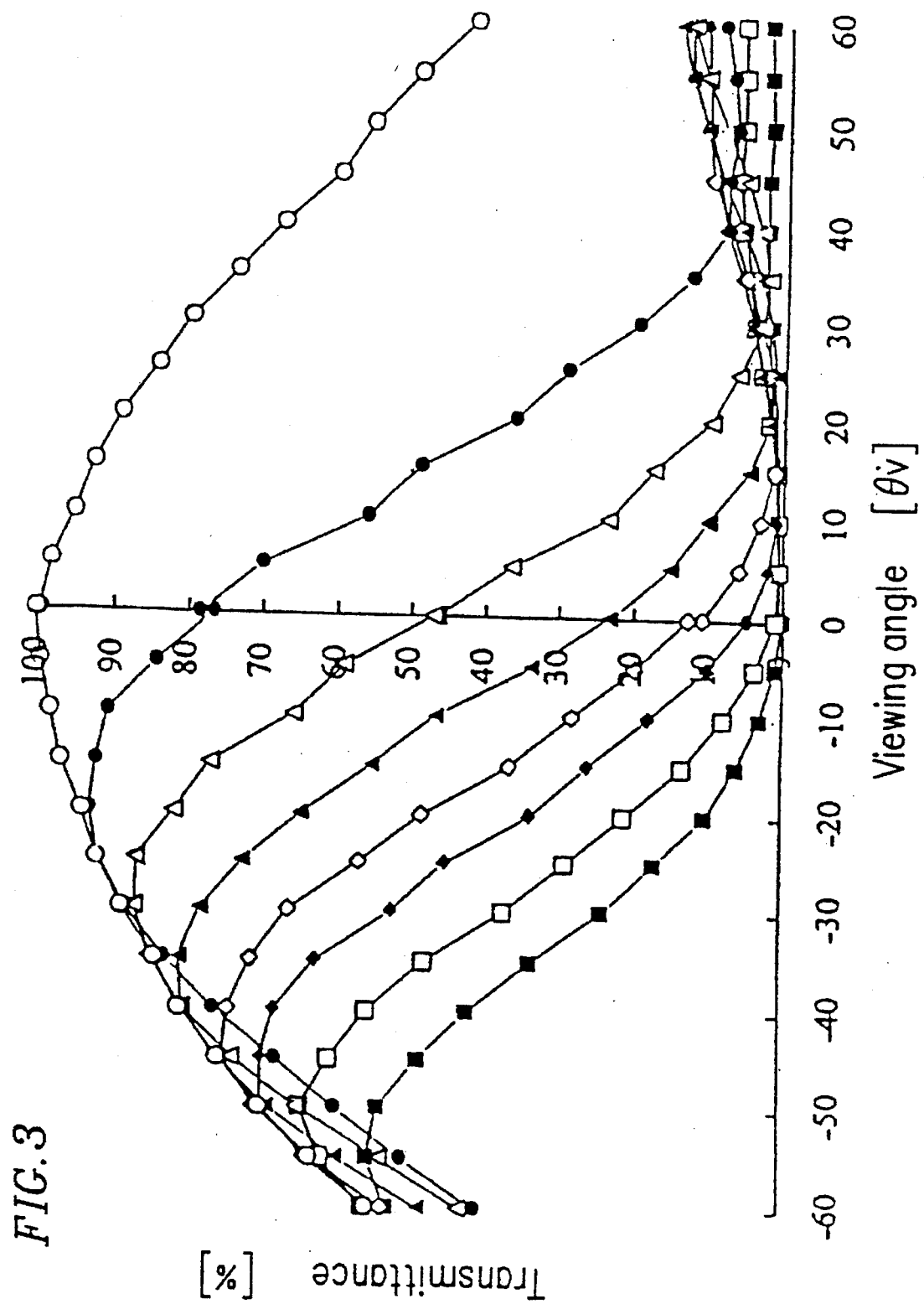
FIG. 3 is a graph illustrating dependence of the light transmittance on the viewing angle of a conventional TN LCD device.
Figure 13:
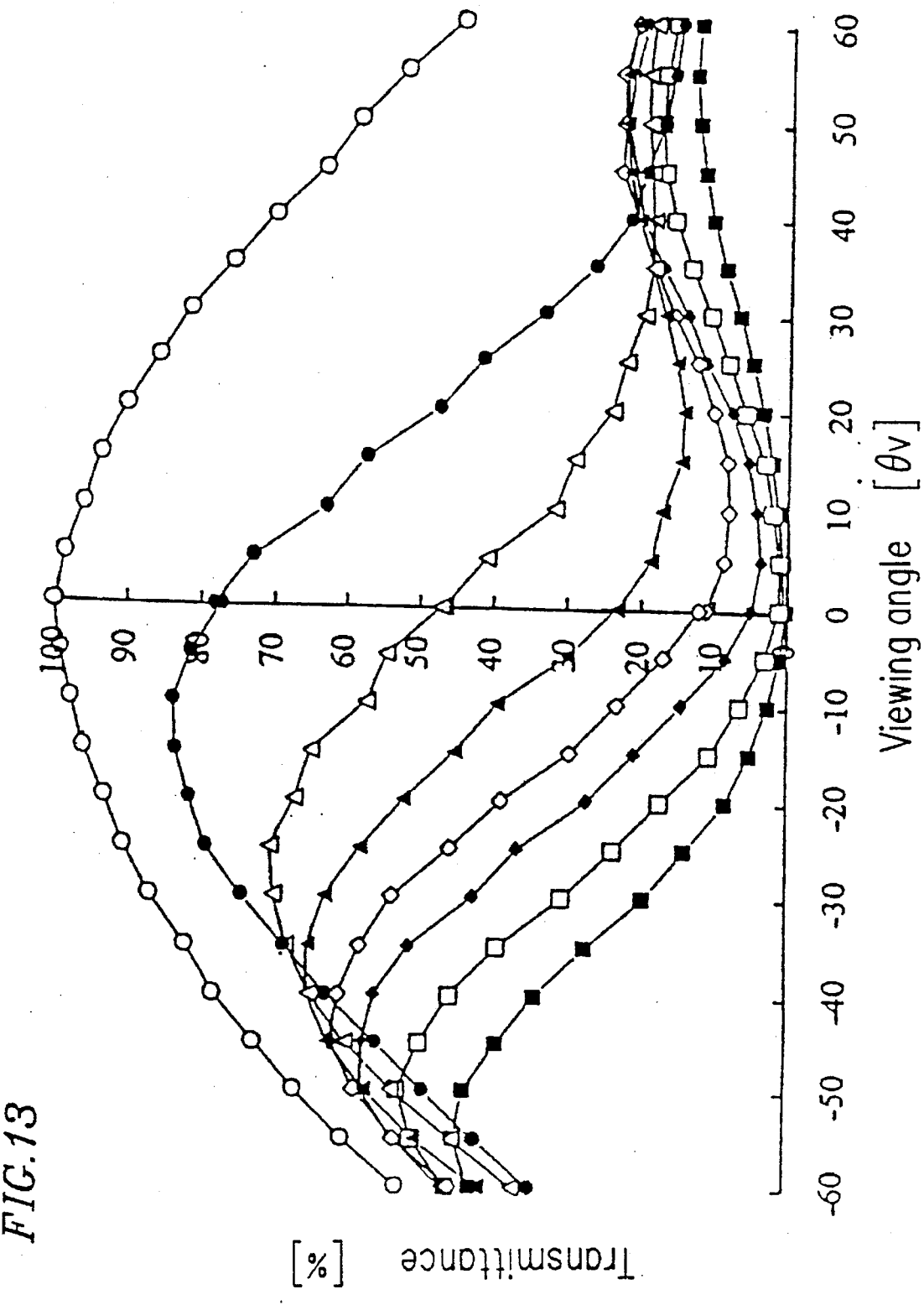
FIG. 13 is a graph illustrating dependence of the light transmittance on the viewing angle of the LCD device shown in FIG. 12.

FIG. 13 is a graph illustrating the transmittance as a function of the viewing angle obtained in the liquid crystal panel 4. Table 1 shows the range of viewing angles in which no inversion is recognized and the contrast between a white image and a black image is 10:1 or more in the LCD device having the liquid crystal panel 4 and the conventional LCD devices respectively presenting the characteristics shown in FIGS. 3 and 7.

TABLE 1

|  | LC panel 3 (Example 4) | Conventional (FIG. 3) | Conventional (FIG. 7) |
| --- | --- | --- | --- |
| 6 o'clock | 35° | 5° | 25° |
| 12 o'clock | 22° | 20° | 25° |

As is appreciated from FIG. 13 and Table 1, the range of the viewing angles at which satisfactory display is obtained can be expanded, and thus display quality is improved in the LCD device in the fourth example.

Although the alignment layers 31c and 32c are formed of polyimide in the fourth example, any other material can be used as long as the pretilt angle of the liquid crystal molecules can be changed by UV radiation. For the conditions of the light radiation, an optimum wavelength of light, for example, may be selected in accordance with the material of the alignment layers. If a laser is used, the pretilt angle can be controlled more efficiently.

The reference orientation direction of the liquid crystal molecules may be controlled by any other known method, such as oblique evaporation of an inorganic material or mask rubbing using photolithography.

In the production of the liquid crystal panel 4, the twist angle θt is set to be 90°<θt≦110°. Such a range is preferable for the following reason. The twist angle θt of a TN LCD device is usually 90°. The contrast is highest at the viewing angle of 0°, namely in the direction perpendicular to the screen of the liquid crystal panel. As the twist angle is increased from 90°, such a contrast curve as in the case where the LCD device is slanted toward the negative viewing direction is obtained. That is, the contrast at the viewing angle of 0° is slightly reduced, but the contrast in the negative viewing direction is increased. Thus, drastic reduction in the contrast in accordance with the viewing angle can be avoided. If the twist angle is more than 110°, inversion occurs at the viewing angle of 0°. Accordingly, the range of 90°<θt≦110° is preferable.

Although the TN LCD device is used in the fourth example, the present invention is applicable to any type of LCD devices.

In the fourth example of the present invention, one pixel includes a plurality of liquid crystal regions having different reference orientation directions and different surface areas. In such a structure, inversion can be avoided while the high contrast is maintained in the region in the pixel which is used most frequently, and further the range of the viewing angles at which satisfactory display is obtained is expanded.

In the case that one pixel includes two types of regions having opposite orientation directions, such an effect is most conspicuous when one type of the regions occupies more than 50% and less than 90% of the surface area of the entire pixel.

In the case that the above-described structure is used in a TN LCD device, the dependence of the contrast on the viewing angle is reduced to the maximum degree when the twist angle is 90°<θt≦110°.

An LCD device having high display quality can be realized by using one or more of these technologies.

EXAMPLE 5

A liquid crystal panel in an TN LCD device of a passive matrix type in accordance with a fifth example of the present invention includes a plurality of regions having different reference orientation directions. The border between the plurality of regions has a circular, elliptic, or arc shape. In such a structure, the border tends to move toward outside such a shape in order to balance the energy level in two regions interposing the border. As a result, a region having a low energy level is formed inside the above-mentioned shape in the vicinity of the border, and the orientation direction of the liquid crystal molecules is stabilized at the border.

FIG. 14 is a cross sectional view of a liquid crystal panel 5 of the passive matrix LCD device in accordance with the fifth example. The liquid crystal panel 5 includes a bottom substrate 31 and a top substrate 32 sandwiching a liquid crystal layer 33 therebetween. The liquid crystal layer 33 includes liquid crystal molecules 33a therein. The bottom substrate 31 includes a base 31a formed of glass, silicon or the like, a plurality of strip-like electrodes 31b, and an alignment layer 31c. The alignment layer 31c is provided in contact with the liquid crystal layer 33 to define the orientation direction of the liquid crystal molecules 33a in the vicinity thereof. The electrodes 31b are located in parallel to each other. The top substrate 32 includes a base 32a formed of glass, silicon or the like, a plurality of strip-like electrodes 32b, and an alignment layer 32c. The alignment layer 32c is provided in contact with the liquid crystal layer 33 to define the orientation direction of the liquid crystal molecules 33a in the vicinity thereof. The electrodes 32b are located in parallel to each other and perpendicular to the electrodes 31b. Intersections of the electrodes 31b and 32b are each included in a pixel.

The substrates 31 and 32 are sealed at a perimeter thereof by a resin or the like, and at least one of the substrates 31 and 32 includes a peripheral circuit such as a driving circuit outside the display area.

The alignment layers 31c and 32c are formed of polyimide or the like and treated by rubbing in a manner described later.

FIG. 15A is a plan view of one pixel of the liquid crystal panel 5 showing the reference orientation directions of the liquid crystal molecules 33a therein. As is shown in FIG. 15A, one pixel includes two regions X and Y having different reference orientation directions (arrow c), namely, the 6 o'clock reference orientation direction and 12 o'clock reference orientation direction. In FIG. 15B, arrows a and b indicate rubbing directions of the alignment layers 31c and 32c respectively. The angle θt between arrows a and b is the twist angle in the liquid crystal layer 33. Areas X and Y may have different surface areas or the same surface area. It is preferable that either one of regions X or Y occupies more than 50% and less than 90% of the surface area of the entire pixel in order to enhance the contrast.

As is shown in FIG. 15A, regions X and Y has a curved border B therebetween. Such a border B is generated by selecting an appropriate shape of the mask pattern used for light radiation to the alignment layers 31 and 32c described later.

In producing a plurality of regions having different reference orientation directions, the phenomenon that the pretilt angle of the liquid crystal molecules is reduced by UV radiation is utilized. The UV radiation is performed in any step after coating the alignment layers 31c and 32c.

A production method of the liquid crystal panel 5 will be described with reference to FIGS. 14, 15A and 15B. The liquid crystal molecules 33a in a central area of the liquid crystal layer 33 are tilted at an average initial pretilt angle as is shown in FIG. 14. In FIG. 14, lines making pretilt angles δa, δb and δc with the substrate 31 or 32 do not indicate the orientation direction of the liquid crystal molecules 33a.

Before assembling the substrates 31 and 32, the alignment layers 31c and 32c are respectively rubbed in the directions indicated by arrows a and b in both regions X and Y using, for example, a burnishing cloth. Next, an area of the alignment layer 31c in positional correspondence with region X is covered with a mask pattern, and then an area of the alignment layer 31c in positional correspondence with region Y is exposed to the UV radiation. As a result, the pretilt angle δa of the liquid crystal molecules 33a in the vicinity of the alignment layer 31c in region X is different from the pretilt angle δb of the liquid crystal molecules 33a in the vicinity of the alignment layer 31c in region Y included in the same pixel as region X. Further, the pretilt angle δc of the liquid crystal molecules 33a in the vicinity of the alignment layer 32c has the relationship of δb<δc<δa. Such a relationship is obtained by controlling the type of a polyimide material or rubbing conditions. The pretilt angle δc may be controlled by radiating an appropriate intensity of UV.

The pretilt direction of the liquid crystal molecules 33a in the central area of the liquid crystal layer 33 is defined by the larger pretilt angle among the two in each of regions X and Y. Accordingly, regions X and Y having the border B therebetween have opposite reference orientation directions to each other.

In the liquid crystal panel 5 having such a structure, the energy level in region X is different from that in region Y due to the different formation conditions of regions X and Y. For example, in the vicinity of an interface between the region exposed to the UV radiation and the region not exposed to the UV radiation, the energy level is lower in the region not exposed to the UV radiation than in the region exposed to the UV radiation. Thus, the energy tends to be absorbed into the region not exposed to the UV radiation. Accordingly, the border B tends to move toward outside the arc shape surrounding the region exposed to the UV radiation. Therefore, a region having a low energy level is formed in the vicinity of the interface inside the arc shape. As a result, the orientation state is stabilized, and thus the viewing angle performance is improved. The liquid crystal panel 5 has higher reliability than the liquid crystal panel 4 in accordance with the fourth example in which one pixel includes rectangular regions X and Y.

Figure 16:
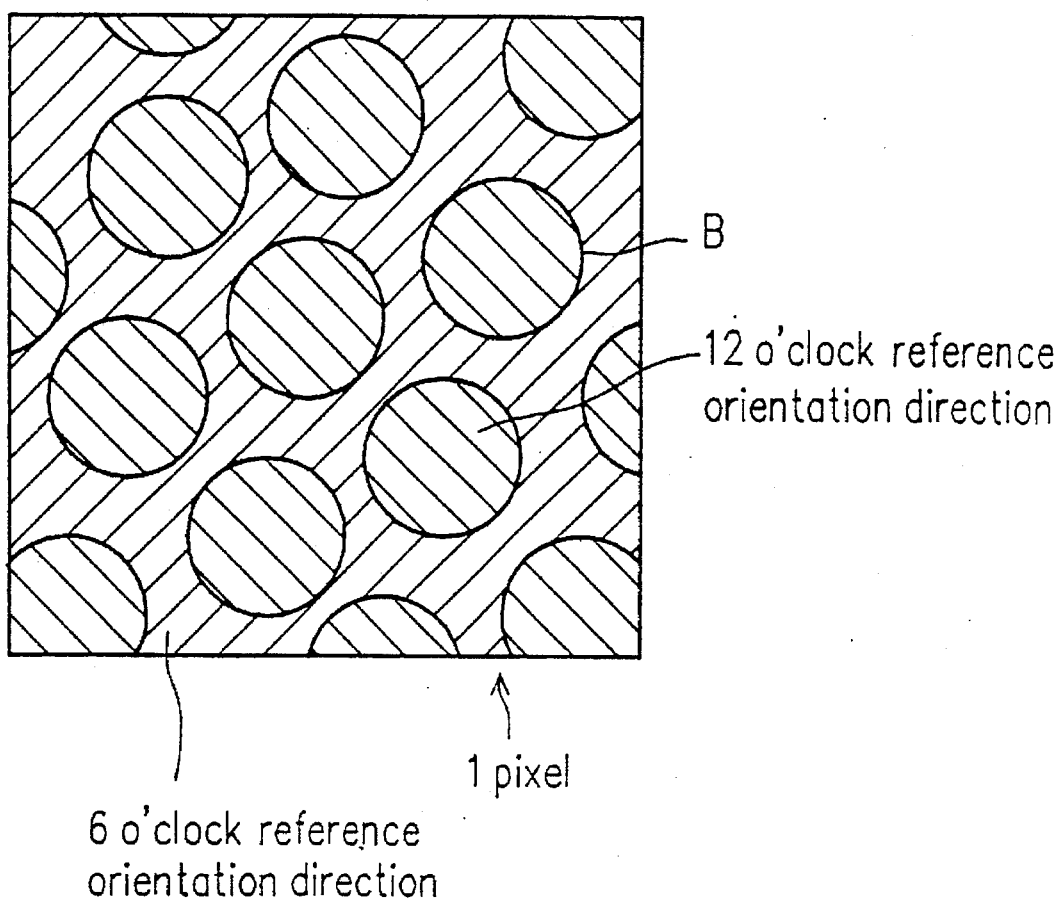
FIG. 16 is a top view of one pixel of an LCD device in a modification of the fifth example illustrating the reference orientation direction.

FIG. 16 shows a top view of one pixel of a liquid crystal panel. In FIG. 16, one pixel includes a plurality of regions having circular borders. In this case also, the border B tends to move toward the outside the circles, and thus a region having a low energy level is formed in the vicinity of the border inside the circles. As a result, the orientation direction is stabilized.

Although the alignment layers 31c and 32c are formed of polyimide in the fourth example, any other material can be used as long as the pretilt angle of the liquid crystal molecules can be changed by UV radiation. For the conditions of the light radiation, an optimum wavelength of light, for example, may be selected in accordance with the material of the alignment layers. If a laser is used, the shape of the border B and the reference orientation directions of regions X and Y can be controlled more efficiently.

The reference orientation direction of the liquid crystal molecules may be controlled by any other known method, such as oblique evaporation of an inorganic material or mask rubbing using photolithography.

In the above example, one pixel includes two types of regions having different reference orientation directions. One pixel may have three or more types of regions having different reference orientation directions.

The present invention is applicable to LCD devices of any mode in addition to the TN mode and of any other driving system, for example, an active matrix system. In the case of an active matrix LCD device, a plurality of pixel electrodes are arranged in a matrix on one of two substrates, and signal electrode lines and scanning electrode lines are arranged to cross each other in the vicinity of the pixel electrodes. Each of the pixel electrodes is connected to the respective signal electrode line and scanning electrode line via a nonlinear switching element such as a thin film transistor (hereinafter, referred to as the "TFT").

In the liquid crystal panel 5 in an LCD device according to the fifth example, one pixel is divided into a plurality of regions having different reference orientation directions by a border which is circular, elliptical, or an arc. As a result, the viewing angle performance and reliability are improved.

EXAMPLE 6

Figure 17:
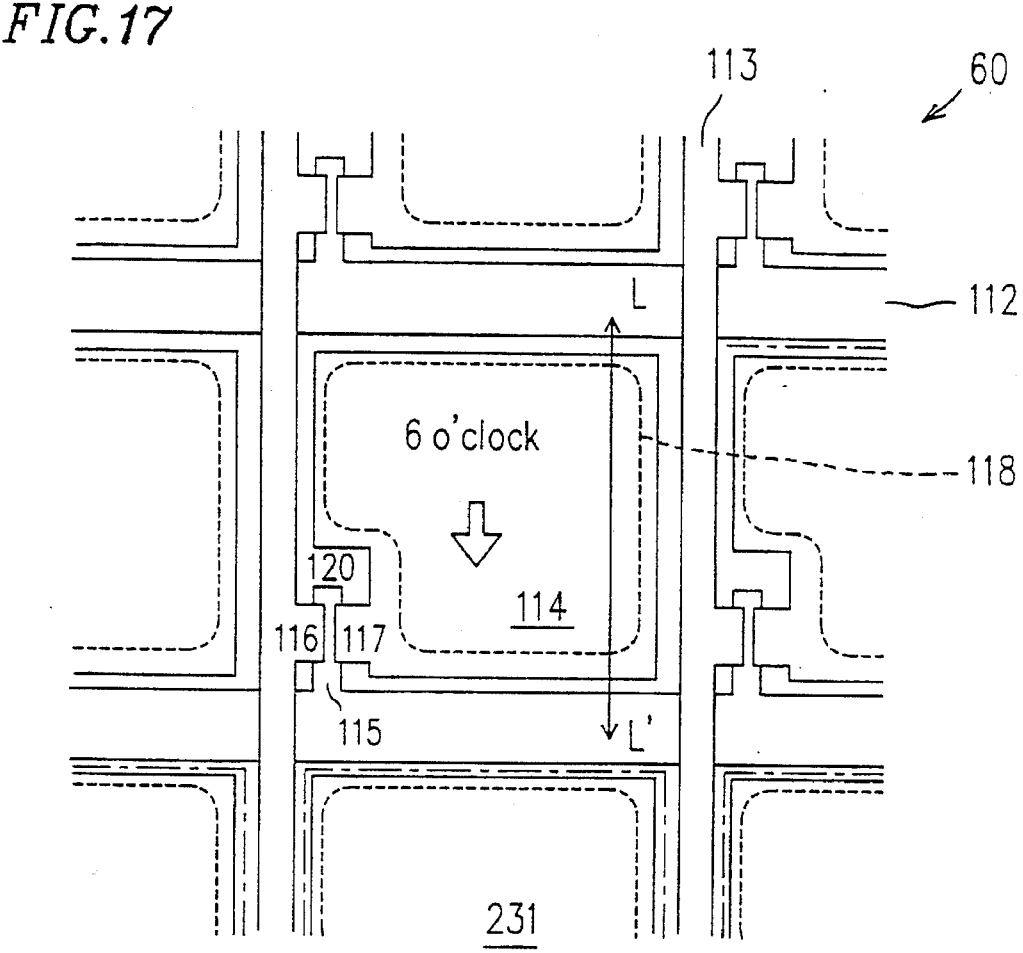
FIG. 17 is a top view of one pixel and the vicinity thereof in a conventional active matrix LCD device.
Figure 18:
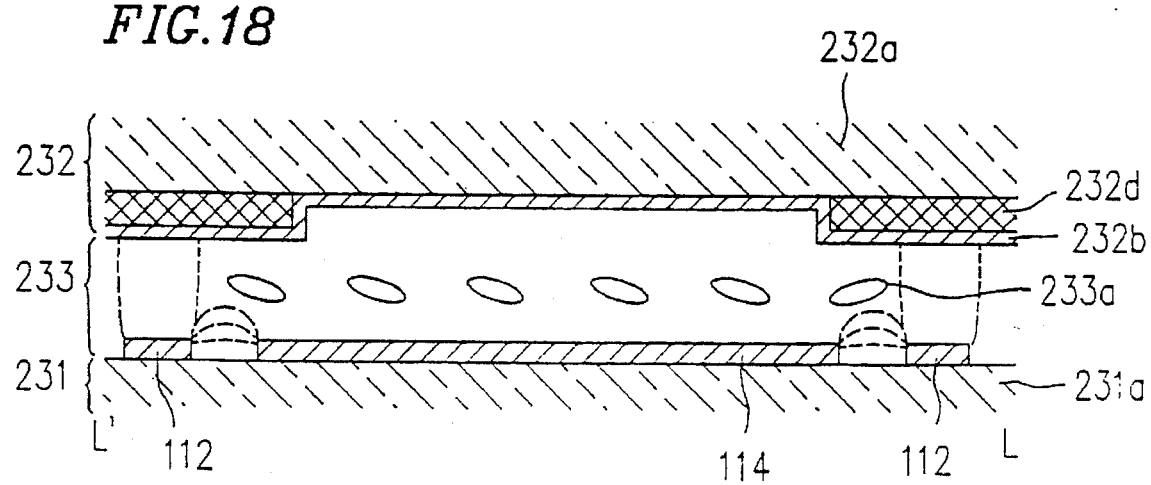
FIG. 18 is a cross sectional view of the conventional active matrix LCD device shown in FIG. 17 taken along line L—L' in FIG. 17.

FIG. 17 is a top view of a conventional active matrix TN LCD device 60, and FIG. 18 is a cross sectional view of the LCD device 60 taken along line L—L' in FIG. 17.

As is shown in FIG. 18, the LCD device 60 includes a bottom substrate 231 and a top substrate 232 located opposite to each other and a liquid crystal layer 233 sandwiched therebetween. The bottom substrate includes an insulating base 231a formed of glass. On the base 231a, scanning lines 112 and signal lines 113 (FIG. 17) crossing each other are provided. Areas surrounded by two adjacent scanning lines 112 and two adjacent signal lines 113 each include a pixel electrode 114. A nonlinear switching element such as a TFT 120 is provided in the vicinity of each of intersections of the scanning lines 112 and the signal lines 113. The TFT 120 includes a gate electrode 115 connected to the corresponding scanning line 112, a source electrode 116 connected to the corresponding signal line 113, and a drain electrode 117 connected to the corresponding pixel electrode 114.

The top substrate 232 includes an insulating base 232a formed of glass. On the base 232a, a light blocking film 232d having an opening corresponding with an area enclosed by the dashed line in FIG. 17 is provided. A counter electrode 232b is provided over substantially the entire surface of the base 232a, covering the light blocking film 232d.

The liquid crystal layer 233 includes liquid crystal molecules 233a having reference orientation directions as shown in FIG. 18. The pixel electrodes 114 and the liquid crystal layer 233 sandwich an alignment layer (not shown) therebetween, and the counter electrode 232b and the liquid crystal layer 233 sandwich another alignment layer (not shown) therebetween.

The bottom and the top substrates 231 and 232 are assembled together by a sealing agent (not shown) formed of a resin or the like provided along a perimeter thereof, and thus the liquid crystal layer 233 is sealed. At least one of the substrates 231 and 232 includes a peripheral circuit and the like for driving the LCD device 60 outside the display area.

In the LCD device 60, the liquid crystal layer 233 in correspondence with each of the pixel electrodes 114 is supplied with an electric field only in a direction perpendicular to the substrates 231 and 232. The torque generated in the liquid crystal layer 233 is directed by the pretilt angle of the liquid crystal molecules 233a. As is shown in FIG. 18, in the vicinity of the perimeter of each of the pixel electrodes 114, an electric field generated by the signal line 113 or the scanning line 112 is applied to the liquid crystal layer 233, and thus an electric force line acting in a direction opposite to the direction determined by the pretilt angle is generated. As a result, the orientation direction of the liquid crystal molecules 233a is disturbed in a part of the liquid crystal layer 233 in correspondence with an area outside the pixel electrodes 114 (such a phenomenon is referred to as "reverse tilt"), and thus display quality is drastically deteriorated.

Conventionally, the light blocking film 232d is provided in order to prevent deterioration of the display quality occurring due to reverse tilt. Since reverse tilt deteriorates the display quality of a wide area corresponding to pixel electrodes 114, the opening of the light blocking film 232d is required to be reduced in size. Such a small opening drastically reduces the ratio of the total area of the openings with respect to the entire area of the LCD device, namely, the aperture ratio. The reduction in the aperture ratio reduces display quality and causes problems such as increase in power consumption by a backlight.

Figure 19:
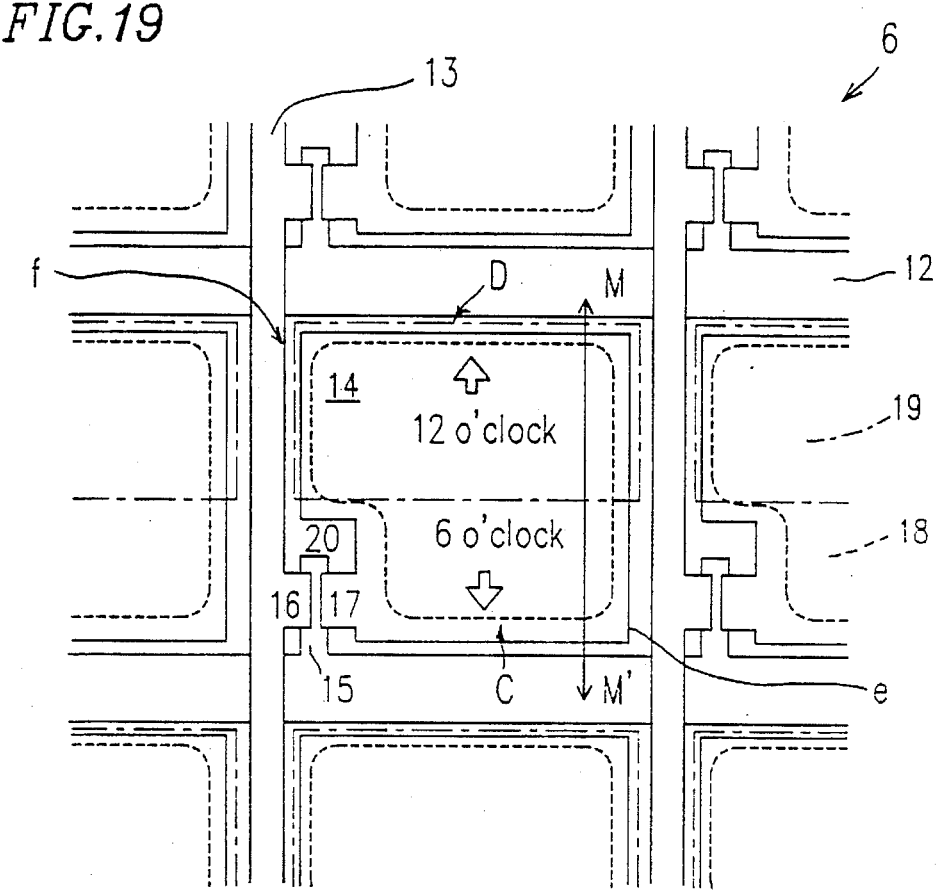
FIG. 19 is a top view of one pixel and the vicinity thereof of an active matrix LCD device in accordance with a sixth example of the present invention.
Figure 20:
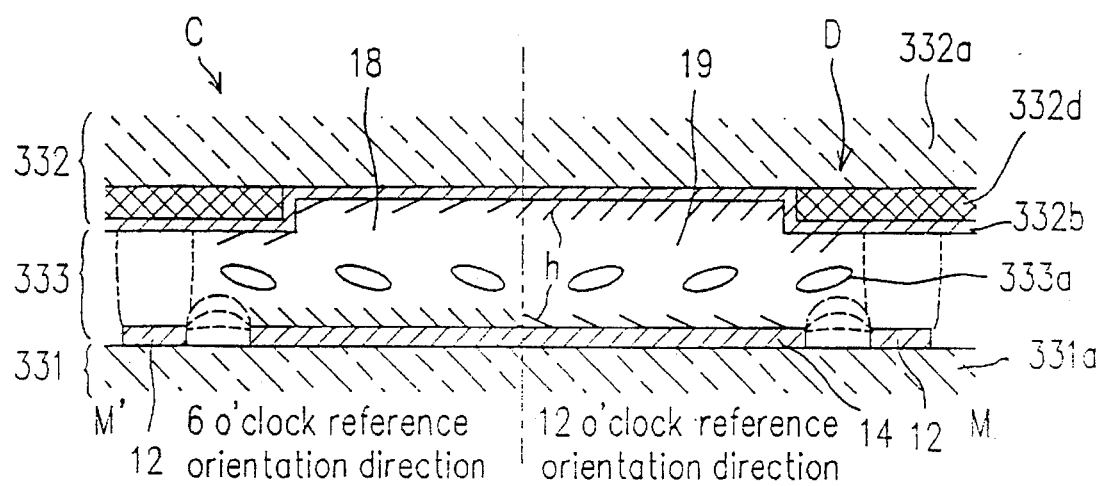
FIG. 20 is a cross sectional view of the active matrix LCD device shown in FIG. 19 taken along line M—M' in FIG. 19.

FIG. 19 is a top view of an active matrix TN LCD device 6 in accordance with a sixth example of the present invention, and FIG. 20 is a cross sectional view of the LCD device 6 taken along line M—M' in FIG. 19.

As is shown in FIG. 20, the LCD device 6 includes a bottom substrate 331 and a top substrate 332 located opposite to each other and a liquid crystal layer 333 sandwiched therebetween. The bottom substrate 331 includes an insulating base 331a formed of glass. On the base 331a, scanning lines 12 and signal lines 13 (FIG. 19) crossing each other are provided. Areas surrounded by two adjacent scanning lines 12 and two adjacent signal lines 13 each include a pixel electrode 14. A nonlinear switching element such as a TFT 20 is provided in the vicinity of each of intersections of the scanning lines 12 and the signal lines 13. The TFT 20 includes a gate electrode 15 connected to the corresponding scanning line 12, a source electrode 16 connected to the corresponding signal line 13, and a drain electrode 17 connected to the corresponding pixel electrode 14. The TFT 20 is formed of amorphous silicon.

The base 331a is covered with an insulation layer (not shown) covering the scanning lines 12, the signal lines 13 and the pixel electrodes 14 in order to prevent shortcircuiting between the substrates 331 and 332 and also shortcircuiting between the scanning lines 12, the signal lines 11 and the pixel electrodes 14. The insulation layer may have openings in positional correspondence with the pixel electrodes 14. A storage capacitor electrode (not shown) may be provided opposite to each of the pixel electrodes 14 to store a voltage applied to the liquid crystal layer 333 in an auxiliary manner.

The top substrate 332 includes an insulating base 332a formed of glass. On the base 332a, a light blocking film 332d having an opening corresponding with an area enclosed by the dashed line in FIG. 19 is provided. A counter electrode 332b is provided over substantially the entire surface of the base 332a, covering the light blocking film 332d.

An area of the liquid crystal layer 333 corresponding to one pixel includes two liquid crystal regions 18 and 19, in which liquid crystal molecules 333a have different reference orientation directions as is shown in FIG. 20. The pixel electrodes 14 and the liquid crystal layer 333 sandwich an alignment layer (not shown) therebetween, and the counter electrode 332b and the liquid crystal layer 333 sandwich another alignment layer (not shown) therebetween.

The bottom and the top substrates 331 and 332 are assembled together by a sealing agent (not shown) formed of a resin or the like provided along a perimeter thereof, and thus the liquid crystal layer 333 is sealed. At least one of the substrates 331 and 332 includes a peripheral circuit and the like for driving the LCD device 6 outside the display area. For color display, a color filter may be provided.

The LCD device 6 is produced by, for example, the following steps: (1) formation of the active matrix (bottom) substrate 331 including the scanning lines 12, the signal lines 11, the TFTs 20, end the alignment layer; (2) formation of the counter (top) substrate 332 having the light blocking film 332d, the counter electrode 332b, and the alignment layer; (3) rubbing of the alignment layers; (4) assembly of the substrates 331 and 332; (5) injection of the liquid crystal material between the substrates 331 and 332 to form the liquid crystal layer 333; and (6) mounting of the peripheral circuits and the like to complete the LCD device 6.

In some of the above-described steps, the liquid crystal regions 18 and 19 are formed. The regions 18 and 19 are divided by a border (indicated by the chain line in FIG. 20) which is perpendicular to the reference orientation direction of the liquid crystal molecules 333a. In this example, the regions 18 and 19 are formed by radiating UV toward an area of each alignment layer corresponding to one of the regions 18 and 19 in an arbitrary step after coating the alignment layers of polyimide. In detail, the UV radiation is performed toward an area of the alignment layer in the active matrix substrate 331 corresponding to the region 19 and an area of the alignment layer in the counter substrate 332 corresponding to the region 18.

Since the UV radiation reduces the pretilt angle of the liquid crystal molecules 333a exposed to the UV radiation, the pretilt angle of the liquid crystal molecules 333a in the region 19 in the vicinity of the active matrix substrate 331 and in the region 18 in the vicinity of the counter electrode 332 are lower than the pretilt angle of the liquid crystal molecules 333a in the region 18 in the vicinity of the active matrix substrate 331 and in the region 19 in the vicinity of the counter electrode 332. The angles between lines h and the substrates 331 and 332 indicate the pretilt angles of the liquid crystal molecules 333a in the vicinity of the substrates 331 and 332 and lines h indicate the orientation direction of the liquid crystal molecules 333a. The liquid crystal molecules 333a in a central area of the liquid crystal layer 333 are tilted at an average initial pretilt angle as is shown in FIG. 20. Referring to FIG. 20, when an electric field having a sufficient level is applied to the liquid crystal layer 333, the liquid crystal molecules 333a are erected to be perpendicular to the substrates 331 and 332. The dashed lines indicate the electric force lines applied by the scanning lines 12 to a periphery of the pixel electrode 14.

Since the initial tilt angle of the liquid crystal molecules 333a in the central area of the liquid crystal layer 333 is strongly influenced by the higher pretilt angle of the two, the liquid crystal molecules 333a have the 6 o'clock orientation direction in the region 18 and the 12 o'clock reference orientation direction in the region 19. Accordingly, in a peripheral area C of the region 18 and a peripheral area D of the region 19 (FIG. 19), the liquid crystal molecules 333a in the central area are erected from an end thereof closer to the scanning line 12 as is illustrated in FIG. 20. In a peripheral area e of the region 18 and a peripheral area f of the region 19 (FIG. 19), the liquid crystal molecules 333a in the vicinity of the substrate 331 are erected from an end thereof closer to the signal line 13. (The angle between the reference orientation direction of the liquid crystal molecules 333a and the signal lines 11 is determined by the twist angle θt, namely, 90°−θt/2.) As a result, the pretilt angle of the liquid crystal molecules 333a in the central area in the peripheral areas C and D substantially corresponds to the direction of the electric force generated by the scanning lines 12, and the pretilt angle of the liquid crystal molecules 333a in the vicinity of the substrate 331 in the peripheral areas e and f substantially corresponds to the direction of the electric force generated by the signal lines 13. In consequence, reverse tilt is prevented.

Further, since one pixel includes two regions having different reference orientation directions (6 o'clock and 12 o'clock reference orientation directions in this example), the dependence of the display characteristics on the viewing angle is alleviated.

By controlling the pretilt angle (anchoring strength) using the alignment layers, the direction in which the liquid crystal molecules are erected can be controlled.

Figure 21:
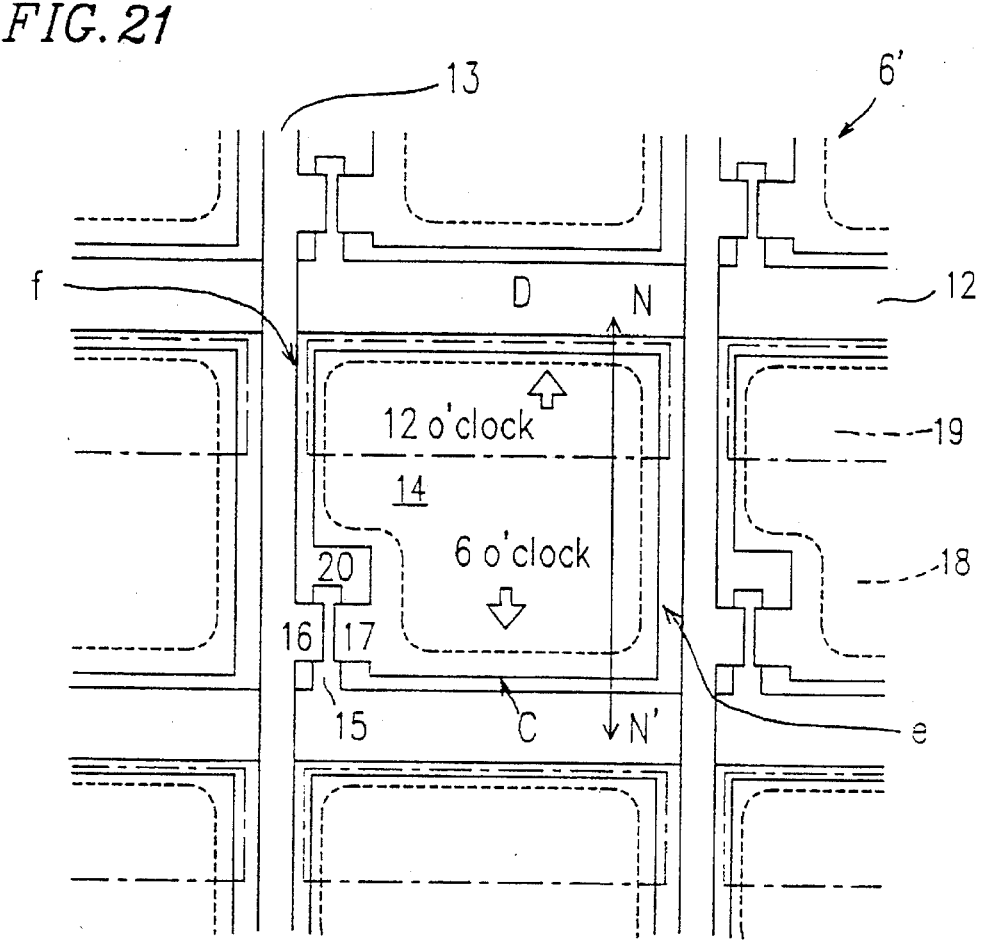
FIG. 21 is a top view of one pixel and the vicinity thereof of an active matrix LCD device in a modification of the sixth example.
Figure 22:
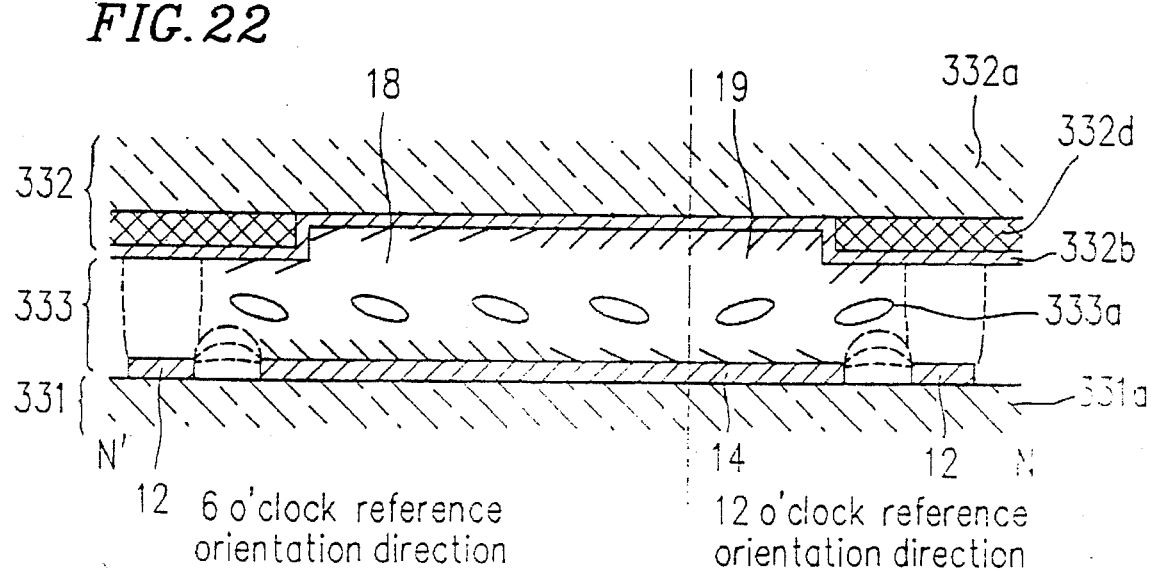
FIG. 22 is a cross sectional view of the active matrix LCD device shown in FIG. 21 taken along line N—N' in FIG. 21.

The regions 18 and 19 may have different surface areas. FIG. 21 is a top view of an LCD device 6', and FIG. 22 is a cross sectional view of the LCD device 6' taken along lines N—N in FIG. 21. In the LCD device 6', the region 19 occupies only an end area including a peripheral area of the pixel electrode 14, and the region 18 occupies the rest of the entire area. Still another region having a different reference orientation direction may be provided outside the area corresponding to the pixel electrode 14.

EXAMPLE 7

Figure 23:
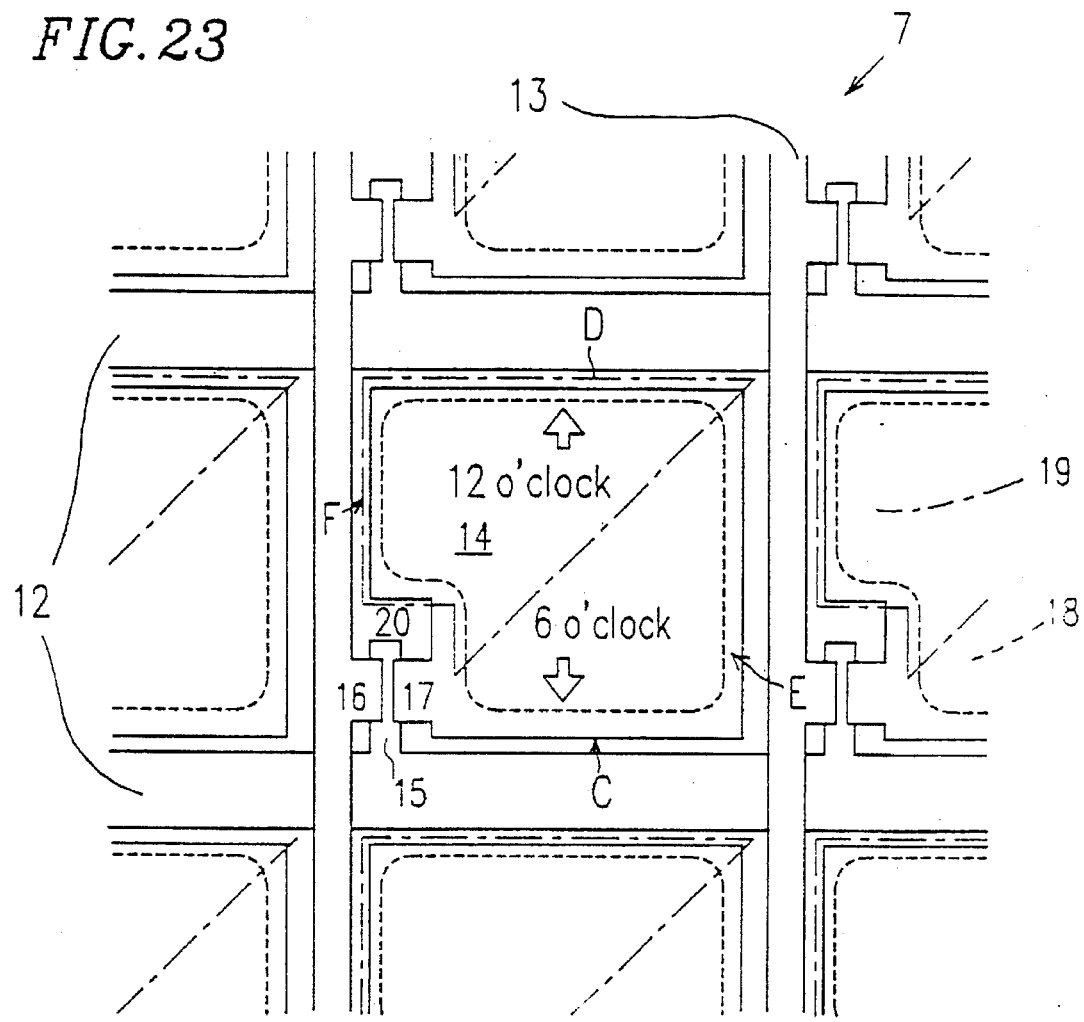
FIG. 23 is a top view of one pixel and the vicinity thereof of an active matrix LCD device in accordance with a seventh example of the present invention.

FIG. 23 is a top view of an active matrix LCD device 7 in accordance with a seventh example of the present invention.

The LCD device 7 is different from the LCD device 6 in the sixth example in that the border between the regions 18 and 19 having different reference orientation directions is a diagonal line of the pixel electrode 14 having a substantially rectangular shape. The diagonal line used as the border has a direction closer to the rubbing direction of an alignment layer (not shown) on an active matrix substrate 331 than the other diagonal line.

In the peripheral area C of the region 18 and the peripheral area D of the region 19, the liquid crystal molecules are erected from an end thereof closer to the scanning line 12; and in a peripheral area E of the region 18 and a peripheral area F of the region 19, the liquid crystal molecules are erected from an end thereof closer to the signal line 13.

In the LCD device 7, the peripheral areas E and F are longer than the peripheral areas e and f in the LCD device 6 in the sixth example. Accordingly, reverse tilt can be prevented substantially in the entire peripheral area around the pixel electrode 14.

The border between the regions 18 and 19, which passes through the TFT 20, is not a diagonal line of the pixel electrode 14 in a precise sense. However, the TFT 20 is often covered with the light blocking film 332d to prevent deterioration of electrical characteristics of the TFT 20 exposed to the UV radiation. Thus, even if reverse tilt is generated in an area corresponding to the TFT 20, there is no influence on the performance of the LCD 7.

Although the border between the region 18 and 19 is substantially a diagonal line of the pixel electrode 14 in this example, the border may be a line which is slanted clockwise or counterclockwise relative to the diagonal line.

Although the alignment layers are formed of polyimide in the sixth and seventh examples, any other material can be used as long as the pretilt angle of the liquid crystal molecules can be changed by UV radiation. For the conditions of the light radiation, an optimum wavelength of light, for example, may be selected in accordance with the material of the alignment layers. If a laser is used, the reference orientation directions of the regions 18 and 19 can be controlled more efficiently.

The reference orientation direction of the liquid crystal layer may be controlled by any other known method, such as oblique evaporation of an inorganic material or mask rubbing using photolithography.

The present invention is applicable to LCD devices of any mode in addition to the TN mode and of any other driving system, for example, a simple matrix system. In the case of a simple matrix LCD device, intersections of a plurality of strip-like electrodes provided on both of the two substrates are used as pixel electrodes. Reverse tilt generated in the vicinity of the pixel electrodes can be prevented.

In an LCD device in accordance with the sixth and seventh examples, the direction of the electric force lines applied by the scanning lines and the signal lines and the orientation direction of the liquid crystal molecules in the vicinity of the scanning lines and the signal lines correspond to each other. As a result, generation of reverse tilt is prevented. In the case that the border between the regions having different reference orientation directions is a diagonal line of the pixel electrode, reverse tilt can be prevented in almost the entire peripheral area around the pixel electrode. Since one pixel includes a plurality of regions having different reference orientation directions, dependence of the display characteristics on the viewing angle can be alleviated. Moreover, an area covered with the light blocking film provided for concealing defective display generated by reverse tilt can be reduced, thereby raising the aperture ratio. Thus, the power consumption by the backlight and the like can be reduced.

EXAMPLE 8

In eighth and ninth examples according to the present invention, liquid crystal molecules in the vicinity of one of two substrates and liquid crystal molecules in the vicinity of the other substrate have different pretilt angles.

Figure 24:
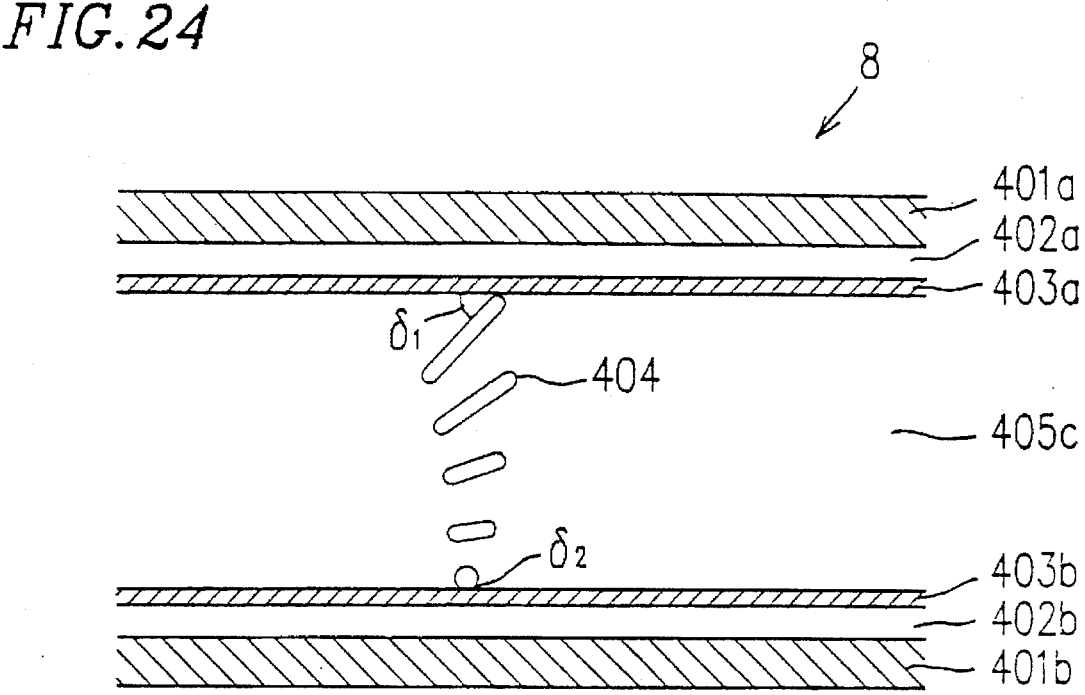
FIG. 24 is a partial cross sectional view of an LCD device in accordance with an eighth example of the present invention.

FIG. 24 is a partial cross sectional view of a liquid crystal panel 8 of an LCD device in accordance with the eighth example. The liquid crystal panel 8 includes a pair of substrates 401a and 401b and a liquid crystal layer 405c interposed therebetween. The liquid crystal layer 405c includes liquid crystal molecules 404 therein. The substrate 401a has a transparent common electrode 402a and an alignment layer 403a on a surface thereof in this order, and the substrate 401b has transparent segment electrodes 402b (only one is shown in FIG. 24) and an alignment layer 403b on a surface thereof in this order. The liquid crystal layer 405c is in contact with the alignment layers 403a and 403b. The alignment layers 403a and 403b are formed of different materials. The alignment layer 403a is coated with, for example, a polyimide material by which the liquid crystal molecules 404 are tilted at a high pretilt angle $\delta_1$, for example, polyamic acid having with an alkyl group or fluorine atoms. The alignment layer 403b is coated with a general polyimide material by which the liquid crystal molecules 404 are tilted at a low pretilt angle $\delta_2$. In this example, the pretilt angle $\delta_1$ is set to be approximately 30° to 50°, and the pretilt angle $\delta_2$ is set to be to approximately 0° to 5°.

Figure 25:
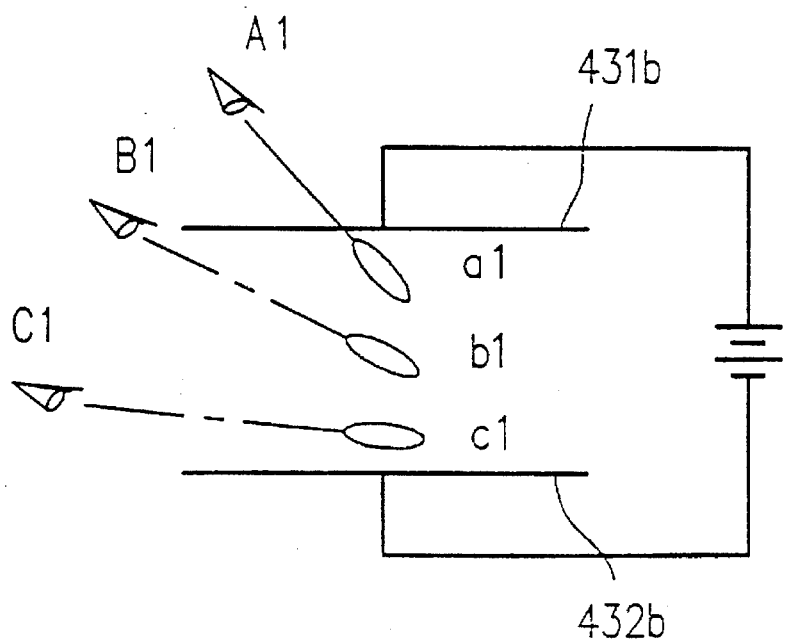
FIG. 25 is a schematic cross sectional view of the LCD device shown in FIG. 24 showing the viewing angle performance thereof.
Figure 26:
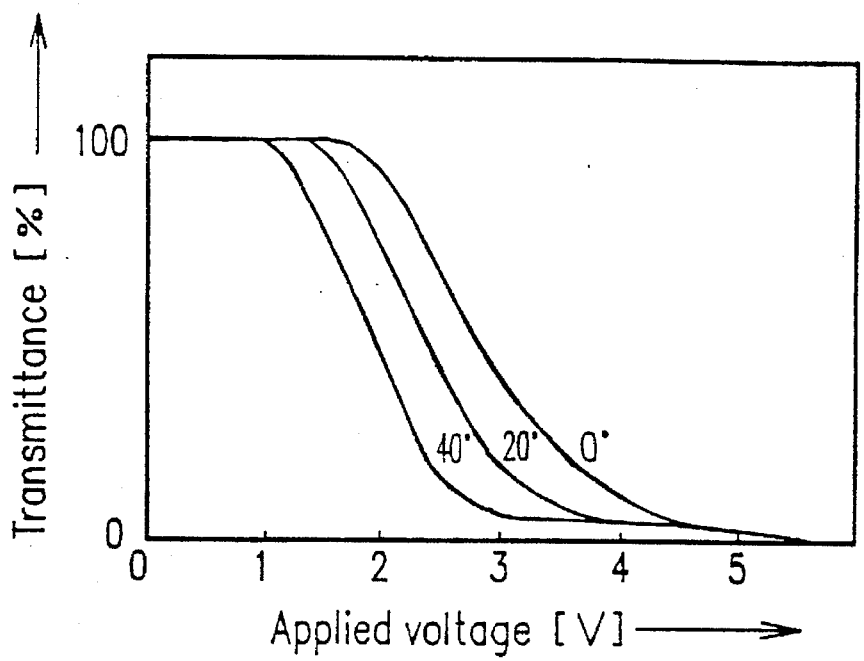
FIG. 26 is a graph illustrating the light transmittance as a function of the voltage applied to the LCD device shown in FIG. 24.

In the liquid crystal panel 8, the liquid crystal molecules 404 in the vicinity of the substrate 401a are tilted at the pretilt angle $\delta_1$, and the liquid crystal molecules 404 in the vicinity of the substrate 401b are tilted at the pretilt angle $\delta_2$. Thus, the pretilt angle of the liquid crystal molecules 404 in a central area in the thickness direction of the liquid crystal layer 405c continuously changes. Accordingly, as is shown in FIG. 25, a liquid crystal molecule a1 is seen as a circle from position A1. A liquid crystal molecule b1 is seen as a circle from position B1, and a liquid crystal molecule c1 is seen as circles from position C1. The liquid crystal molecules at different positions in the thickness direction of the liquid crystal layer 405 are seen as circles at different viewing angles. For this reason, the dependence of the birefringence on the viewing direction is averaged. FIG. 26 illustrates the V-T curves obtained in the liquid crystal panel 8 at viewing angles of 0°, 20° and 40°. As is appreciated from FIG. 26, inversion does not occur even at the viewing angles of 20° and 40° in the positive viewing direction. In the negative viewing direction, the contrast is not reduced.

Thus, satisfactory viewing angle performance is obtained in all the directions.

EXAMPLE 9

Figure 27:
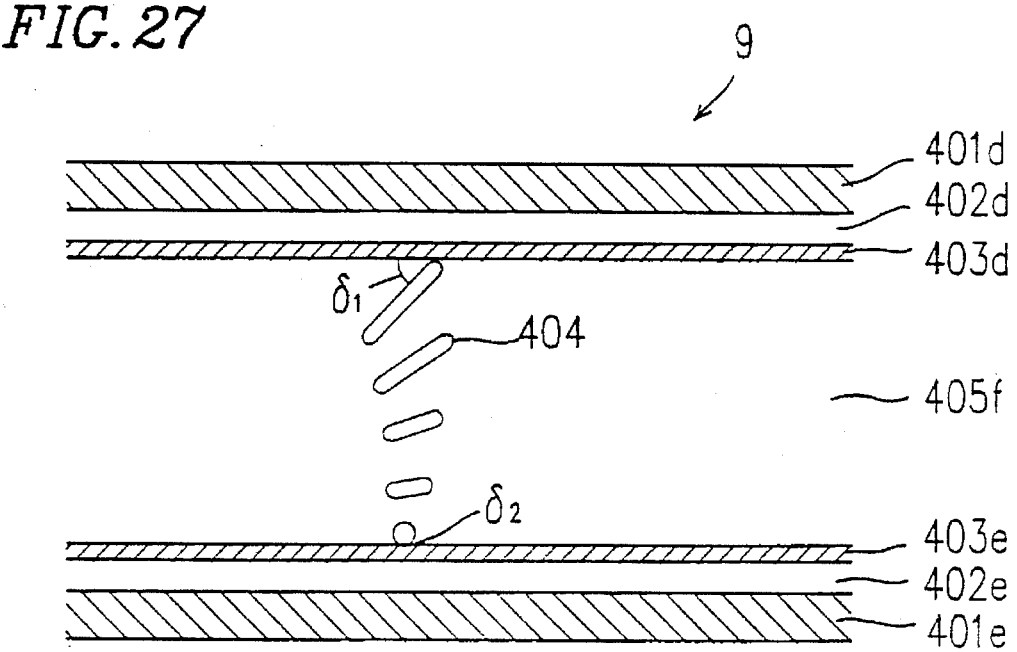
FIG. 27 is a partial cross sectional view of an LCD device in accordance with a ninth example of the present invention.

FIG. 27 is a partial cross sectional view of a liquid crystal panel 9 of an LCD device in accordance with the ninth example. The liquid crystal panel 9 includes a pair of substrates 401d and 401e and a liquid crystal layer 405f interposed therebetween. The liquid crystal layer 405f includes liquid crystal molecules 404 therein. The substrate 401d has a transparent common electrode 402d and an alignment layer 403d on a surface thereof in this order, and the substrate 401e has transparent segment electrodes 402e (only one is shown in FIG. 25) and an alignment layer 403e on a surface thereof in this order. The liquid crystal layer 405f is in contact with the alignment layers 403d and 403e. The alignment layers 403d and the 403e are formed of an identical material but are treated for alignment in different manners. In detail, the alignment layers 403d and the 403e are coated with, for example, a polyimide material by which the liquid crystal molecules 404 are tilted at a wide pretilt angle δ1, for example, polyamic acid having an alkyl group or fluorine atoms. The alignment layer 403e is rubbed more strongly than the alignment layer 403d by several times, thereby tilting the liquid crystal molecules 404 in the vicinity of the alignment layer 403e at the tilting angle δ2, which is narrower than the pretilt angle δ1 of the liquid crystal molecules in the vicinity of the alignment layer 403d. As in the eighth example, the pretilt angle δ1 is approximately 30° to 50°, and the pretilt angle δ2 is approximately 0° to 5°.

In the liquid crystal panel 9, the pretilt angle of the liquid crystal molecules 404 in a central area in the thickness direction of the liquid crystal layer 405f continuously changes. Accordingly, the liquid crystal panel g has the same effects as the LCD device 8 in the eighth example.

Although the alignment layers 403d and 403e are treated by rubbing, any other treatment method may be used as long as the pretilt angle of the liquid crystal molecules 404 in the vicinity of the alignment layer 403e can be narrower than that of the liquid crystal molecules 404 in the vicinity of the alignment layer 403d. Other usable treatment methods include oblique evaporation and the use of a chemical such as hydrochloric acid or sodium hydroxide.

The pretilt angle 62 of the liquid crystal molecules 404 in the vicinity of the alignment layer 403e may be larger than the pretilt angle δ1 of the liquid crystal molecules 404 in the vicinity of the alignment layer 403d. The larger pretilt angle may be set to be between 10° and 80° inclusive.

The alignment layers may be formed of an organic material such as polyamide, polystyrene, polyamideimide, epoxy acrylate, spirane acrylate, or polyurethane; an inorganic material such as an oxide, organic silane, metal, or a metal complex. In order to tilt the liquid crystal molecules at a high pretilt angle, the alignment layer may be coated with, for example, perfluorononanoic acid chromium complex, organic silane DMOAP or lecithin, or may be exposed to a solvent such as ammonium salt CTAB or octadecyl malonic acid. In order to tilt the liquid crystal molecules at a low pretilt angle, the alignment layer may be coated with, for example, brassylic acid chromium complex, organic silane MAP, or polyvinyl alcohol. Or, the alignment layers may be exposed to a solvent such as dicarbon oxide or Versamid 125 (produced by General Mills Ltd.).

The present invention is applicable to LCD devices of a black and white duty driving system or LCD devices of an active matrix driving system using TFTs or the like as a switching device. The present invention is also used for color display in combination with a color filter.

In accordance with the eighth and ninth examples, the tilt angle of the liquid crystal molecules in the liquid crystal layer sandwiched between a pair of substrates can continuously change. In such a structure, satisfactory display performance is obtained in all the viewing directions. Since such a structure is realized simply by tilting the liquid crystal molecules in the vicinity of the two substrates at different tilt angles, etching or masking of the alignment layers is not necessary. Such a method is advantageous in that the alignment layers are free from contamination or damage.

EXAMPLE 10

In tenth through twelfth examples, one pixel includes a plurality of liquid crystal regions having different reference orientation directions and further a vertical orientation region between two adjacent liquid crystal regions. In the vertical orientation region, the liquid crystal molecules are oriented vertically relative to two substrates.

Figure 28:
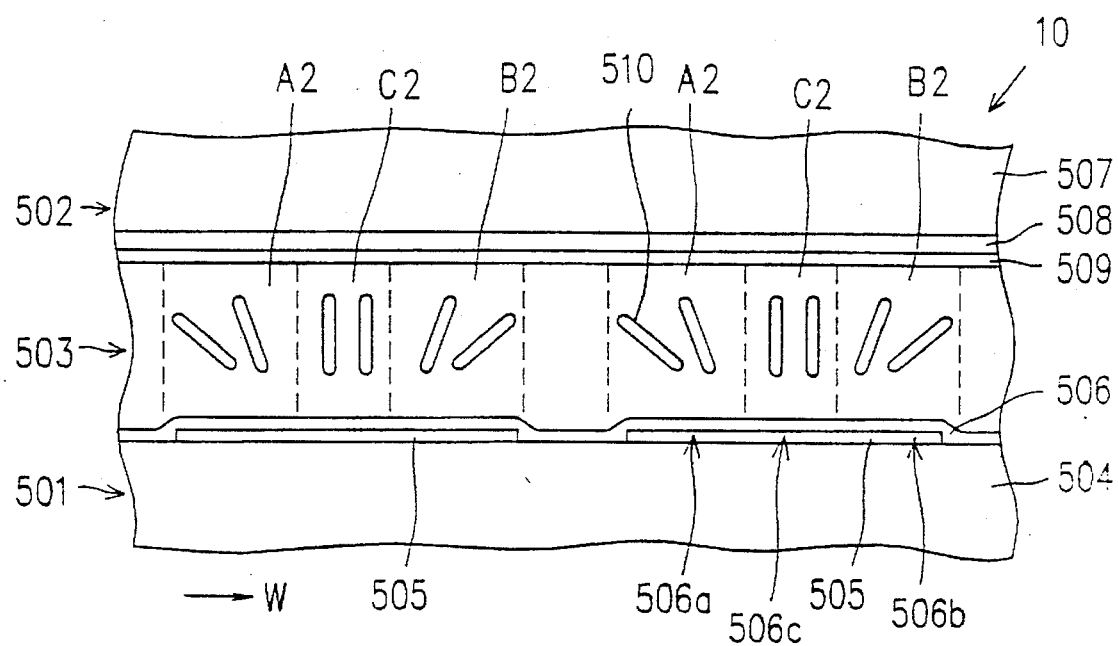
FIG. 28 is a partial cross sectional view of an LCD device in accordance with a tenth example of the present invention.

FIG. 28 is a partial cross sectional view of a liquid crystal panel 10 of a TN LCD device of a NW mode in accordance with the tenth example of the present invention. In FIG. 28, the liquid crystal panel 10 is supplied with a voltage. As is shown in FIG. 28, the liquid crystal panel 10 includes a pair of substrates 501 and 502 located opposite to each other and a liquid crystal layer 503 sandwiched between the substrates 501 and 502. The liquid crystal layer 503 includes liquid crystal molecules 510 therein. The liquid crystal molecules 510 in the regions except for the vertical orientation region are twisted at a twist angle of 90° in the thickness direction of the liquid crystal layer 503.

The substrate (top substrate) 502 includes a base 507. The base 507 has a counter electrode 508 and an alignment layer 509 on substantially the entire surface thereof in this order.

The substrate (bottom substrate) 501 includes a base 504. On the base 504, a plurality of pixel electrodes 505 are provided in a matrix, and an alignment layer 506 is provided on substantially the entire surface of the base 504 covering the pixel electrodes 505. Each pixel electrode 505, and an area of the counter electrode 508 and the liquid crystal layer 503 both in positional correspondence with the pixel electrode 505 are included in a pixel. In the case that a black mask having an opening smaller than the pixel electrode 505 is provided, the surface area of the opening is the area of the pixel.

The alignment layer 506 includes three areas 506a, 506b and 506c in each of a plurality of pixels in a direction indicated by arrow W. The liquid crystal layer 503 also includes three regions A2, B2 and C2, which are in contact with the areas 506a, 506b and 506c, respectively. The liquid crystal molecules 510 in the three areas 506a, 506b and 506c have different orientation directions. In detail, the liquid crystal molecules 510 in region A2 are tilted from top left to right bottom (FIG. 28), and the liquid crystal molecules 510 in region B2 are tilted from top right to left bottom. The reference orientation directions of the liquid crystal molecules 510 in regions A2 and B2 are offset at 180°. The liquid crystal molecules 510 in region C2 between regions A2 and B2 are oriented vertically relative to the substrates 501 and 502. Region C2 is the vertical orientation region.

Figure 29:
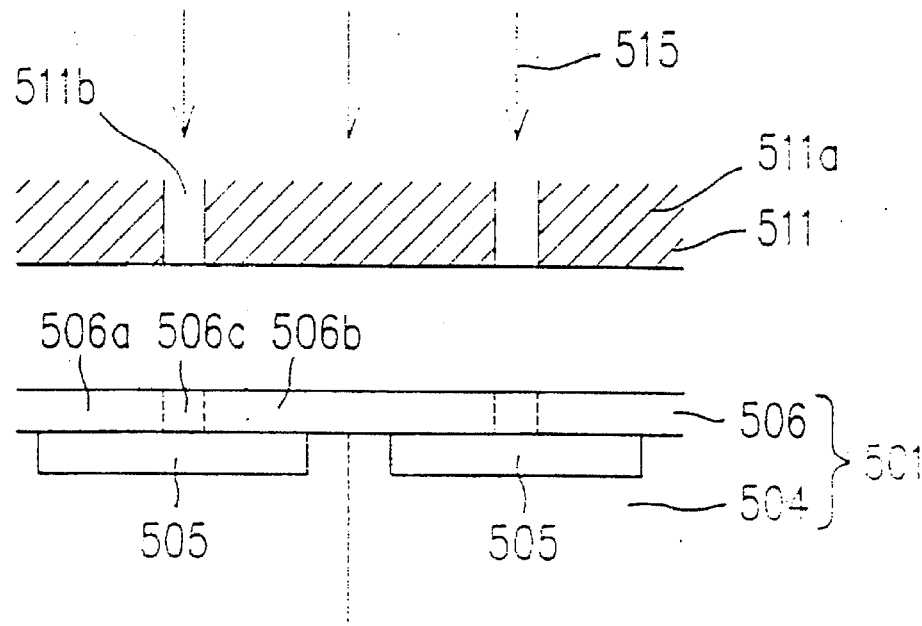
FIG. 29 is a schematic partial cross sectional view of an LCD device in the tenth example illustrating a light radiation step in the production process thereof.

FIG. 29 schematically illustrates a light radiation step in a method for producing the liquid crystal panel 10 in accordance with the tenth example.

In order to produce the liquid crystal panel 10, the pixel electrodes 505 are formed on the base 504, and the alignment layer 506 is formed over the entire surface of the base 504 so as to cover the pixel electrodes 505 in a known manner to form the substrate 501. In this example, the alignment layer 506 is formed of polyimide, which is an organic polymer.

After the formation of the alignment layer 506, an area of the alignment layer 506 corresponding to each of the plurality of pixels is divided into the three areas 506a, 506b and 506c in an arbitrary manner. The areas 506a and 506b are treated so that the respective regions in the liquid crystal layer have different reference orientation directions. Region C2 may be treated in the same manner as either of region A2 or B2. Regions A2 and B2 may be treated by any method, for example, twice rubbing or alignment layer patterning.

On the substrate 501, a mask 511 including light blocking areas 511a and light transmitting areas 511b each sandwiched between two adjacent light blocking areas 511a is set. The mask 511 is positionally adjusted so as to locate the light transmitting area 511b on the area 506c of the alignment layer 506.

Next, light 515 is radiated toward the alignment layer 506 through the mask 511. As the light, 515, UV, visible light or infrared light may be used. UV having a wavelength of 400 nm or less is preferable for easily providing high energy sufficient to change the surface state of the alignment layer 506. UV having such a wavelength is emitted by, for example, a high pressure mercury lamp, a low pressure mercury lamp, or mercury xenon lamp. UV is preferably radiated at an exposure of 30 J/cm$^2$ or more. Instead of UV, visible light and infrared light, a laser beam having the same wavelength, an electron beam, an ion beam, or an X-ray may be used.

As a result of the light radiation, the area 506c has a different surface state from that of the areas 506a and 506b. Thus, the liquid crystal molecules 510 in region C2 in contact with the area 506c are vertically oriented.

Next, the substrate 501 is assembled with the substrate 502 which is formed in a known manner, and a liquid crystal material is injected into a space therebetween to form the liquid crystal layer 503. In the liquid crystal layer 503, the liquid crystal molecules 510 are tilted from left top to right bottom in region A2 in contact with the area 506a, are tilted from right top to left bottom in region B2 in contact with the area 506b, and are oriented vertically relative to the substrates 501 and 502 in region C2 in contact with the area 506c as is illustrated in FIG. 28.

Due to vertical orientation region C2, generation of a disclination line between regions A2 and B2 having different reference orientation directions is prevented.

The light radiation may be performed at an arbitrary stage after coating the alignment layer 506; that is, after the pre-curing, after the curing, after the rubbing, or after the washing of the substrate 501 performed after the rubbing. The light radiation may be performed before or after the alignment treatment for generating a plurality of regions having different reference orientation directions.

As the mask 511, a photomask generally used may be used. A mask pattern may be formed on the alignment layer 506 by photolithography and then removed after light radiation. Alternatively, light may be radiated only to a prescribed area by converging the light to a size which is equal to or less than the size of the opening of the mask 511 using a lens or a laser beam.

EXAMPLE 11

In the eleventh example in accordance with the present invention, vertical orientation region C2 is formed between regions A2 and B2 by performing surface treatment to the alignment layer 506. A liquid crystal panel 11 in an LCD device in this example has the same structure as that of the liquid crystal panel 10.

Figure 30:
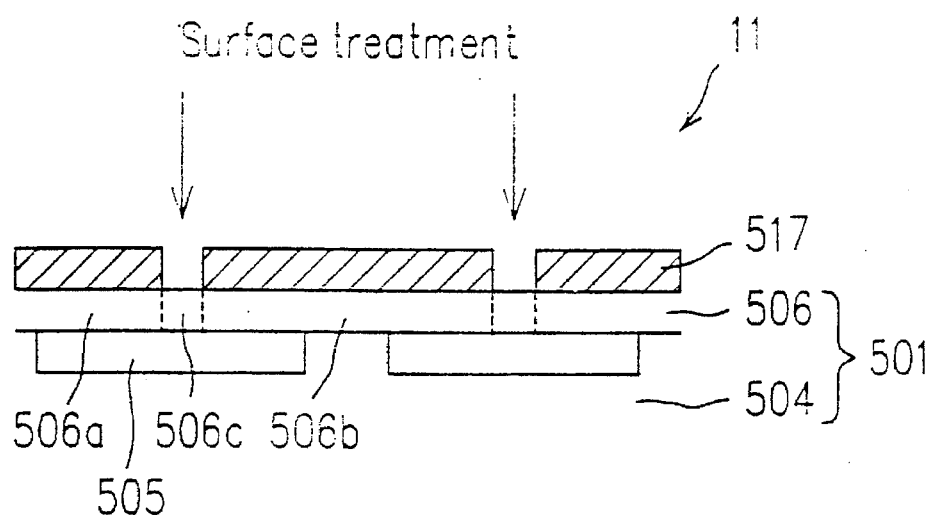
FIG. 30 is a schematic partial cross sectional view of an LCD device in an eleventh example illustrating a surface treatment step in the production process thereof.

With reference to FIG. 30, the liquid crystal panel 11 is produced in the following manner.

In a known manner, the pixel electrodes 505 are formed on the base 504, and the alignment layer 506 is formed over the entire surface of the base 504 so as to cover the pixel electrodes 505 to form the substrate 501.

Next, an area of the alignment layer 506 corresponding to each of a plurality of pixels is divided into three areas 506a, 506b and 506c in an arbitrary manner. The areas 506a and 506b are treated so that the respective regions in the liquid crystal layer have different reference orientation directions.

A resist pattern 517 covering the areas 506a and 506b is formed on the alignment layer 506 using, for example, photolithography.

Thereafter, a surface of the alignment layer 506 is put into contact with an alkaline solution to roughen the surface of the area 506c. As the alkaline solution, a 0.5% aqueous solution of NaOH or a 2.38% aqueous solution of TMAH may be used. An acid solution, for example, a nitric acid may be used for the surface treatment. Ozone or ammonia gas, both of which are reactive, may also be used.

As a result of the surface treatment, the surface state of the area 506c is different from the surface state of the areas 506a and 506b. Thus, the liquid crystal molecules in region C2 in contact with the area 506c are oriented vertically relative to the substrate 501 and 502 while the liquid crystal molecules in regions A1 and B2 in contact with the areas 506a and 506b are tilted relative to the substrates 501 and 502.

Due to vertical orientation region C2, generation of a disclination line between regions A2 and B2 having different reference orientation directions is prevented.

EXAMPLE 12

In a liquid crystal panel 12 in accordance with the twelfth example, vertical orientation region C2 is provided by forming another alignment layer between regions A2 and B2. The liquid crystal panel 12 has the same structure with that of the liquid crystal panel 10.

With reference to FIGS. 31A through 31D, the liquid crystal panel 12 is produced in the following manner.

In a known manner, the pixel electrodes 505 are formed on the base 504, and the alignment layer 506 is formed over the entire surface of the 504 so as to cover the pixel electrodes 505 to form the substrate 501.

Next, an area of the alignment layer 506 corresponding to each of a plurality of pixels is divided into three areas 506a, 506b and 506c in an arbitrary manner. The areas 506a and 506b are treated so that the respective regions in the liquid crystal layer have different reference orientation directions.

Figure 31A:
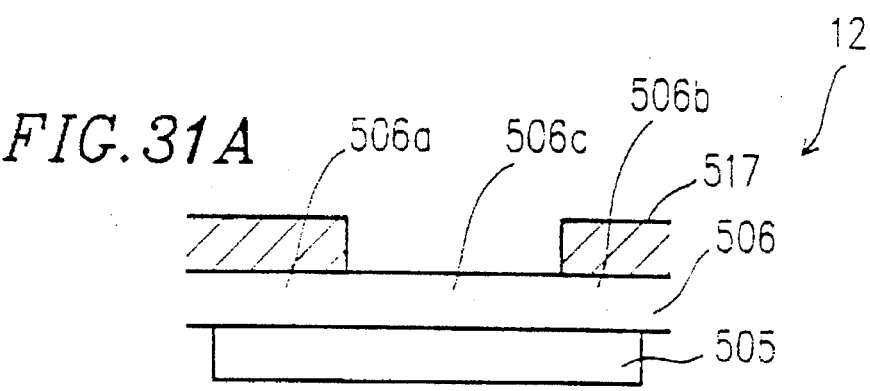
FIGS. 31A through 31D are schematic partial cross sectional views of an LCD device in accordance with a twelfth example of the present invention illustrating production steps thereof.

As is shown in FIG. 31A, a resist pattern 517 covering the areas 506a and 506b is formed on the alignment layer 506 using, for example, photolithography.

Figure 31B:
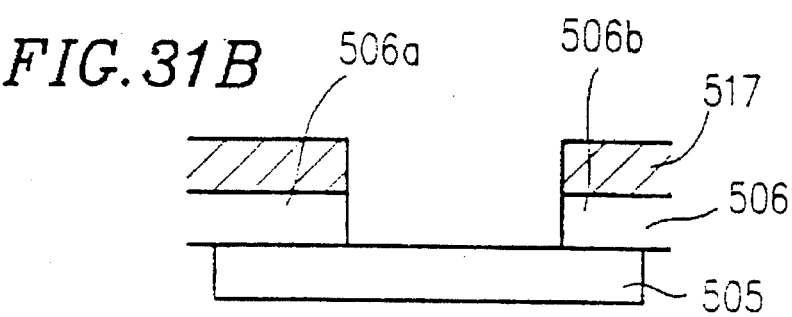
Figure 31C:
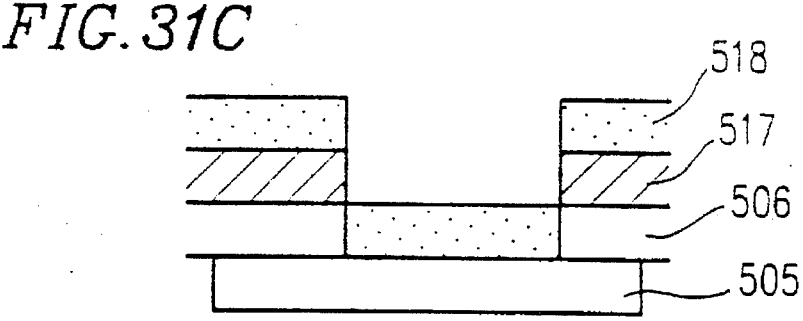
Figure 31D:
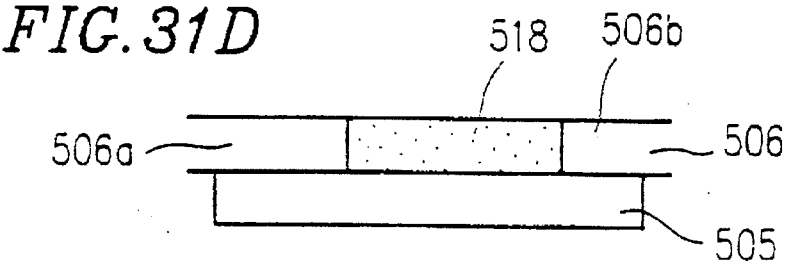

Next, as is shown in FIG. 31B, the area 506c of the alignment layer 506 which is not covered with the resist pattern 517 is removed. As is shown in FIG. 31C, an alignment layer 518 is formed between the areas 506a and 506b. The alignment layer 518 is treated so as to orient the liquid crystal molecules in contact therewith vertically relative to the substrates 501 and 502. As is shown in FIG. 31D, the resist pattern 517 is removed.

As a result of the surface treatment, the liquid crystal molecules in region C2 in contact with the area 518 are oriented vertically relative to the substrate 501 and 502 while the liquid crystal molecules in regions A2 and B2 in contact with the areas 506a and 506b are tilted relative to the substrates 501 and 502.

Due to vertical orientation region C2, generation of a disclination line between regions A2 and B2 having different reference orientation directions is prevented.

In the liquid crystal panels 10 through 12 in the tenth through twelfth examples, the liquid crystal molecules in region C2 are vertically oriented regardless of the supply of an electric field. Accordingly, even when no voltage is applied, region C2 presents a black image. Therefore, the aperture ratio is reduced by the surface area of region C2. However, the reduction of the aperture ratio can be restricted to approximately 5% by making region C2 as small as possible, and no practical problem is presented.

The alignment layer 506 may be formed of, instead of polyimide, an organic polymer mainly including polyamide, polystyrene, polyamideimide, epoxy acrylate, spirane acrylate or polyurethane. An inorganic material mainly including silicon nitride, silicon oxide, magnesium fluoride, gold or the like may also be used, in which case a beam providing high energy such as a UV laser beam or an electron beam is required for radiation.

In the tenth through twelfth examples, one of the alignment layers is treated so as to form a vertical orientation region in the liquid crystal layer. Both of the alignment layers may be treated. The alignment layer 509, instead of the alignment layer 506, may be treated. In an alternative method, one of the alignment layers is treated so as to form regions A2 and B2 and the other alignment layer is treated so as to form region C2.

The liquid crystal panels 10 through 12 are of a TN mode, in which the liquid crystal layer has a twist angle of 90°. Such a mode is suitable for liquid crystal panels of a NW mode, in which a white state is obtained when no voltage is applied. The present invention is also applicable to LCD devices of any other mode instead of the TN mode.

One pixel may have three regions having different reference orientation directions in addition to the vertical orientation region. In this case also, generation of the disclination line is prevented by providing a vertical orientation region between two adjacent regions having different reference orientation directions. The reference orientation direction of each region may be arbitrarily set. The vertical orientation region may be provided in one of the alignment layers or both of the alignment layers. In the case where the vertical orientation area is provided in both of the alignment layers, the two vertical orientation areas may have the same surface area or different surface areas.

The light radiation provides different areas of the alignment layer with different surface states and eliminates the disclination line by the following principle.

When high energy is provided by the light, the structure of the polymer forming the alignment film changes; that is, the cleavage of weak bonds occurs, or the formation of new bonds occurs. By light radiation, such changes occur one after another, thereby roughening the surface of the alignment layer. When the surface is roughened sufficiently, the liquid crystal molecules in contact with such a surface are vertically oriented.

In such a state, as is shown in FIG. 28, the orientation direction of the liquid crystal molecules 510 erected by voltage application and the orientation direction in the vertical orientation region present a continuous, smooth change. Thus, no disclination line is generated in the black state in the LCD device of the NW mode. Since no disclination line is generated, light does not leak.

The vertical orientation area may be formed by surface treatment of a selected area of the alignment layer or by formation of a selected alignment layer. In the former case, the selected area of the surface of the alignment layer is roughened as in the same manner as by light radiation. In the latter case, an alignment layer having a property for aligning the liquid crystal molecules vertically is formed on a selected area.

The present invention is applicable to any type of LCD device having a plurality of reference orientation directions in one pixel.

In an LCD device in the tenth through twelfth examples, since light leakage by the disclination line is prevented, contrast and viewing angle performance are improved. Especially in the case that a vertical orientation region is formed simply by light radiation through a mask, such an LCD device can be produced easily and at lower cost.

EXAMPLE 13

In the thirteenth through sixteenth examples according to the present invention, an alignment layer having a property for aligning liquid crystal molecules horizontally with respect to substrates are each provided with a vertical orientation area for aligning the liquid crystal molecules vertically at an arbitrary position. The liquid crystal molecules in a vertical orientation region of a liquid crystal layer in correspondence with the vertical orientation area are vertically oriented. Due to the inherent continuity of the liquid crystal molecules, the liquid crystal molecules in an adjacent region also tend to be vertically oriented. Accordingly, in the case where the vertical orientation area is point-like, the liquid crystal molecules are oriented radially or concentrically (tangentially) around the point-like vertical orientation area; and in the case where the vertical orientation area has a shape of a straight line, the liquid crystal molecules are oriented in two directions interposing the vertical orientation area. In the case where the vertical orientation area is a straight line with a bending point or a curved line, the liquid crystal molecules can be oriented in various directions as in the case of the point-like vertical orientation area. The anchoring strength of the vertical orientation area reaches in the range of several tens of micrometers. In accordance with the size of the display area, a single or a plurality of such vertical orientation areas are formed in order to obtain satisfactory viewing angle performance in the entire display area. The vertical orientation region always provides a black display, and thus reduces the aperture ratio. Accordingly, the vertical orientation area preferably occupies 50% or less of the entire display area. The reduction in the aperture ratio is avoided substantially completely by forming the vertical orientation area in superposition with a black mask.

Figure 32A:
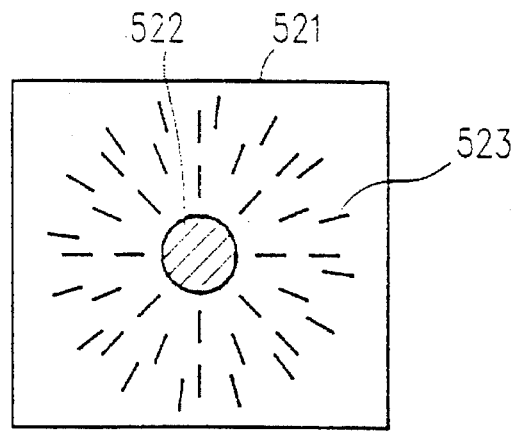
FIG. 32A is a top view of one pixel of an LCD device in accordance with a thirteenth example of the present invention.

FIG. 32A is an enlarged top view of one pixel 521 of an LCD device 13 in accordance with the thirteenth example. FIG. 32C is a cross sectional view of the LCD device 13.

As is shown in FIG. 32A, a vertical orientation area 522 is formed in correspondence with the center of the pixel 521, and liquid crystal molecules 523 in the vicinity of the vertical orientation area 522 are oriented radially around the vertical orientation area 522. When a voltage is applied to the LCD device 13, the liquid crystal molecules 523 are erected from an end thereof closer to the vertical orientation area 522 as is shown in FIG. 32C.

Also as is shown in FIG. 32C, the vertical orientation area 522 is formed in an alignment layer 525 in a top substrate, and the liquid crystal molecules 523 in a central area in a thickness direction of the LCD device 13 are vertically oriented.

Figure 32B:
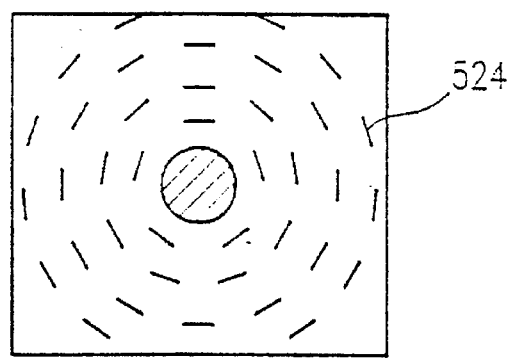
FIG. 32B is a top view of one pixel of an LCD device in a modification of the thirteenth example of the present invention.
Figure 32C:
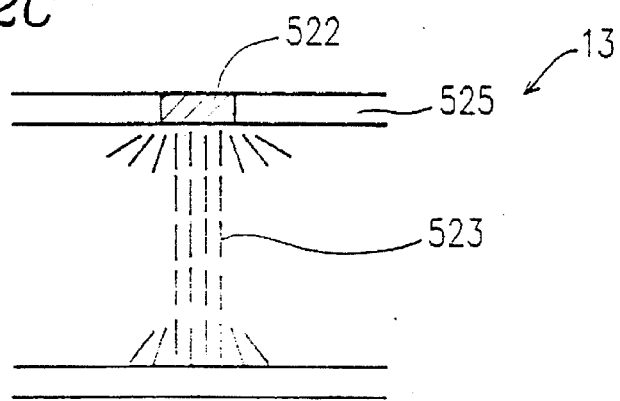
FIG. 32C is a schematic partial cross sectional view of the LCD device shown in FIG. 32A.

In the case where the liquid crystal molecules 523 includes a chiral dopant, the liquid crystal molecules 523 tend to be oriented concentrically as is shown in FIG. 32B.

Figure 33:
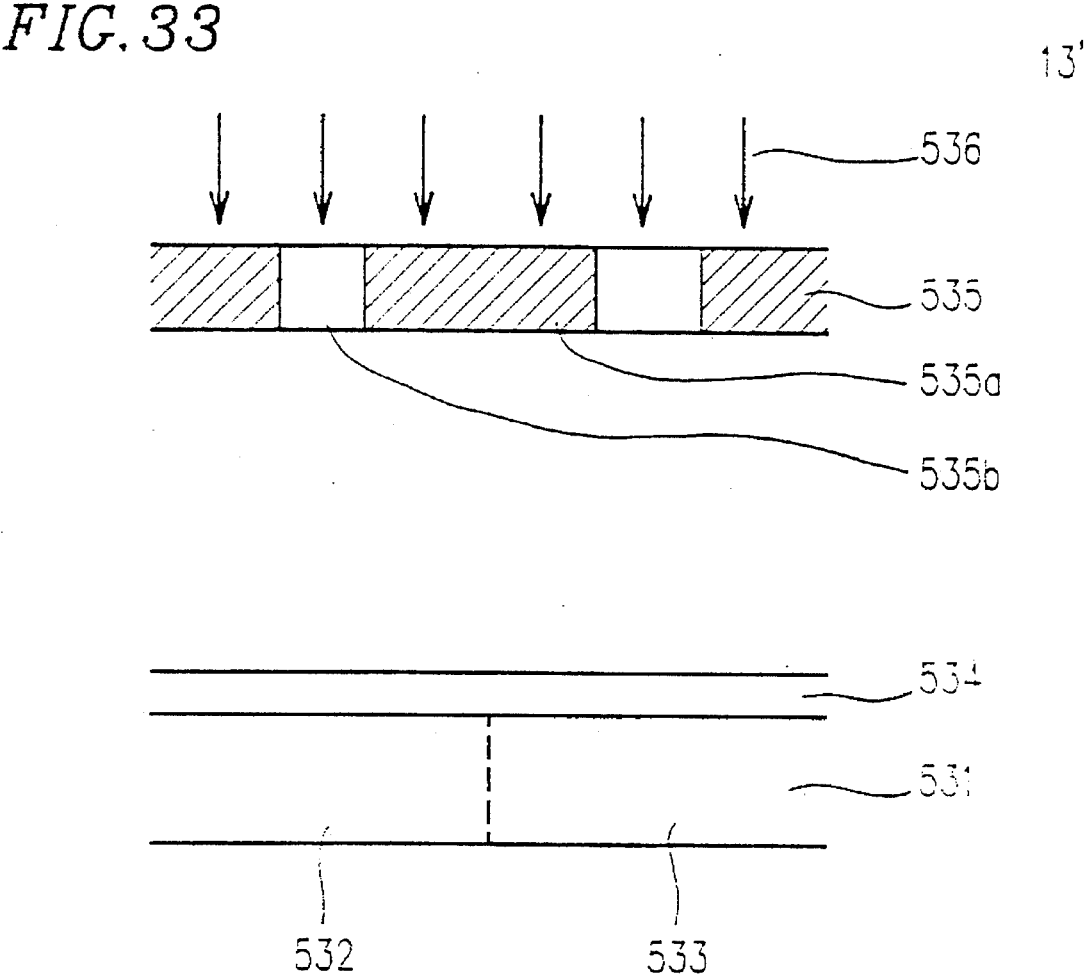
FIG. 33 is a schematic partial cross sectional view of an LCD device in the thirteenth example showing a production step thereof.

With reference to FIG. 33, a method for producing an LCD device 13' in accordance with this example will be described. FIG. 33 is a cross sectional view of the LCD device 13'.

In a known manner, pixel portions 532 and 533 are formed in a bottom substrate 531. Then, an alignment layer 534 is formed over the entire surface of the substrate 531, covering the pixel portions 532 and 533. For the alignment layer 534, polyimide, which is a polymer, is used. The alignment layer 534 has a property for aligning liquid crystal molecules horizontally. A mask 535 having light blocking areas 535a and light transmitting areas 535b is set on the substrate 531 in such a manner that the light transmitting areas 535b are in positional correspondence with a central area of each of the pixel portions 532 and 533. Light 536 is radiated to the alignment layer 534 through the mask 535, thereby roughening a surface of areas of the alignment layer 534 corresponding to the central areas of the pixel portions 532 and 533. Such areas having a rough surface act as the vertical orientation areas. After the light radiation, the substrate 531 is assembled with a top substrate (not shown) with liquid crystal molecules sandwiched therebetween. The alignment layer 534 is not treated by rubbing or the like. The present invention is applicable to any structure currently used for an LCD device.

The light radiation may be performed at any stage of the production after coating the alignment layer 534, for example, immediately after coating the alignment layer 534, after pre-curing, or after curing.

In this example, the vertical orientation area obtained by light radiation using the mask 535 is a circle having a diameter of 10 μm and occupies 3% of the entire surface area of each pixel. For the mask 535, a general photomask may be used. For the light 536, UV, visible light, infrared light, a laser beam having a prescribed wavelength suitable for the material of the alignment layer 534, an electron beam, an ion beam or an X-ray may be used. UV having a wavelength of 400 nm or less is preferable in order to easily obtain high energy sufficient to change the orientation direction of the liquid crystal molecules. UV having such a wavelength is easily emitted from a high pressure mercury lamp, a low pressure mercury lamp, a mercury xenon lamp or the like. The UV radiation is performed with an exposure of 30 J/cm$^2$ or greater.

The influence of the vertical orientation area is observed in the range of approximately 50 μm around the vertical orientation area. The V-T curve obtained in such an LCD device (for example, the LCD device 13') is as indicated by curve T3 in FIG. 35.

Figure 34A:
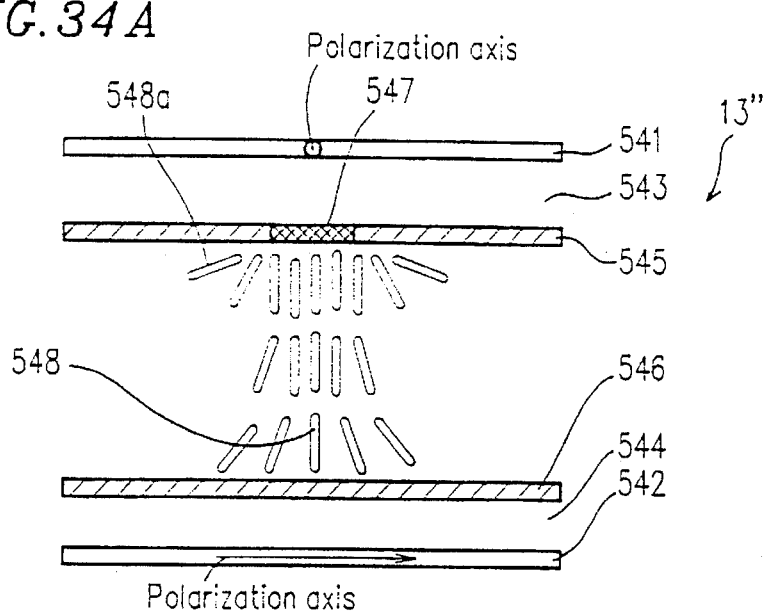
FIG. 34A is a cross sectional view of one pixel of an LCD device in the thirteenth example.
Figure 34B:
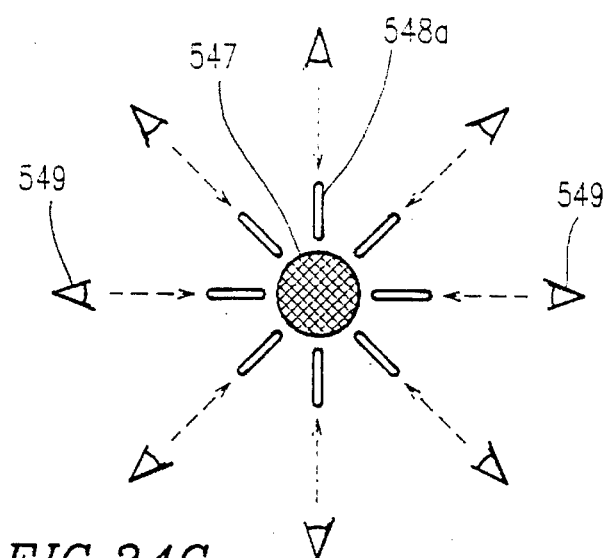
FIG. 34B is a top view of the LCD device shown in FIG. 34A.

The range of viewing angles at which satisfactory display is obtained is wider in an LCD device such as the LCD device 13' having the vertical orientation area. The principle by which the range of viewing angles is widened will be described referring to FIGS. 34A and 34B. FIG. 34A is a cross sectional view of one pixel of a TN LCD device 13", and FIG. 34B is a top view of the pixel.

As is shown in FIG. 34A, the TN LCD device 13" includes a pair of transparent substrates 543 and 544 located opposite to each other while sandwiching liquid crystal molecules 548 therebetween. The transparent substrates 543 and 544 respectively have alignment layers 545 and 546 on opposed surfaces thereof and also have polarizing plates 541 and 542 on outer surfaces thereof. Polarizing axes of the polarizing plates 541 and 542 are perpendicular to each other. Thus, the TN LCD device 13" operates in the NW mode. The alignment layers 545 and 546 have a property for aligning the liquid crystal molecules 548 horizontally with respect to the substrates 543 and 544. The alignment layer 545 is not treated by rubbing or the like, but UV radiation in a prescribed exposure is performed to a prescribed area of the alignment layer 545, thereby forming a vertical orientation area 547. The vertical orientation area 547 has a function for aligning the liquid crystal molecules 548 vertically with respect to the substrates 543 and 544. Accordingly, the liquid crystal molecules 548 corresponding to the vertical orientation area 547 are vertically oriented between the substrates 543 and 544. The liquid crystal molecules 548a in the vicinity of the vertically oriented liquid crystal molecules 548 are tilted by the influence of the vertical orientation. As a result, as is shown in FIG. 34B, the liquid crystal molecules 548a are radially oriented around the vertical orientation area 547 with various tilting angles. In FIG. 34B, reference numeral 549 denotes the positions of the viewer. The LCD device in accordance with this example present satisfactory display performance to the viewer at any of the positions.

Figure 35:
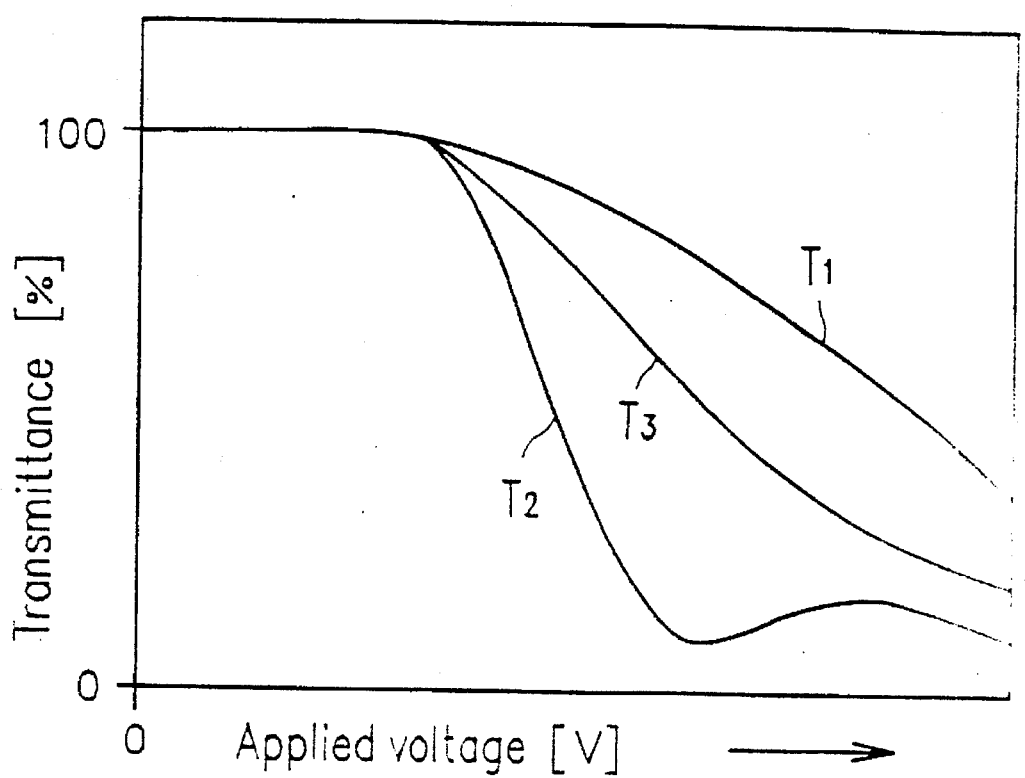
FIG. 35 is a graph illustrating the light transmittance as a function of the voltage applied to an LCD device in the thirteenth example and a conventional LCD device.

As described above, the LCD device in accordance with this example has the V-T curve T3 in FIG. 35. A conventional TN LCD device, which has only one reference orientation direction, shows a V-T curve as is indicated by curve T2 in FIG. 35 in the positive viewing direction, namely, inversion occurs at a certain voltage. In the negative viewing direction, as is indicated by curve T1, inversion does not occur but the contrast is drastically reduced. In the LCD device 13", the liquid crystal molecules 548a in the vicinity of the vertical orientation area 547 are radially oriented. In such a structure, one viewing direction is positive with respect to the liquid crystal molecules aligned in one reference orientation direction, but is negative with respect to the liquid crystal molecules aligned in the opposite reference orientation direction. The LCD device 13" has V-T characteristics including different characteristics indicated by curves T1 and T2 mixed. As a result of superposition of curves T1 and T2, the satisfactory V-T curve T2 can be obtained.

Figure 34C:
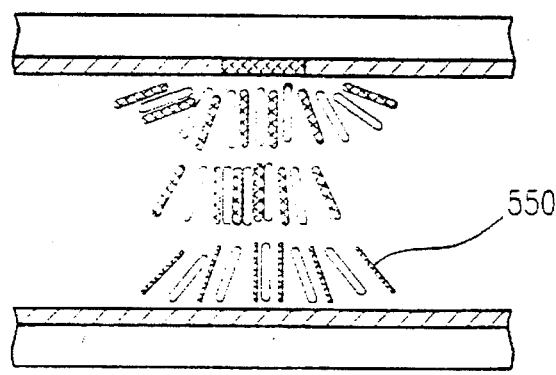
FIG. 34C is a schematic partial cross sectional view of a pixel of an LCD device in a modification of the thirteenth example.

FIG. 34C is a cross sectional view of one pixel of a guest-host (referred to as "G-H", hereinafter) mode LCD device. The G-H mode LCD device includes molecules of a dichroic dye 550 (G-H dye) in a liquid crystal layer sandwiched between two substrates. Due to the G-H dye, display can be performed without the polarizing plates 541 and 542. Since the G-H dye molecules and the liquid crystal molecules are both radially oriented around the vertical orientation area, satisfactory viewing angle performance can be obtained.

In this example, the light transmitting areas 535b of the mask 535 are circles. The shape of the light transmitting areas 535b may be elliptical, triangular, square, or rectangular, or may have projections such as a star shape. The vertical orientation areas have the same shape as that of the light transmitting areas 535b.

The vertical orientation area preferably has a diameter of 20 μm or less (in this example, 10 μm; 3% of the entire surface area of the pixel), but satisfactory performance is obtained if the surface area of the vertical orientation area is 50% or less of the entire surface area of the pixel. If the surface area of the vertical orientation area exceeds 50%, the vertical orientation area is recognized as a black point in the NW mode.

The mask 535 may be formed as a mask pattern on the alignment layer 534 using photolithography and removed after light radiation. Instead of using a photomask or a mask pattern, converted light may be radiated.

The alignment layers may be formed of, for example, silicon nitride, silicon oxide, magnesium fluoride or an inorganic material mainly including gold or the like. In such a case, a UV laser, an electron beam or other light source for providing high energy radiation is preferably used.

In this example, a vertical orientation area is formed in one of the two alignment layers. In the case where both of the alignment layers are each provided with a vertical orientation area, higher anchoring strength can be obtained.

EXAMPLE 14

Figure 36:
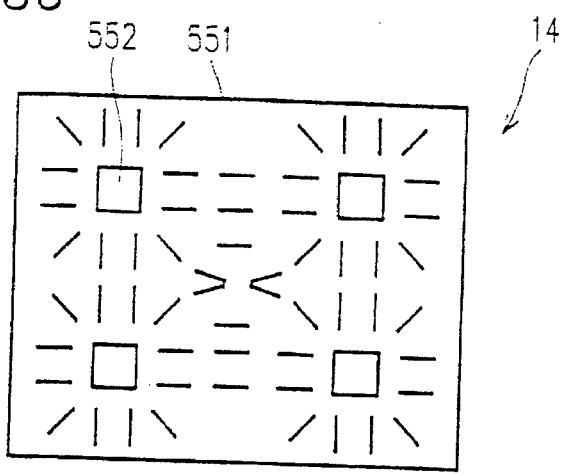
FIG. 36 is a top view of one pixel of an LCD device in accordance with a fourteenth example of the present invention.

FIG. 36 is a top view of one pixel 551 of an LCD device 14 in accordance the fourteenth example of the present invention.

As is illustrated in FIG. 36, a plurality of vertical orientation areas are provided in one pixel 551. Such a structure is used when the pixel 551 is too large to control the orientation thereof by one vertical orientation area. The vertical orientation areas 552 may be provided in any number and in any shape. In this example, the vertical orientation areas 552, each of which is a square having sides of 10 µm, are arranged in a matrix with a pitch of 70 µm. The vertical orientation areas 552 occupy 2% of the entire surface area of the pixel 551. (In FIG. 36, the vertical orientation areas 552 are drawn larger for easy explanation.) Except for the above-described point, the LCD device 14 has substantially the same structure as the LCD device 13" shown in FIG. 34A.

Figure 37:
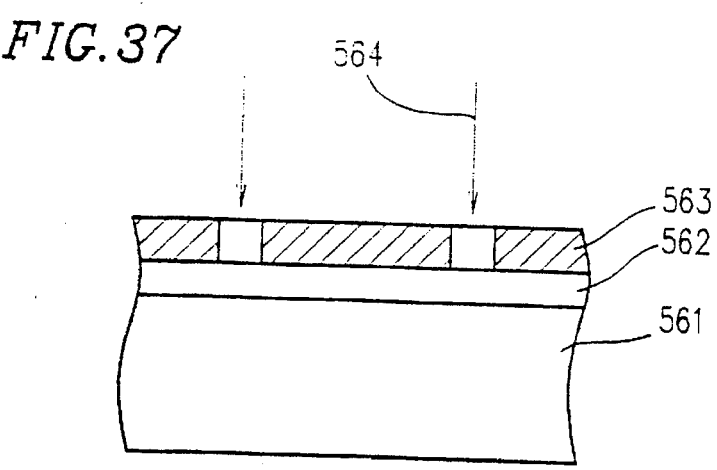
FIG. 37 is a schematic partial cross sectional view of the LCD device shown in FIG. 36 showing a production step thereof.

With reference to FIG. 37, a method for producing the LCD device 14 will be described.

As is shown in FIG. 37, an alignment layer 562 is formed on a substrate 561 formed of glass. At any stage thereafter, a resist pattern 563 is formed on the alignment layer 562 using photolithography. The resist pattern 563 is formed so as to cover the entire surface of the alignment layer 562 except for areas where the vertical orientation areas 552 are to be formed. Next, the alignment layer 562 is exposed to an alkaline solution in the direction shown by an arrow 564 in FIG. 37, thereby roughening a surface of the areas not covered with the resist pattern 563. For the alkaline solution, a 0.5% aqueous solution of NaOH, a 2.38% aqueous solution of TMAH or the like may be used. Instead of an alkaline solution, an acid solution such as nitric acid may be used. Ozone or ammonia gas, both of which are a reactive gas, may be used.

EXAMPLE 15

Figure 38:
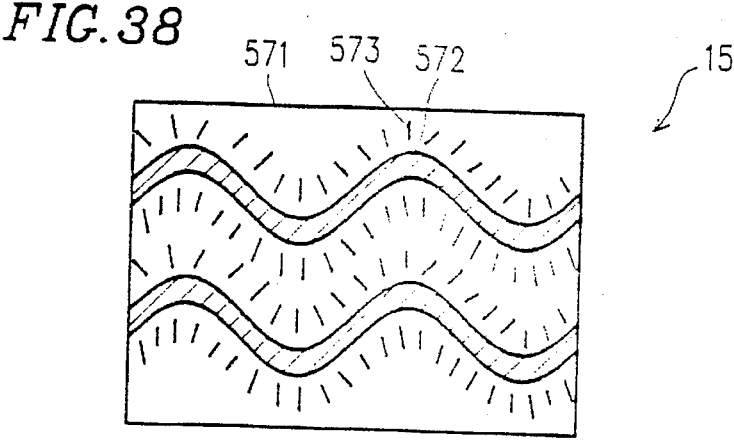
FIG. 38 is a top view of one pixel of an LCD device in accordance with a fifteenth example of the present invention.

FIG. 38 is a top view of one pixel 571 of an LCD device 15 in accordance with the fifteenth example of the present invention.

As is illustrated in FIG. 38, wave-like vertical orientation areas 572 are provided in stripes in the pixel 571. The wave-like vertical orientation areas 572 have a width of 5 µm and occupy approximately 15% of the entire surface area of the pixel 571. Although not shown, liquid crystal molecules right below the vertical orientation areas 572 are oriented vertically to two substrates (not shown). Liquid crystal molecules 573 adjacent to the liquid crystal molecules right below the vertical orientation areas 572 are tilted by the influence of the vertical orientation. Accordingly, the liquid crystal molecules 573 are tilted at various angles along the wave-like vertical orientation areas 572.

With reference to FIGS. 39A through 39D, a method for producing the LCD device 15 having the wave-like vertical orientation areas 572 will be described.

Figure 39A:
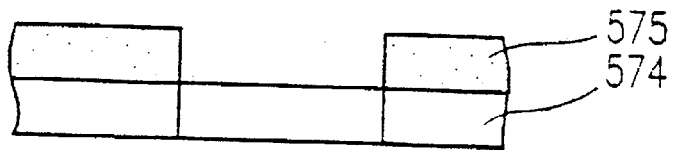
FIGS. 39A through 39D are schematic partial cross sectional views of the LCD device shown in FIG. 38 showing production steps thereof.
Figure 39B:
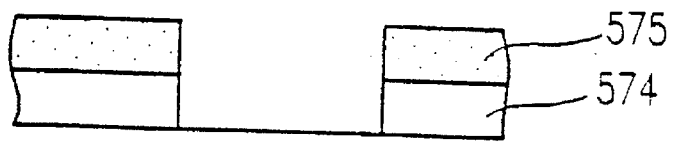
Figure 39C:
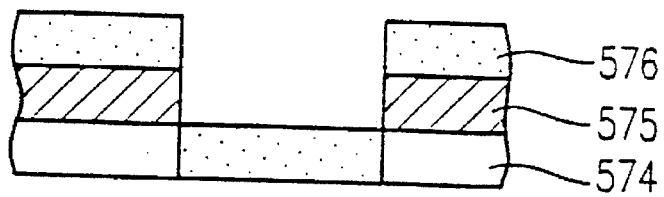
Figure 39D:
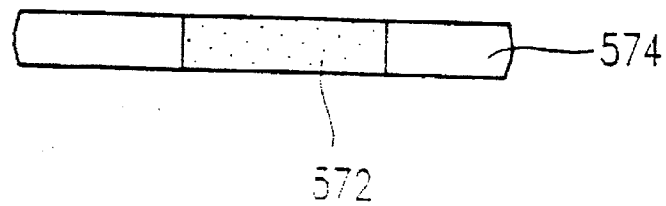

As is shown in FIG. 39A, an alignment layer 574 having a property for aligning the liquid crystal molecules horizontally is formed on a substrate (not shown) in a known process. At any stage after coating the alignment layer 574, a resist pattern 575 is formed on the alignment layer 574. The resist pattern 575 is formed so as to cover the entire surface of the alignment layer 574 except for areas where vertical orientation areas 572 are to be formed. Next, as is shown in FIG. 39B, the areas of the alignment layer 574 which area not covered by the resist pattern 575 are removed. As is shown in FIG. 39C, another alignment layer 576 is formed on a surface of the substrate, covering the resist pattern 575. The alignment layer 576 has a property for aligning the liquid crystal molecules vertically. As is shown in FIG. 39D, the resist pattern 575 is removed. In this manner, the vertical orientation areas 572 (only one area is shown in FIG. 39D) are formed in the alignment layer 574. A step of rubbing the alignment layer, which is conventionally necessary, is eliminated. Except for the above-described point, the LCD device 15 has substantially the same structure as that of the LCD device 13".

The vertical orientation areas 572 provided in stripes may be curved, straight, zigzag, or a series of island-like areas of various shape. Some or all of these shapes may be combined. Such vertical orientation areas may be formed in any number in accordance with the surface area of the pixel. In the case where the pixel is sufficiently small, satisfactory effects can be provided by forming only one such vertical orientation area at a center of the pixel.

EXAMPLE 16

Figure 40A:
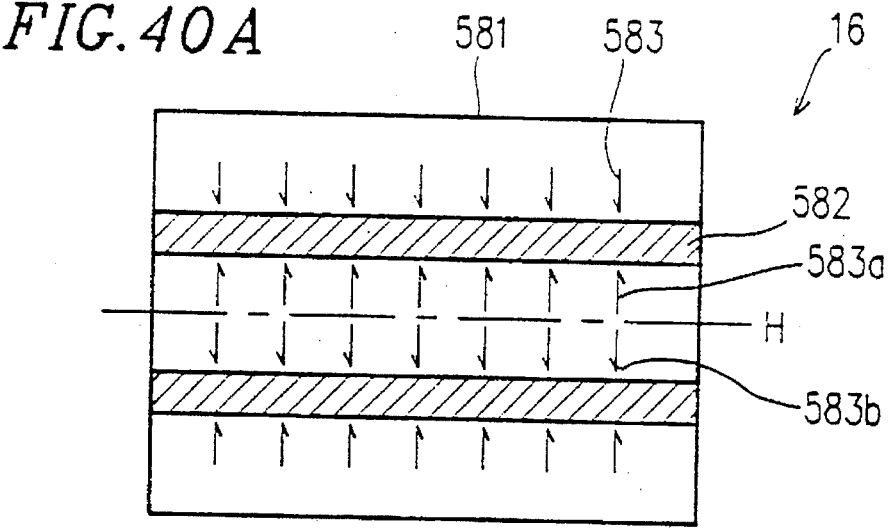
FIG. 40A is a top view of one pixel of an LCD device in accordance with a sixteenth example of the present invention.
Figure 40B:
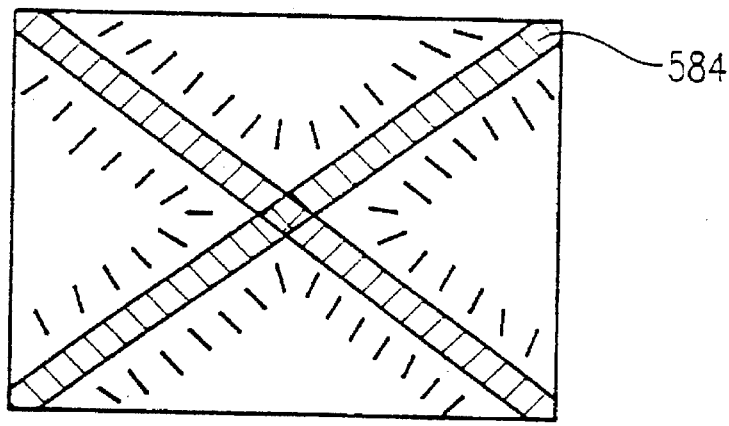
FIGS. 40B and 40C are each a top view of one pixel of an LCD device in a modification of the sixteenth example.
Figure 40C:
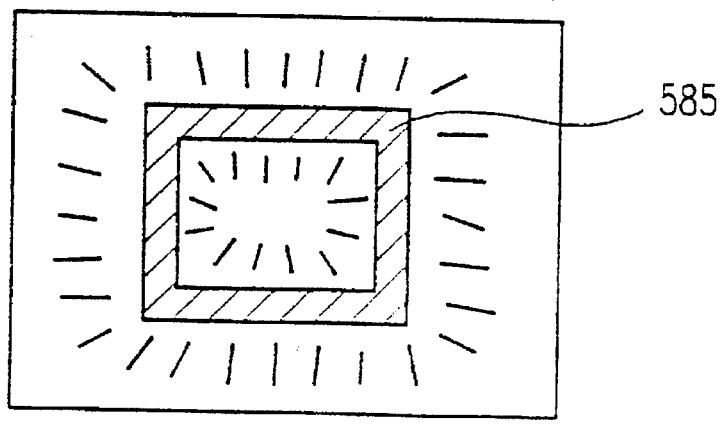

FIGS. 40A through 40C show examples of a top view of one pixel 581 in an LCD device 16 in accordance with the sixteenth example of the present invention.

In FIG. 40A, vertical orientation areas 582 each having a shape of a straight line are provided in stripes in the pixel 581. The vertical orientation areas 582, each of which has a width of 10 µm, occupy approximately 20% of the entire surface area of the pixel 581. Liquid crystal molecules 583 corresponding to a horizontal orientation area of the alignment layer but in the vicinity of the vertical orientation areas 582 are oriented perpendicular to the longitudinal direction of the vertical orientation areas 582. Accordingly, liquid crystal molecules 583a and 583b located between two adjacent vertical orientation areas 582 in the state of interposing a border H are oriented in opposite directions. The alignment layer may be treated by rubbing.

A plurality of straight vertical orientation areas may be combined as is indicated by reference numerals 584 and 585 in FIGS. 40B and 40C. In these structures also, satisfactory viewing angle performance can be obtained in all the directions. In the case where the longitudinal sides and the transverse sides of the pixel 581 are both several tens of micrometers, the pattern of the vertical orientation area 585 in FIG. 40C may be extended to be in superposition with a black mask. In such a case, the viewing angle performance can be improved in the entire display area with no possibility of reduction in the aperture ratio.

The vertical orientation areas 582, 583, and 584 may all be formed by light radiation using a photomask. In an alternative method, an alignment layer having a property for aligning the liquid crystal molecules vertically is first formed, and an appropriate exposure of light is radiated to a surface of the alignment layer except for areas where the vertical orientation areas are to be formed, thereby forming a horizontal orientation area where the pretilt angle is reduced. The exposure of light radiation depends on the type of alignment layer, but at least approximately 10 to 30 J/cm$^2$ is required in the case of UV radiation. Such an exposure provides a pretilt angle of 10° or less.

Figure 41:
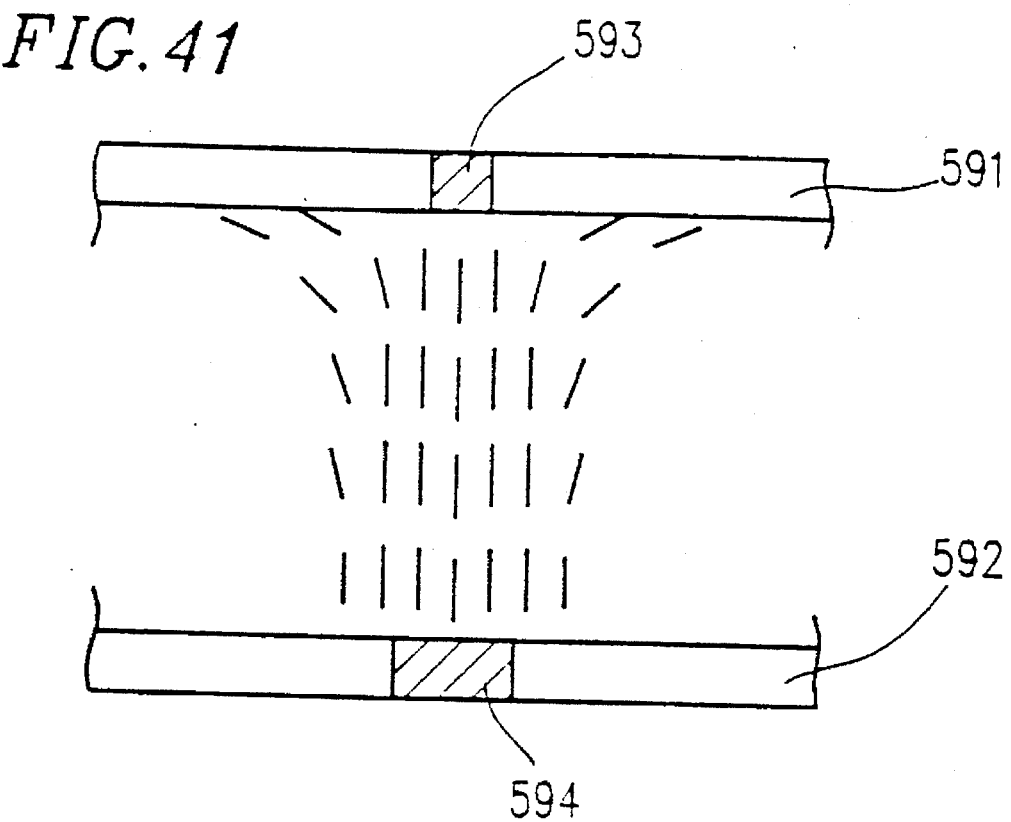
FIG. 41 is a schematic partial cross sectional view of one pixel of an LCD device in another modification of the sixteenth example.

In FIG. 41, a vertical orientation area 593 in an alignment layer 591 in a top substrate and a vertical orientation area 594 in an alignment layer 592 in a bottom substrate have different surface areas. Alternatively, the vertical orientation areas 593 and 594 may be offset relative to each other by several micrometers. In such structures also, the anchoring strength of the alignment layer is improved.

In the thirteenth through sixteenth examples, the orientation direction of the liquid crystal molecules are changed by a difference in surface roughness in different areas of an alignment layer. In more detail, by roughening a surface of an area of an alignment layer having a property for aligning the liquid crystal molecules horizontally, the liquid crystal molecules in correspondence with the roughened area (522 in FIG. 32C) are oriented vertically with respect to the substrates. Due to the inherent continuity of the liquid crystal molecules, the liquid crystal molecules in contact with the liquid crystal molecules vertically oriented also tend to be vertically oriented. Accordingly, in the case that the vertical orientation area is point-like, square, or star-shaped, the liquid crystal molecules in the vicinity thereof are oriented radially (FIG. 32A) or concentrically (FIG. 32B) around the point-like vertical orientation area. In the case where the vertical orientation area has the shape of a straight line, the liquid crystal molecules in the vicinity thereof are oriented in two directions interposing the vertical orientation area (FIG. 40A). In the case where the vertical orientation area is a straight line with a bending point or a curved, winding line, the liquid crystal molecules can be oriented in various directions (FIG. 38) as in the case of the point-like vertical orientation area. The anchoring strength of the vertical orientation area reaches in the range of several tens of micrometers. In accordance with the size of the display area, a single or a plurality of such vertical orientation areas are formed in order to obtain satisfactory viewing angle performance over the entire display area. The vertical orientation region always provides a black display, and thus reduces the aperture ratio. Accordingly, the vertical orientation area preferably occupies 50% or less of the entire display area.

An alignment layer having a property for aligning the liquid crystal molecules vertically may also be used. In such a case, an area except for an area where a vertical orientation area will be formed are roughened by appropriate surface treatment. In this manner, the liquid crystal molecules in correspondence with such treated area have a small pretilt angle to be horizontally oriented.

In the thirteen through sixteenth examples, liquid crystal regions having different orientation directions can be formed in one pixel simply by allowing a part of the liquid crystal molecules to be oriented vertically. In detail, by simply allowing a part of the liquid crystal molecules to be vertically oriented in shapes shown in FIGS. 32A, 36, 38, 40B, and 40C, an LCD device having uniform viewing performance in all the directions can be obtained. In the case etching or the like is not used in producing the LCD device, contamination to the alignment layer is avoided, which contributes to improvement in the display quality. Further, treatment such as rubbing can be eliminated from the production process. The liquid crystal molecules are oriented vertically by forming a vertical orientation area at a prescribed area of the alignment layer or roughening a surface of the prescribed area of the alignment layer by light radiation. The method of radiating light, for example, through a photomask, is advantageous over a conventional method for improving the viewing angle performance in that the process is completed in a short period of time.

Figure 42:
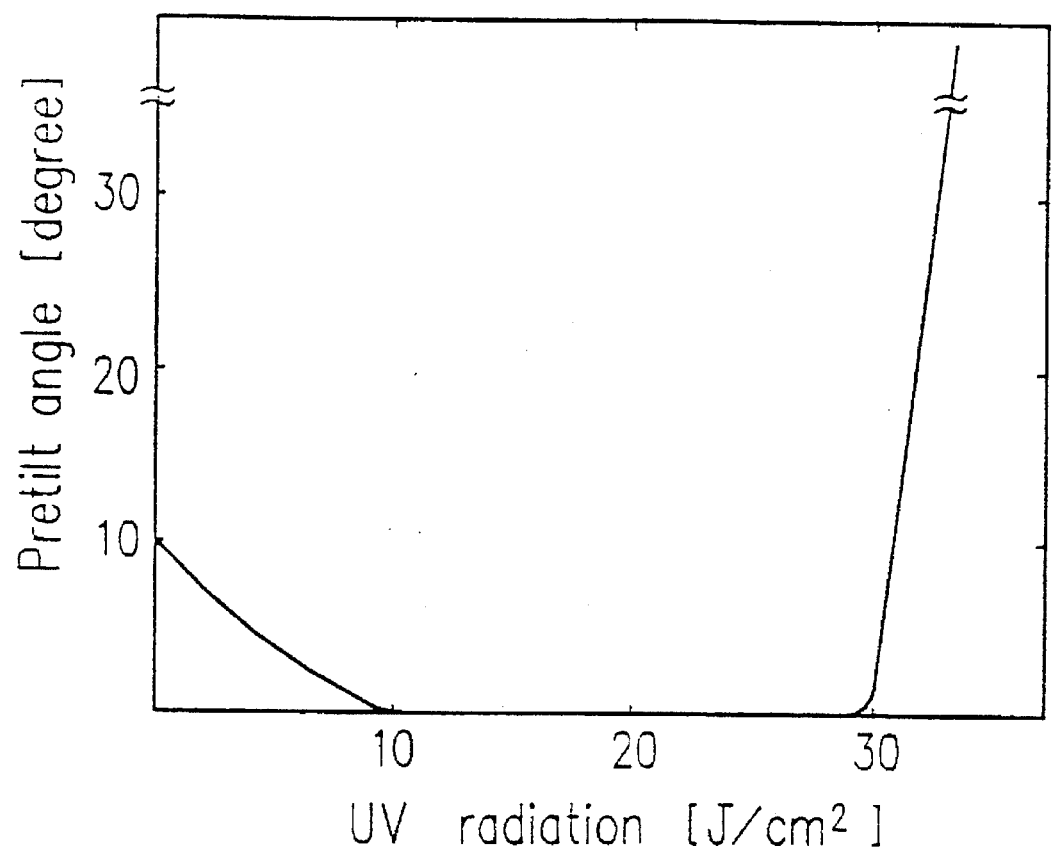
FIG. 42 is a graph illustrating the pretilt angle as a function of the intensity of UV radiation of an LCD device in the sixteenth example.

With reference to FIG. 42, how the pretilt angle of the liquid crystal molecules in the vicinity of the alignment layer changes by light radiation (in this case, UV) will be described. FIG. 42 is a graph illustrating the pretilt angle as a function of the exposure of UV radiation to an alignment layer formed of polyimide having a property for aligning the liquid crystal molecules horizontally.

For example, when the alignment layer providing a pretilt angle of 10° is exposed to UV radiation, the pretilt angle simply decreases until the exposure becomes approximately 10 J/cm$^2$. When the exposure exceeds 10 J/cm$^2$, the pretilt angle becomes almost 0°. When the exposure exceeds approximately 30 J/cm$^2$, the pretilt angle rapidly increases. In other words, the alignment layer provides vertical orientation. Although the actual pretilt angle and the exposure of UV radiation necessary for changing the pretilt angle are different in accordance with the material of the alignment layer, the change of the pretilt angle by the UV radiation tends to be substantially as is shown in FIG. 42 regardless of the material. Accordingly, the pretilt angle can be controlled by controlling the exposure of UV radiation based on the relationship therebetween for the type of the alignment layer used.

In the case where the liquid crystal molecules are vertically oriented in a shape shown in FIG. 40A, the viewing angle performance in the positive and negative viewing directions can be averaged. In this case, the alignment layer may be treated for alignment by, for example, rubbing. By providing vertical orientation of the liquid crystal molecules using light radiation for roughening the surface, the conventional problem of a long process period can be solved. Instead of the light radiation, a vertical orientation area may be formed in an area of the alignment layer, or an area of the alignment layer may be exposed to a chemical such as alkali or acid. These methods are performed by photolithography as in conventional methods, but are advantageous in that alignment treatment such as rubbing is not necessary.

The vertical orientation area may be provided in any shape, in any number and by any method. The vertical orientation area may be formed even by providing an alignment layer on a base having a rough surface.

The orientation state of the liquid crystal molecules shown in FIGS. 34A through 34C seems to be similar to that shown in FIGS. 23 and 24 of Japanese Laid-Open Patent Publication No. 5-173138, but the orientation state in Japanese Laid-Open Patent Publication No. 5-173138 is provided in order to compensate for the disclination line as a result of performing alignment treatment, but not to improve the viewing angle performance. Japanese Laid-Open Patent Publication No. 5-5886 describes provision of a vertical orientation area by UV radiation. The vertical orientation area in Japanese Laid-Open Patent Publication No. 5-5886 is provided to avoid light leakage through an area between pixel electrodes, but not to improve the viewing angle performance. Both of the above-mentioned inventions are fundamentally different from the present invention.

According the thirteenth through sixteenth examples, an LCD device having uniform viewing angle performance in all the directions and having the viewing angle in two opposite directions averaged can be obtained in an easy manner. Especially by light radiation, an LCD device for presenting high quality display in a wide range of viewing angles can be easily produced.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device, comprising:

a pair of substrates;

a liquid crystal layer sandwiched between the pair of substrates and including liquid crystal molecules;

an electrode layer for applying a voltage to the liquid crystal layer; and an electrode line provided on at least one of the substrates, wherein the electrode layer includes a plurality of electrode areas, each electrode area positionally corresponding to of the areas and an area of the liquid crystal layer and thereby defining a pixel, the pixels being arranged in a matrix, each liquid crystal layer pixel area includes a plurality of regions, the plurality of regions being divided by a border extending along a direction inclined with respect to the electrode line and having different reference orientation directions, and the reference orientation directions are set so that the liquid crystal molecules at the perimeter of the liquid crystal layer pixel area in the vicinity of the substrate which has the electrode line are pretilted in an identical direction with a direction in which the liquid crystal molecules are erected by an electric field generated by the electrode line.

2. A liquid crystal display device according to claim 1, wherein the reference orientation directions are set so that the liquid crystal molecules in an area surrounding the pixel in a central area in a thickness direction of the liquid crystal layer are pretilted in an identical direction with a direction in which the liquid crystal molecules are erected by an electric field generated by the electrode line.

3. A liquid crystal display device according to claim 2, wherein the plurality of regions have a border crossing the reference orientation directions thereof.

4. A liquid crystal display device according to claim 3, wherein the border is a diagonal line of the pixel having a substantially rectangular shape.

5. A liquid crystal display device, comprising:

a pair of substrates;

a liquid crystal layer sandwiched between the pair of substrates and including liquid crystal molecules in a twisted nematic orientation therein; and an electrode for applying a voltage to the liquid crystal layer, wherein the liquid crystal layer has a common reference orientation direction and the liquid crystal molecules in the vicinity of one substrate and the liquid crystal molecules in the vicinity of the other substrate have different pretilt angles to improve display quality of the liquid crystal display device.

6. A liquid crystal display device according to claim 5, wherein one of the pretilt angles is in the range between 0° and 5° inclusive, and the other pretilt angle is in the range between 10° and 80° inclusive.

7. A liquid crystal display device according to claim 5, further comprising an alignment layer sandwiched between one of the pair of substrates and the liquid crystal layer and another alignment layer sandwiched between the other substrate and the liquid crystal layer, wherein the alignment layers are formed of different materials.

8. A liquid crystal display device according to claim 7, the alignment layers are formed of different polyimide materials.

9. A liquid crystal display device according to claim 5, further comprising an alignment layer sandwiched between one of the pair of substrates and the liquid crystal layer and another alignment layer sandwiched between the other substrate and the liquid crystal layer, wherein the alignment layers are formed by different alignment treatments.

* * * * *

UNITED STATES PATENT AND TRADEMARK OFFICE

CERTIFICATE OF CORRECTION

PATENT NO.    : 5,652,634
DATED         : July 29, 1997
INVENTOR(S)   : Mitsuaki HIRATA et al.

It is certified that error appears in the above-identified patent and that said letters patent is hereby corrected as shown below:

Claim 1, line 11, delete "of the areas and".

Signed and Sealed this

Seventeenth Day of November, 1998

Attest:

BRUCE LEHMAN

*Attesting Officer*     *Commissioner of Patents and Trademarks*